(12) United States Patent
Livanos et al.

(10) Patent No.: US 10,805,178 B2
(45) Date of Patent: Oct. 13, 2020

(54) SUBSCRIPTION-BASED EVENT NOTIFICATION TECHNIQUES FOR REDUCING DATA BUFFERING IN MOBILE NETWORKS

(71) Applicant: Cisco Technology, Inc., San Jose, CA (US)

(72) Inventors: Konstantin Livanos, Naperville, CA (US); Ian McDowell Campbell, Littleton, CO (US); Malgorzata Kaczmarska-Wojtania, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 45 days.

(21) Appl. No.: 15/823,144

(22) Filed: Nov. 27, 2017

(65) Prior Publication Data

US 2019/0166016 A1    May 30, 2019

(51) Int. Cl.
*H04L 12/24*   (2006.01)
*H04W 76/10*   (2018.01)
(Continued)

(52) U.S. Cl.
CPC .......... *H04L 41/5012* (2013.01); *H04L 67/26* (2013.01); *H04L 67/322* (2013.01);
(Continued)

(58) Field of Classification Search
CPC ..... H04W 16/04; H04W 28/02; H04W 60/04; H04W 28/16; H04W 60/06; H04L 41/5012; H04L 67/322
See application file for complete search history.

(56) References Cited

U.S. PATENT DOCUMENTS 6,650,621 B1   11/2003   Maki-Kullas
8,914,810 B1   12/2014   Brockners
(Continued)

FOREIGN PATENT DOCUMENTS

JP   H02196539 A    8/1990
JP   2016054342 A   4/2016
(Continued)

OTHER PUBLICATIONS

3GPP, "3rd Generation Partnership Project; Technical Specification Group Services and System Aspects' Architecture Enhancements to Facilitate Communications with Packet Data Networks and Applications", 3GPP TS 23.682, V13.5.0 (Mar. 2016), pp. 1-90.
(Continued)

*Primary Examiner* — Matthew C Sams

(57) ABSTRACT

Subscription-based, user equipment (UE) event notification techniques for use in a mobile network are described. In one illustrative example, an event subscription request from an application server may be received at a network exposure function (NEF) entity of a 5G mobile network. The event subscription request may include a list of one or more subscribed events for a UE, which may include a UE attach event and/or a UE detach event. A context which indicates the one or more subscribed events may be created for the UE. Sometime during network operation, an indication of an occurrence of an event associated with the UE is received. The indication is received from a policy and charging function (PCF) entity when the UE is configured for IP data delivery, or from an access and mobility management function (AMF) entity when the UE is configured for non-IP data delivery (NIDD).

20 Claims, 33 Drawing Sheets

(51) Int. Cl.

| | | |
|---|---|---|
| *H04L 29/08* | (2006.01) | |
| *H04W 4/70* | (2018.01) | |
| *H04W 28/16* | (2009.01) | |
| *H04W 60/04* | (2009.01) | |
| *H04W 60/06* | (2009.01) | |
| *H04W 60/00* | (2009.01) | |

(52) U.S. Cl.
CPC .............. *H04W 4/70* (2018.02); *H04W 28/16* (2013.01); *H04W 60/04* (2013.01); *H04W 60/06* (2013.01); *H04W 76/10* (2018.02); *H04W 60/00* (2013.01)

(56) References Cited

U.S. PATENT DOCUMENTS

| | | | |
|---|---|---|---|
| 9,143,436 | B2 | 9/2015 | Hiramoto et al. |
| 9,197,533 | B1 | 11/2015 | Xia et al. |
| 9,609,632 | B2 | 3/2017 | Kim et al. |
| 10,652,085 | B2 | 5/2020 | Ryu et al. |
| 2008/0181178 | A1 | 7/2008 | Shaheen |
| 2010/0046502 | A1 | 2/2010 | Lei et al. |
| 2010/0304717 | A1 | 12/2010 | Bhatt et al. |
| 2011/0205898 | A1 | 8/2011 | Ichiki et al. |
| 2011/0208802 | A1 | 8/2011 | Gunnalan et al. |
| 2011/0320620 | A1 | 12/2011 | Cutler et al. |
| 2012/0250514 | A1 | 10/2012 | Hiramoto et al. |
| 2013/0021910 | A1 | 1/2013 | Crisan et al. |
| 2013/0058259 | A1 | 3/2013 | Wu et al. |
| 2015/0051823 | A1 | 2/2015 | Joglekar |
| 2015/0189539 | A1 | 7/2015 | Li et al. |
| 2016/0007316 | A1 | 1/2016 | Vaidya et al. |
| 2016/0294677 | A1 | 10/2016 | Kazerani et al. |
| 2017/0006499 | A1 | 1/2017 | Hampel et al. |
| 2017/0111185 | A1 | 4/2017 | Tamaguchi et al. |
| 2017/0126527 | A1 | 5/2017 | Ouedraogo et al. |
| 2017/0317894 | A1* | 11/2017 | Dao .................... H04L 41/5012 |
| 2017/0339071 | A1 | 11/2017 | Cheng et al. |
| 2018/0020369 | A1* | 1/2018 | Parra .................... H04W 40/28 |
| 2018/0027097 | A1 | 1/2018 | Boucadair et al. |
| 2018/0035351 | A1 | 2/2018 | Kodaypak |
| 2018/0049156 | A1* | 2/2018 | Laha .................... H04W 76/28 |
| 2018/0063841 | A1 | 3/2018 | Song et al. |
| 2018/0077714 | A1* | 3/2018 | Kodaypak ............... H04W 4/60 |
| 2018/0097894 | A1 | 4/2018 | Li et al. |
| 2018/0152890 | A1 | 5/2018 | Jia |
| 2018/0192471 | A1* | 7/2018 | Li .................... H04W 72/0493 |
| 2018/0205628 | A1 | 7/2018 | Gilson et al. |
| 2018/0227837 | A1* | 8/2018 | Starsinic ................ H04W 4/70 |
| 2018/0262941 | A1* | 9/2018 | Huang .................... H04W 4/70 |
| 2018/0270778 | A1* | 9/2018 | Bharatia ........... H04W 36/0011 |
| 2018/0278698 | A1* | 9/2018 | Joseph .................. H04W 48/08 |
| 2018/0324652 | A1* | 11/2018 | Ryu ........................ H04W 8/04 |
| 2018/0343601 | A1* | 11/2018 | Livanos ................ H04L 47/122 |
| 2018/0368202 | A1 | 12/2018 | Landais et al. |
| 2019/0069221 | A1 | 2/2019 | Virgile et al. |
| 2019/0166016 | A1 | 5/2019 | Livanos et al. |
| 2019/0230492 | A1* | 7/2019 | Suzuki .................... H04W 4/20 |
| 2019/0306753 | A1 | 10/2019 | Uchida et al. |

FOREIGN PATENT DOCUMENTS

| | | | |
|---|---|---|---|
| WO | 2011/054300 | A1 | 5/2011 |
| WO | 2011054300 | A1 | 5/2011 |
| WO | 2013167160 | A1 | 11/2013 |
| WO | 2015172079 | A1 | 12/2015 |
| WO | 2016024789 | A1 | 2/2016 |
| WO | 2017004158 | A1 | 1/2017 |
| WO | 2017023748 | A1 | 2/2017 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network", 3GPP TS 23.401, V15.1.0 (Sep. 2017), pp. 1-397.

3GPP Organizational Partners, "3rd Generation Partnership Project; Technical Specification Group Services and System Aspects; Procedures for the 5G System; Stage 2 (Release 15)", 3GPP TS 23.502 V1.2.0, Sep. 2017, 165 pages.

International Search Report and Written Opinion in corresponding International Application No. PCT/US2018/067828, dated Apr. 29, 2019, 12 pages.

Technical Specification, "3rd Generation Partnership Project; Technical Specification Group Services and System Aspects; Procedures for the 5G System; Stage 2 (Release 15)", 3GPP TS 23.502 V1.3.0, Nov. 2017, 215 pages.

Technical Specification, "3rd Generation Partnership Project; Technical Specification Group Services and System Aspects; Architecture enhancements to facilitate communications with packet data networks and applications (Release 15)", 3GPP TS 23.682 V15.2.0, Sep. 2017, 122 pages.

3GPP, "3rd Generation Partnership Program; Technical Specification Group Services and Systems Aspects; General Packet Radio Services (GPRS) enhancements for Evolved Universal Terrestrial Radio Access Network", 3GPP TS 23.401, V15.1.0 (Sep. 2017), pp. 1-397.

3GPP Organizational Partners, "3rd Generation Partnership Project; Technical Specification Group Services and System Aspects; Policy and charging control architecture (Release 14)", 3GPP TS 23.203 V14.6.0, Jun. 2018, 257 pages.

"Universal Mobile Telecommunications System (UMTS); LTE; Service Capability Exposure Functionality Over Nt Reference Point (3GPP TS 29.154 Version 14.2.0 Release 14)"; ETSI TS 129 154 V14.2.0 (Jul. 2017); pp. 1-17.

Universal Mobile Telecommunications System (UMTS);"LTE; Policy and Charging Control Over Rx Reference Point 3GPP TS 29.214 Version 14.6.0 Release 14)"; ETSI TS 129 214 V14.6.0 (Jan. 2018); pp. 1-85.

Radhika Gupta, "A Survey Congestion Based Routing Protocols for Better Performance of Mobile Adhoc Networks", International Journal of Advanced Research in Computer and Communication Engineering, vol. 5, Issue 7, Jul. 2016, pp. 1-3.

Michael Stewart, "CASPaR: Congestion Avoidance Shortest Path Routing for Delay Tolerant Networks", International Journal of Distributed Sensor Networks, vol. 13(11), 2017 pp. 1-15.

International Search Report for corresponding PCT/US2018/032634 dated Jul. 25, 2018.

Nokia, "Network Exposure Function", 3 pages, retrieved from Internet Apr. 6, 2020; https://www.nokia.com/networks/products/network-exposure-function/.

Sergey Slovetskiy et al., "Lightweight M2M 1.1: Managing Non-IP Devices in Cellular IoT Networks", TMobile, Ericsson, Oct. 2018, 21 pages.

Gabriel Brown et al., "Service-Oriented 5G Core Networks", Huawei Reading, Feb. 2017, 10 pages.

3GPP, 3rd Generation Partnership Project; Technical Specification Group Services and System Aspects; Procedures for the 5G System; Stage 2 (Release 15), 3GPP TS 23.502 V1.3.0 (2017-11), 11 pages.

TecTec, "4.15.3 Event Exposure using NEF", iTecTec, 21 pages, retrieved from Internet Apr. 6, 2020; https://itectec.com/spec/4-15-3-event-exposure-using-nef/.

ZTE, "ZXUN NCEE" ZTE, retrieved from Internet Apr. 6, 2020; https://sdnfv.zte.com.cn/en/products/VNF/VAS/ZXUN-NCEE.

\* cited by examiner

SUBSCRIPTION-BASED EVENT NOTIFICATION TECHNIQUES FOR REDUCING DATA BUFFERING IN MOBILE NETWORKS

TECHNICAL FIELD

The present disclosure relates generally to techniques for reducing data buffering in mobile networks for data to be delivered to user equipment (UE), and more particularly to subscription-based event notification techniques for reducing such data buffering in the mobile networks.

BACKGROUND

There is a need for techniques for reducing data buffering in mobile networks for data to be delivered to (e.g. unavailable) user equipment (UE). Relatedly, there is a need for improving techniques associated with the delivery of data to UEs in these contexts, especially for Internet of Things (IoT) devices having extended discontinuous reception (eDRX) cycles and Power Saving Modes (PSMs).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5A shows a Gi interface terminating at the SCEF entity for the delivery of IP data, FIG. 5B shows the Gi interface terminating at an application server (AS) for the delivery of IP data, and FIG. 5C shows a T6a interface for the delivery of non-IP delivery data (NIDD);

Figure 1A:
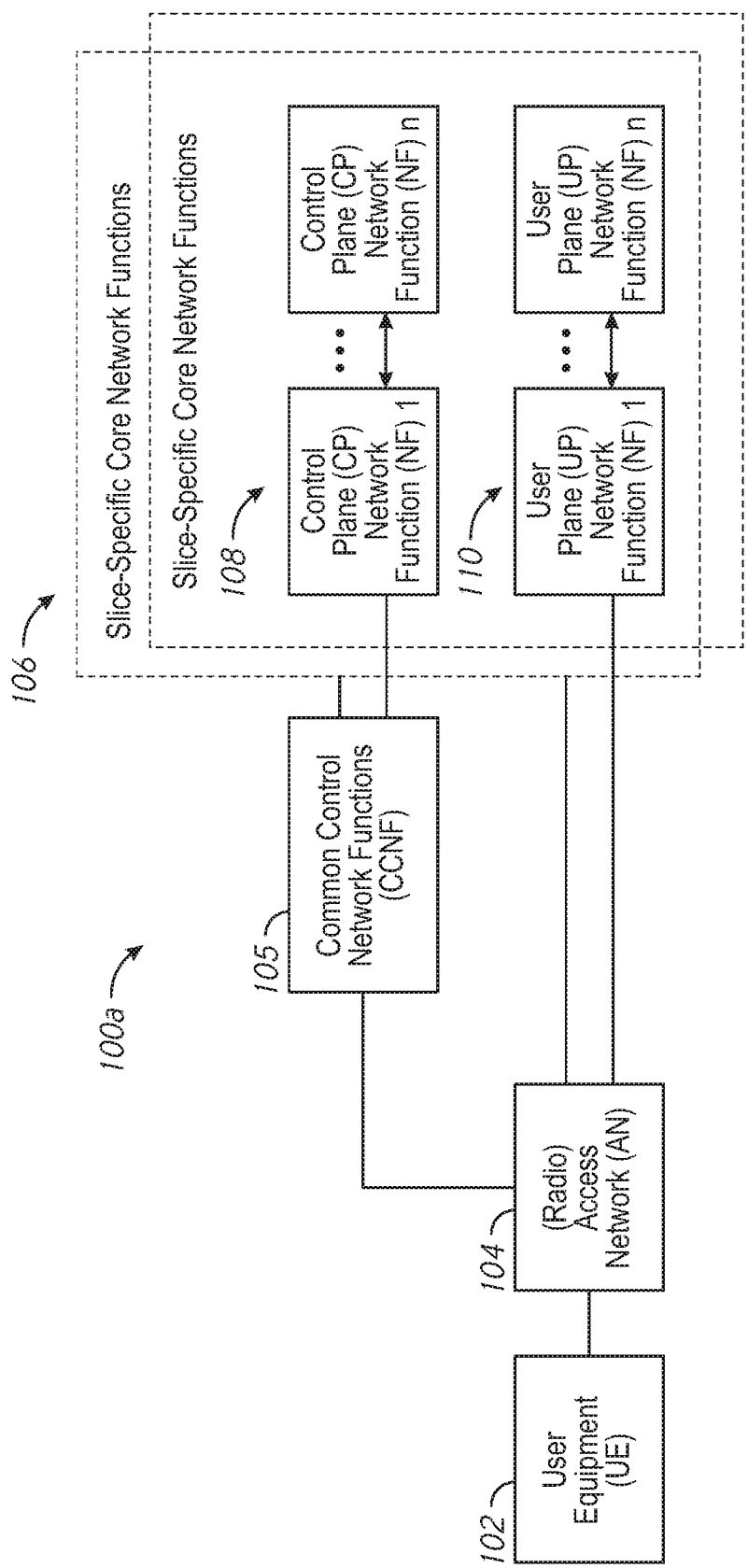
FIG. 1A is an illustrative representation of a basic network architecture of a Fifth Generation (5G) mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Subscription-based, user equipment (UE) attach notification techniques for use in a mobile network are described herein. Such techniques may reduce data buffering requirements for data to be delivered to (e.g. unavailable) UEs in the mobile network, whether the data delivery is for IP data or non-IP data.

In one illustrative example in a 5G mobile network, an event subscription request from an application server (AS) may be received at a network exposure function (NEF) entity. The event subscription request may include a list of one or more subscribed events for a UE, which may include a UE attach event and/or a UE detach event. Other events may be available for subscription, such as a delayed data delivery event. For the event subscription, a context which indicates the one or more subscribed events may be created.

Sometime during network operation, an indication of an occurrence of an event associated with the UE is received. The indication of the occurrence of the event is received from a policy and charging function (PCF) entity when the UE is configured for IP data delivery, or from an access and mobility management function (AMF) entity when the UE is configured for NIDD.

If the indicated event corresponds to one of the subscribed events, an event notification indicating the occurrence of the event is sent to the AS. When the event notification corresponds to the occurrence of a UE detach, the AS or network may thereafter refrain (temporarily) from sending data to the mobile network for delivery to the UE. On the other hand, when the event notification corresponds to the occurrence of a UE attach, and the AS or network has data to be delivered to the UE, a request for data delivery is received for the immediate delivery of data to the UE.

Example Embodiments

FIG. 1A is an illustrative representation of a network architecture 100a of a 5G mobile network. Network architecture 100a of the 5G mobile network is configured to support network slicing. In general, network architecture 100a includes common control network functions (CCNF) 105 and a plurality of slice-specific core network functions 106. A user equipment (UE) 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, Internet of Things (IoT) devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
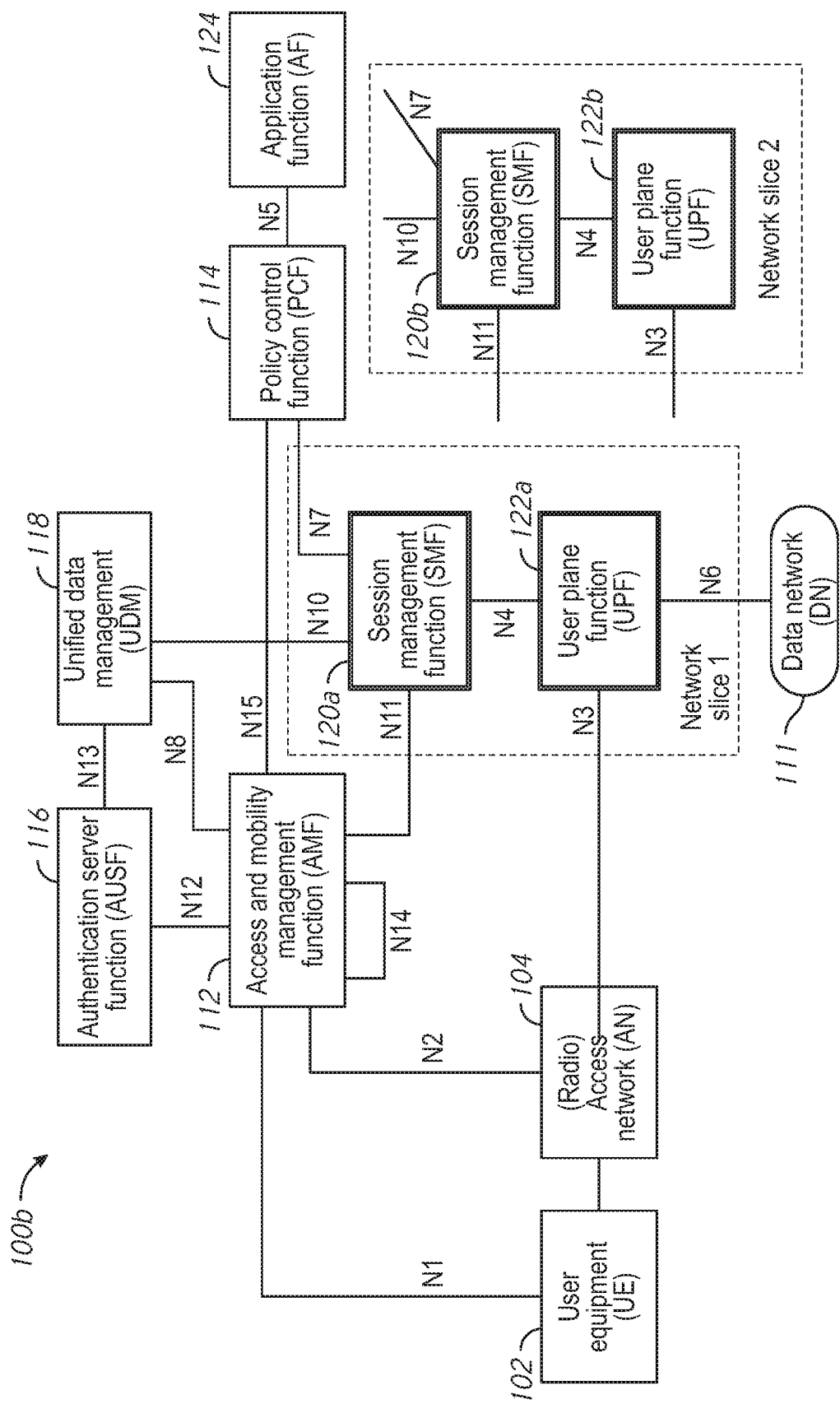
FIG. 1B is an illustrative representation of a more detailed network architecture of the 5G mobile network of FIG. 1A.

FIG. 1B is an illustrative representation of a more detailed network architecture 100b of the 5G mobile network of FIG. 1A. As provided in 3GPP standards for 5G (e.g. 3GPP 23.501), network architecture 100b for a 5G mobile network may include an authentication server function (AUSF) 116, a unified data management (UDM) 118 (having a unified data repository or UDR), an AMF 112, a policy control function (PCF) 114, an SMF 120a, and a UPF 122a. PCF 114 may connect with one or more application functions such as an application function (AF) 124. UPF 122a may connect with one or more data networks (DN) 111 to which an application server (AS) may be connected. A plurality of interfaces or reference points N1 through N15 shown in FIG. 1B may define the communications and/or protocols between each of the entities, as described in the relevant (evolving) standards documents.

UPF 122a is part of the user plane and all other NFs (i.e. AMF 112, SMF 120a, PCF 114, AUSF 116, and UDM 118) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling.

As illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

As described in the standards documents, the mobile network will generally deploy a network slice based on a network slice selection assistance information (NSSAI) provided by UE 102. During an initial attach procedure by UE 102, the NSSAI is used by RAN 104 to select the CCNF 105. The NSSF in CCNF 105 selects a network slice instance. In general, network slice instance selection may be based on the NSSAI, the data network name (DNN) of the session, subscription data of UE 102, and other parameters. An attach accept message from the network includes an accepted or allowed NSSAI for UE 102.

Figure 2:
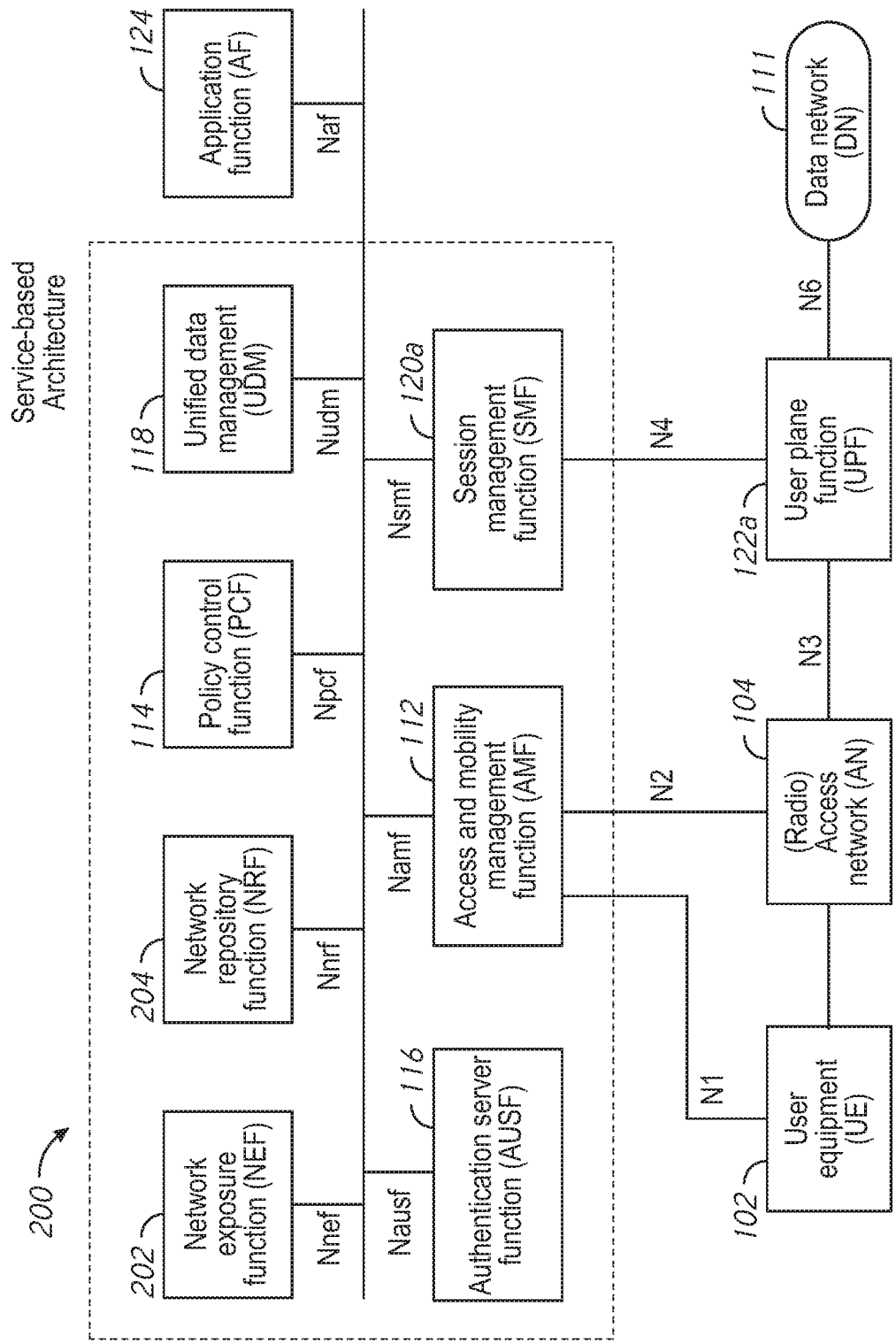
FIG. 2 is an illustrative representation of a service-based architecture of the 5G mobile network of FIGS. 1A-1B.

FIG. 2 is an illustrative representation of a service-based architecture 200 of the 5G mobile network of FIGS. 1A-1B. Additional entities in the service-based architecture 200 of FIG. 2, not shown in FIGS. 1A-1B, include a network exposure function (NEF) entity 202 and a network repository function (NRF) 204. A plurality of interfaces N1 through N6, as well as interfaces $N_{nef}$, $N_{nrf}$, $N_{pcf}$, $N_{udm}$, $N_{ausf}$, $N_{amf}$, $N_{smf}$, and $N_{af}$, may define the communications and/or protocols between each of the entities, as described in the relevant (evolving) standards.

There is a need for techniques for reducing data buffering in mobile networks for data to be delivered to (e.g. unavailable) user equipment (UE). Relatedly, there is a need for improving techniques associated with the delivery of data to UEs in these contexts, especially for Internet of Things (IoT) devices having extended discontinuous reception (eDRX) cycles and Power Saving Modes (PSMs).

FIGS. 3A, 3B, 3C, and 3D are related message flow diagrams for describing subscription-based event notification techniques for events associated with UEs in a 5G mobile network (e.g. the 5G mobile network of FIGS. 1A-1B and 2). The entities and interfaces of FIGS. 1A-1B and 2 may be configured in accordance with the relevant (evolving) standards, albeit with modification, adaptation, and/or additions provided in accordance with the techniques of the present disclosure as described herein. The techniques of FIGS. 3A, 3B, 3C, and 3D may reduce data buffering requirements in the 5G mobile network.

Figure 3A:
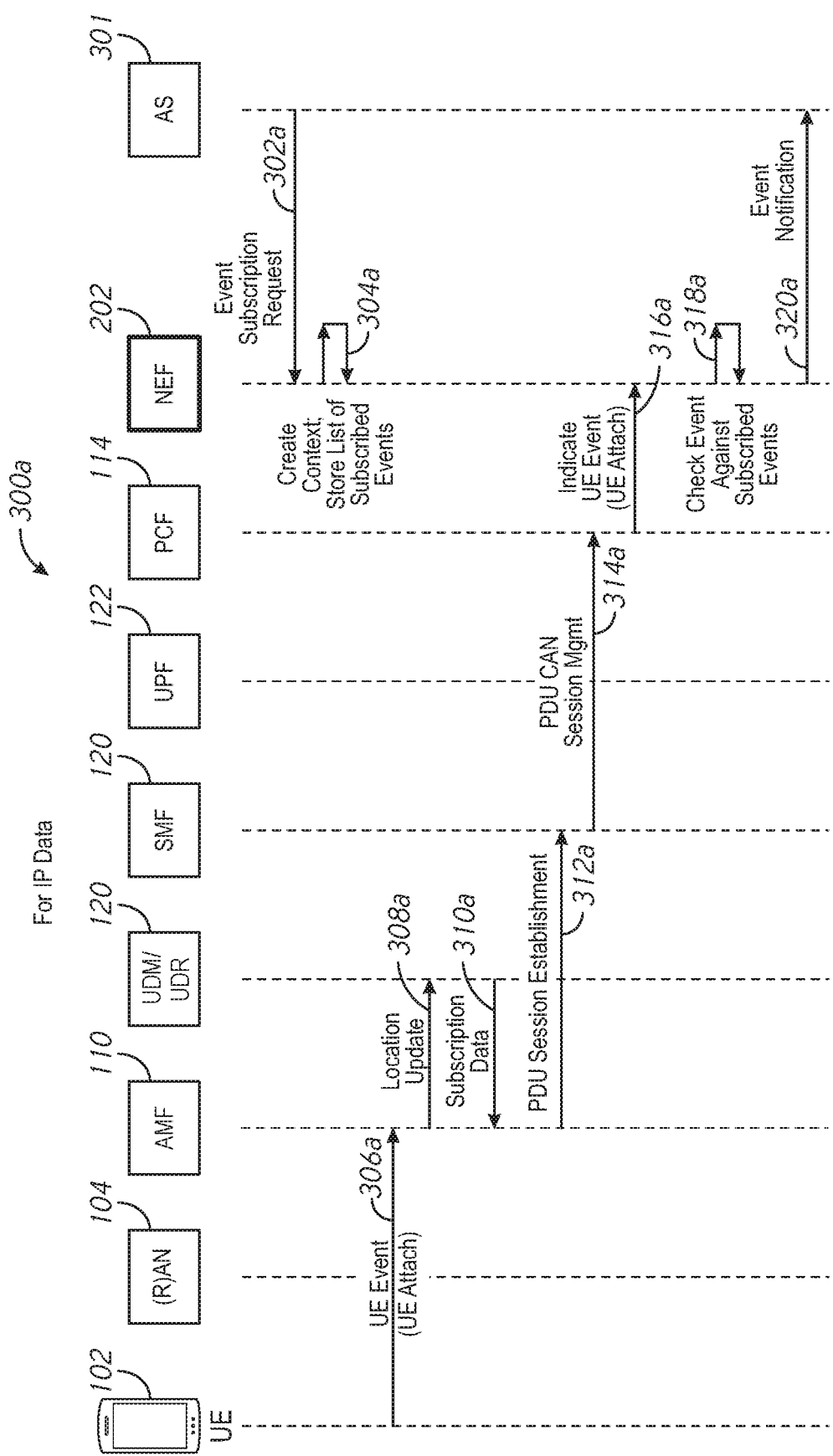
FIGS. 3A, 3B, 3C, and 3D are related message flow diagrams for describing subscription-based event notification techniques for events associated with UEs in a 5G mobile network according to some implementations, which may reduce data buffering requirements in the 5G mobile network.

More particularly, FIG. 3A is a message flow diagram 300a for describing a subscription-based event notification technique for events associated with UE 102 in the mobile network. The technique of FIG. 3A may relate to a subscription-based event notification for the delivery of IP data to UE 102. Note that the designations of "a" in the reference numbers for SMF 120 and UPF 122 have been omitted throughout the remaining description.

To begin in FIG. 3A, an application server (AS) 301 of a data network (DN) may send an event subscription request to NEF 202 (step 302a of FIG. 3A). AS 301 initiates the event subscription request. The event subscription request may include a list of one or more subscribed events associated with a UE. The one or more subscribed events may include a UE attach event and/or a UE detach event, and/or even a delayed data delivery event.

NEF 202 may receive this request from AS 301 and, in response, create a context associated with the subscription (step 304a of FIG. 3A). The context may indicate the one or more subscribed events of UE 102. The context may further indicate an identifier of AS 301 (or AS-ID), a callback IP address of AS 301, as well as an identifier of UE 102 (e.g. an external identifier or Mobile Station International Subscriber Direction Number or MSISDN).

UE 102 associated with the subscription is used in the mobile network. Having been previously detached from the network, UE 102 will (eventually) send an attach to network via RAN 104 (step 306a of FIG. 3A). This UE attach may be received by AMF 110. In response, AMF 110 may send a location update request to UDM 118 (step 308a of FIG. 3A). UDM 118 receives this request and, in response, may send to AMF 110 subscription data associated with UE 102 (step 310a of FIG. 3A). AMF 112 may receive this subscription data from UDM 118.

AMF 110 may then send to SMF 120 a PDU session establishment request for UE 102 (step 312a of FIG. 3A). AMF 110 may include at least some of the subscription data of UE 102 in this request. SMF 120 may receive this request and, in response, may send a corresponding PDU CAN session establishment message to PCF 114 (step 314a of FIG. 3A). PCF 114 may receive this message from SMF 120 and, in response, may send to NEF 202 an indication of an occurrence of the event (i.e. indication of the UE attach) associated with UE 102 (step 316a of FIG. 3A).

NEF 202 may receive this indication, and identify whether the indicated event corresponds to one of the one or more subscribed events (step 318a of FIG. 3A). NEF 202 may identify or select the appropriate context and/or list of one or more subscribed events of UE 102 based on an identifier of UE 102 (e.g. an IMSI) which is included in the received indication. If it is identified that the event corresponds to one of the subscribed events of UE 102 (e.g. a UE attach event), then NEF 202 may send to AS 301 an event notification indicating the occurrence of the event (i.e. a UE attach event notification) (step 320a of FIG. 3A). For proper notification, NEF 202 may obtain the identifier or address of AS 301 from the appropriately identified/selected context. AS 301 may receive the event notification.

If it is identified that the event does not correspond to any of the subscribed events associated with UE 102 in step 318a, then no event notification is sent and no further processing is needed. The message flow diagram 300a of FIG. 3A ends; however, processes may continue in relation to FIG. 3B or 3C as described below.

Figure 3B:
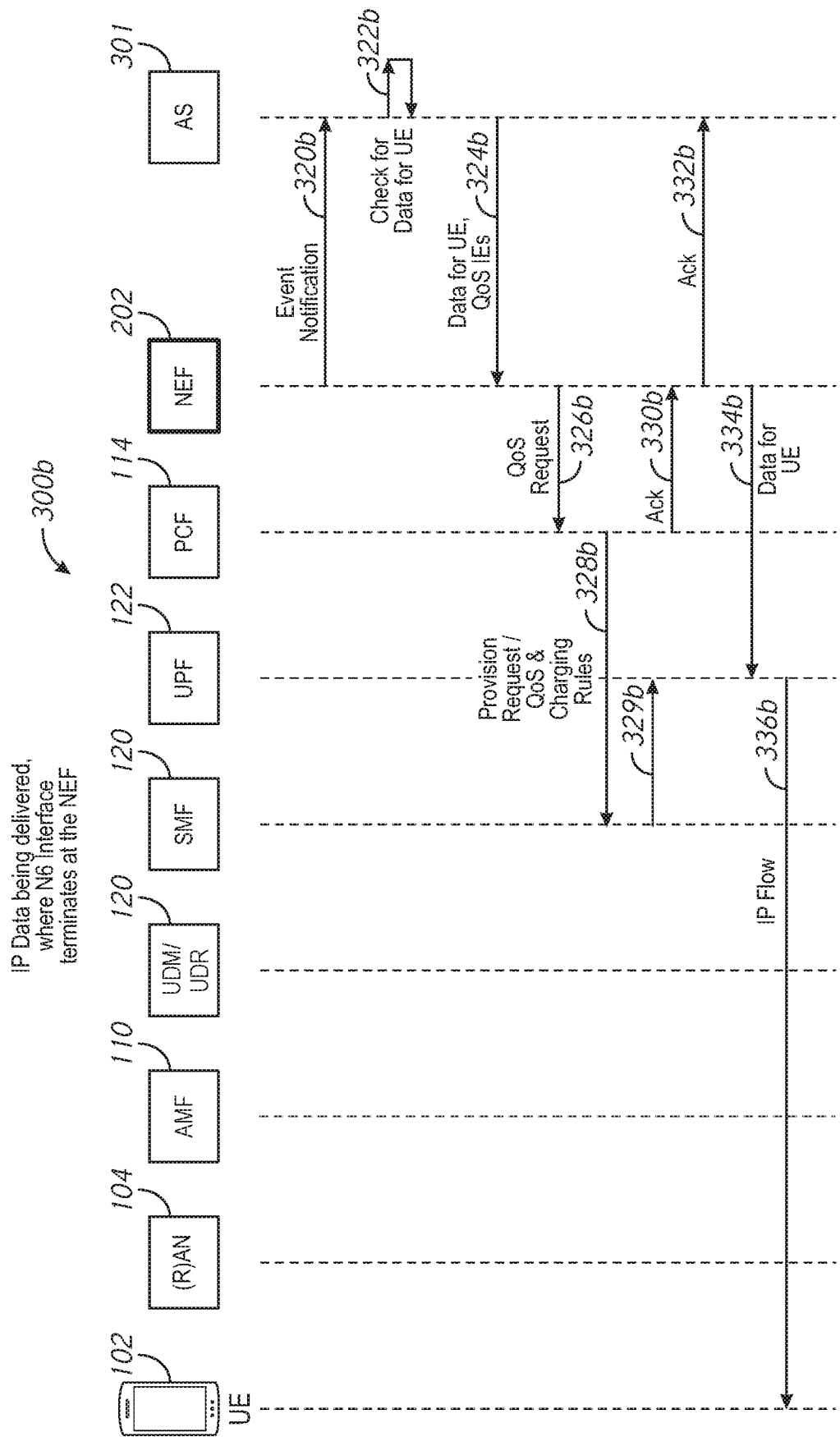

FIG. 3B is a message flow diagram 300b for describing a subscription-based event notification technique for events associated with a UE in the mobile network. The technique of FIG. 3B may be a continuation of the technique described in relation to FIG. 3A, in the context where the N6 interface terminates at NEF 202.

To begin in FIG. 3B, NEF 202 may send to AS 301 an event notification indicating the occurrence of an event (e.g. a UE attach event notification) (step 320b of FIG. 3B). This step may correspond to the event notification sent in relation to step 320a of FIG. 3A. In response, AS 301 may identify whether there are data pending at the AS 301 for delivery to UE 102 (step 322b of FIG. 3B). If there are data pending at the AS 301 for delivery to UE 102, the data may now be immediately delivered to the now-attached UE 102.

Here, AS 301 may send to NEF 202 a request for delivery of data to UE 102 (step 324b of FIG. 3B). The request for delivery of data to UE 102 may be received at NEF 202, and may include the data for UE 102 (i.e. the mobile-terminated or MT data) and quality of service (QoS) information elements (IEs) for a connection to be configured for the delivery of the data.

In response to receiving the request, NEF 202 may send to PCF 114 a QoS request which includes the QoS IEs for the connection (step 326B of FIG. 3B). PCF 114 may receive the QoS request and, in turn, may authorize the QoS request and send policies to SMF 120 that, in turn, provision the appropriate policies at the selected UPF 122 (steps 328b and 329b of FIG. 3B). PCF 114 may send to NEF 202 an acknowledgement of the request (step 330b of FIG. 3B), which in turn may send to AS 301 an acknowledgement (step 332b of FIG. 3B). In addition, NEF 202 may send the MT data for UE 102 to UPF 122 for delivery to UE 102 (step 334b of FIG. 3B). UPF 122 may send IP packets which include the MT data to UE 102 via RAN 104 (step 336B of FIG. 3B).

Figure 3C:
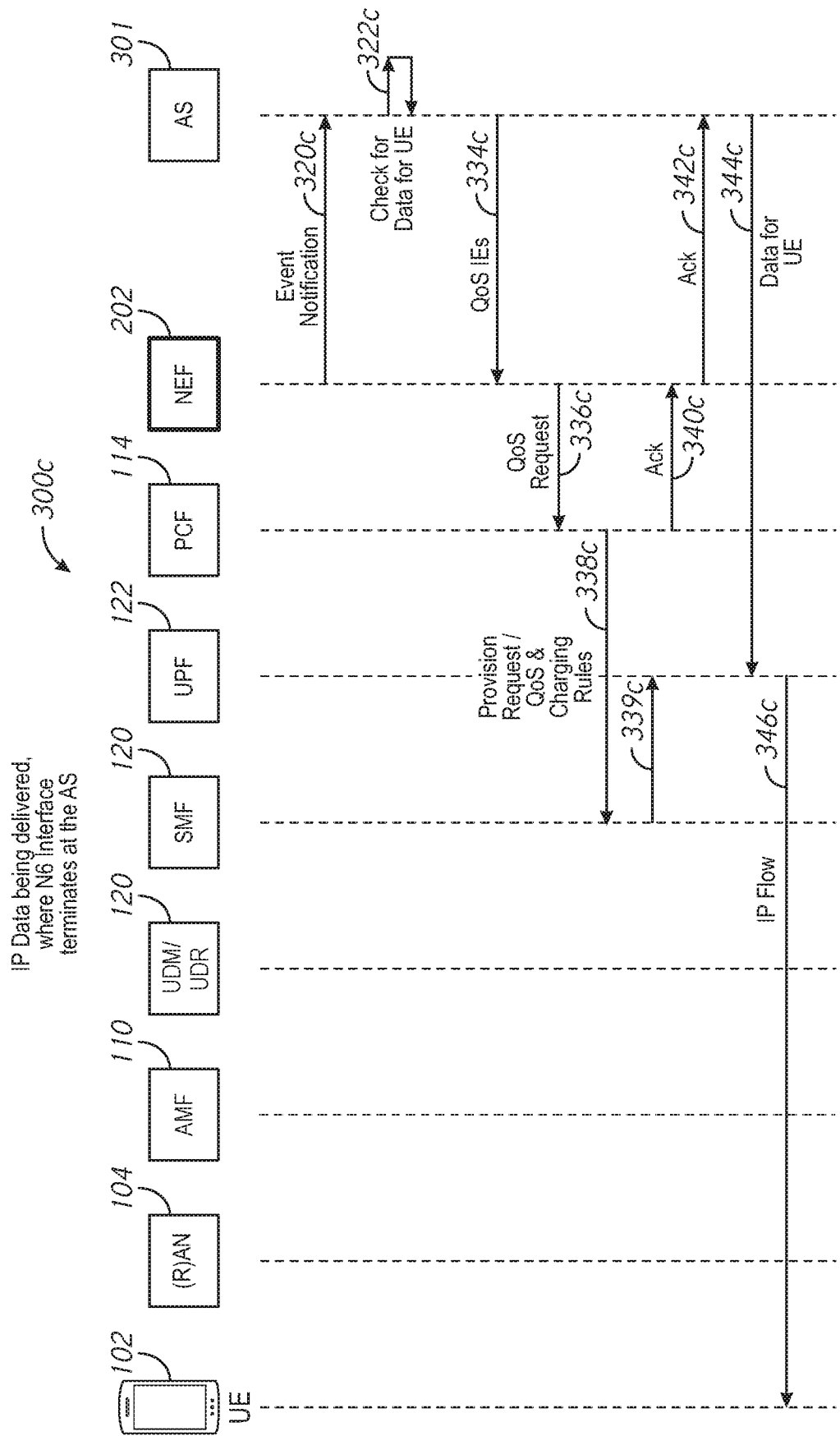

FIG. 3C is a message flow diagram 300c for describing a subscription-based event notification technique for events associated with a UE in the mobile network. The technique of FIG. 3C may be a continuation of the technique described in relation to FIG. 3A, in the context where the N6 interface terminates at AS 301.

To begin in FIG. 3C, then NEF 202 may send to AS 301 an event notification indicating the occurrence of an event (e.g. a UE attach event notification) (step 320c of FIG. 3C). This step may correspond to the event notification sent in relation to step 320a of FIG. 3A. In response, AS 301 may identify whether there are data pending at the AS for delivery to UE 102 (step 322c of FIG. 3C). If there is data pending at the AS for delivery to UE 102, the data may now be immediately delivered to the now-attached UE 102.

Here, AS 301 may send to NEF 202 a QoS request which includes QoS IEs for a connection to be configured for the delivery of data (step 334c of FIG. 3C). In response to receiving the request, NEF 202 may send to PCF 114 a corresponding QoS request which includes the QOS IEs for the connection (step 336C of FIG. 3C). PCF 114 may receive the QoS request and, in turn, authorize the QoS request and send policies to SMF 120 that, in turn, provision the appropriate policies at the selected UPF 122 (steps 338c and 339c of FIG. 3C). PCF 114 may send to NEF 202 an acknowledgement of the request (step 340c of FIG. 3C), which in turn may send to AS 301 an acknowledgement (step 342c of FIG. 3C). In addition, AS 301 may send the MT data for UE 102 to UPF 122 for delivery to UE 102 (step 344c of FIG. 3C). UPF 122 may send IP packets which include the MT data to UE 102 via RAN 104 (step 346C of FIG. 3C).

Figure 3D:
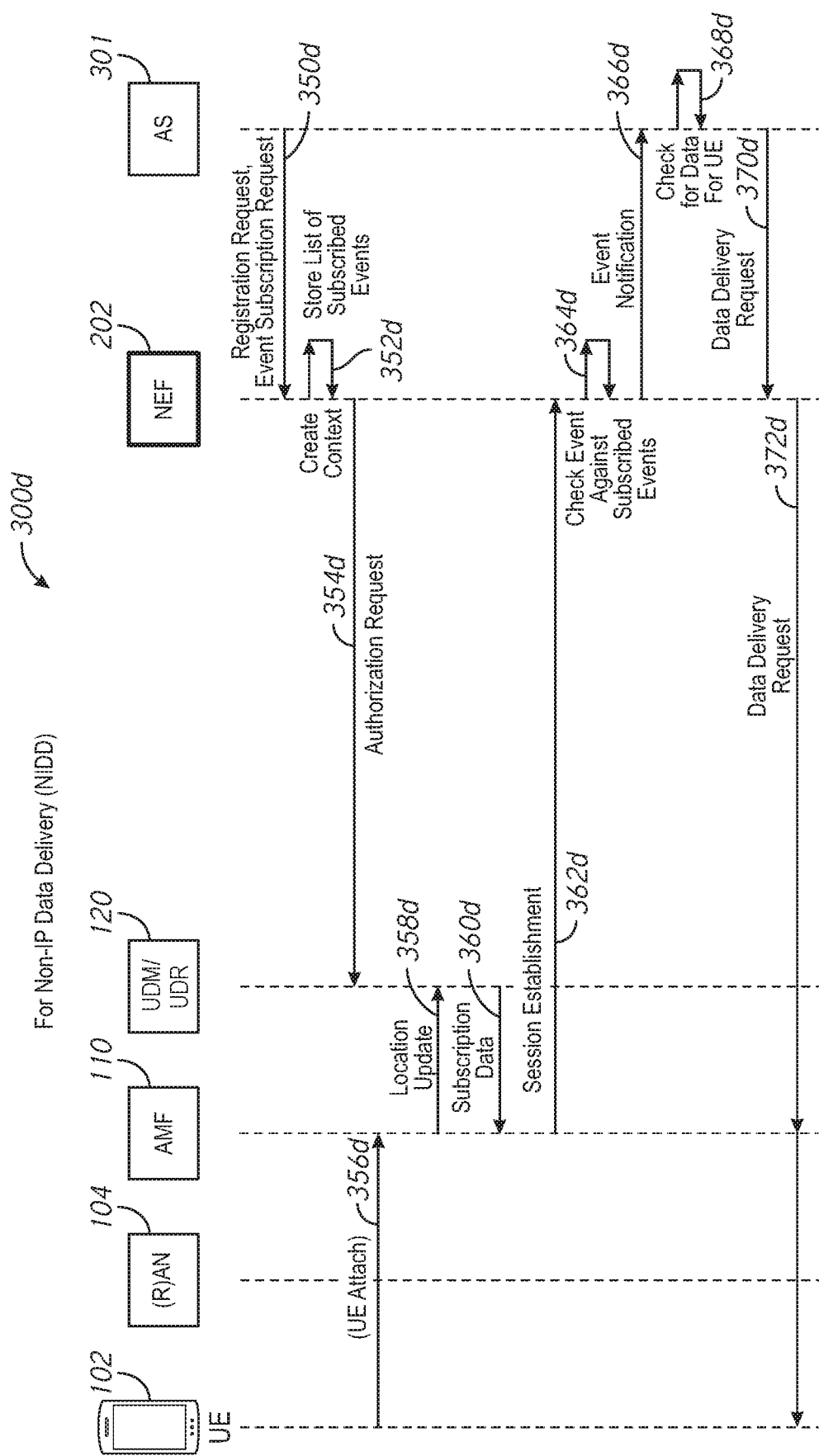

FIG. 3D is a message flow diagram 300d for describing a subscription-based event notification technique for events associated with a UE in the mobile network. The technique of FIG. 3D may be employed for non-IP data delivery (NIDD) for UEs.

To begin in FIG. 3D, AS 301 may send a registration request to NEF 202 (e.g. a NIDD registration request) and may also send an event subscription request to NEF 202 (step 350d of FIG. 3D). The request may include an identifier of UE 102 (e.g. an external identifier, such as an MSISDN). The event subscription request may include a list of one or more subscribed events associated with a UE. The one or more subscribed events may include a UE attach event and/or a UE detach event.

NEF 202 may receive these requests from AS 301 and, in response, create a context associated with the subscription (step 352*d* of FIG. 3D). The context may indicate the one or more subscribed events of UE 102. The context may further indicate an application server identifier (ID), a callback IP address of AS 301, as well as an identifier of UE 102 (e.g. an external identifier such as the MSISDN). NEF 202 may receive authorization for the AS or UE from UDM 118 based on an authorization request submitted to UDM 118 (step 354*d* of FIG. 3D).

UE 102 associated with the subscription is used in the mobile network. Having been previously detached from the network, UE 102 will (eventually) send an attach to network via RAN 104 (step 356D of FIG. 3D). This UE attach may be received by AMF 110. In response, AMF 110 may send a location update request to UDM 118 (step 358*d* of FIG. 3D). UDM 118 receives this request and, in response, may send to AMF 110 subscription data associated with UE 102 (step 360*d* of FIG. 3D). AMF 110 may receive this subscription data from UDM 118.

AMF 110 may then send to NEF 202 a session establishment request for UE 102 (step 362*d* of FIG. 3D). AMF 110 may include at least some of the subscription data of UE 102 in this request. NEF 202 may receive this request, which is an indication of an occurrence of an event (i.e. an indication of the UE attach) associated with UE 102. NEF 202 may identify whether the indicated event corresponds to one of the one or more subscribed events (step 364*d* of FIG. 3D). NEF 202 may identify or select the appropriate context and/or list of one or more subscribed events of UE 102 based on an identifier of UE 102 (e.g. an IMSI) which is included in the received request/indication.

If it is identified that the event corresponds to one of the subscribed events of UE 102 (e.g. a UE attach event), then NEF 202 may send to AS 301 an event notification indicating the occurrence of the event (i.e. a UE attach event notification) (step 366D of FIG. 3D). For proper notification, NEF 202 may obtain the identifier or address of AS 301 from the appropriately identified/selected context. AS 301 may receive the event notification. If it is identified that the event does not correspond to any of the subscribed events associated with UE 102 in step 364*d*, then no event notification is sent and no further processing is needed.

In response to receiving an event notification, AS 301 may identify whether there is data pending at the AS for delivery to UE 102 (step 368*d* of FIG. 3D). If there is data pending at the AS for delivery to UE 102, the data may now be immediately delivered to the now-attached UE 102. Here, AS 301 may send to NEF 202 a request for delivery of data to UE 102 (step 370*d* of FIG. 3D). The request for delivery of data to UE 102 may be received at NEF 202, and may include the data for UE 102 (i.e. the mobile-terminated or MT data). NEF 202 may send a corresponding request for MT data delivery for UE 102 to AMF 110 for delivery to UE 102 (step 372*d* of FIG. 3D). The message flow diagram 300*d* of FIG. 3D ends.

Figure 4A:
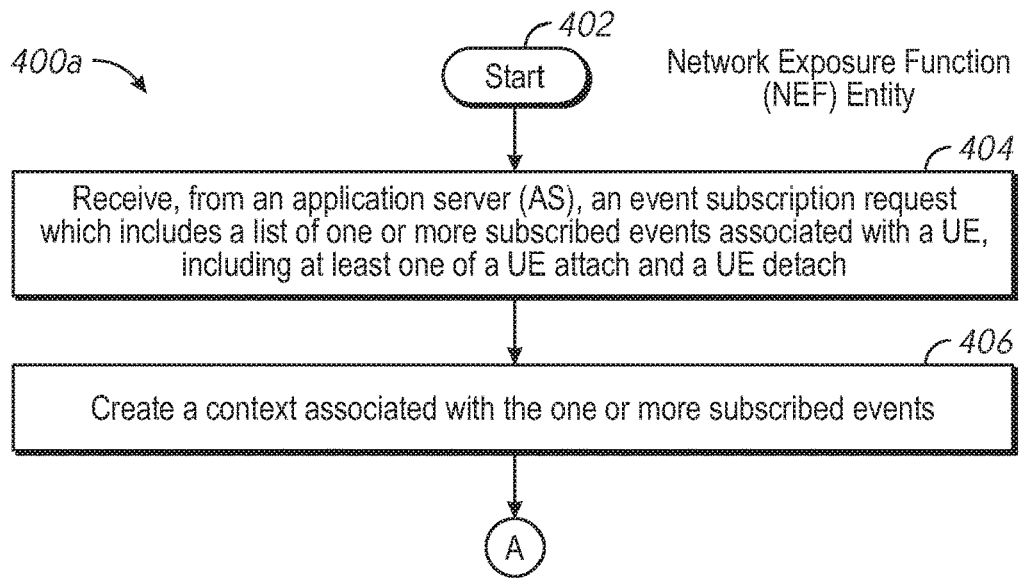
FIGS. 4A and 4B are related flowcharts for describing subscription-based event notification techniques for events associated with UEs in a 5G mobile network according to some implementations, which may be embodied in a network exposure function (NEF) entity of the 5G mobile network, and may reduce data buffering requirements in the 5G mobile network.
Figure 4B:
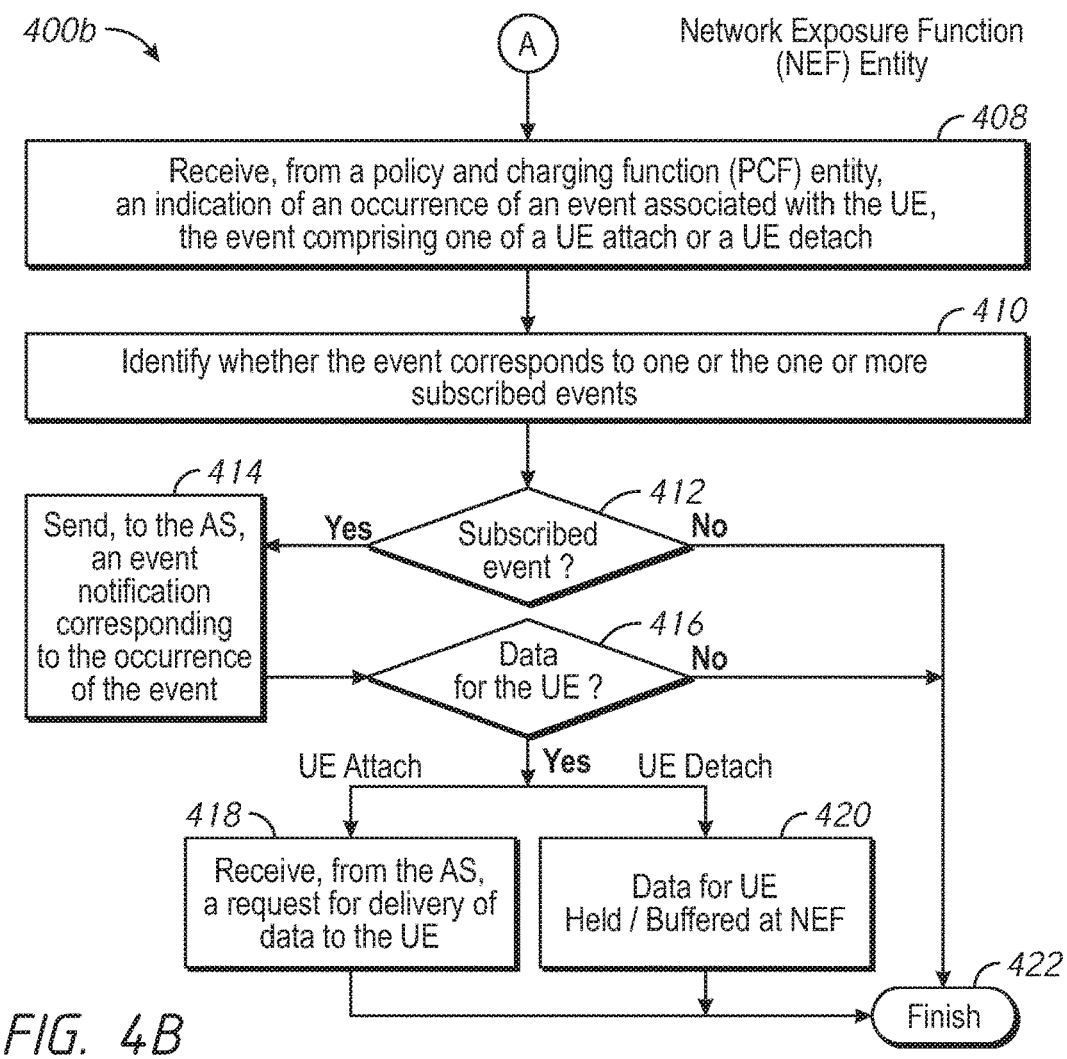

FIGS. 4A and 4B are related flowcharts 400*a* and 400*b* for describing a subscription-based event notification technique for events associated with a UE in a 5G mobile network. The techniques may be employed by an NEF entity. The techniques of FIGS. 4A and 4B may reduce data buffering requirements in the 5G mobile network.

Beginning at a start block 402 of flowchart 400*a* of FIG. 4A, the NEF entity may receive, from an application server (AS), an event subscription request (step 404 FIG. 4A). The event subscription request may include a list of one or more subscribed events associated with a UE. The one or more subscribed events may include a UE attach event and/or a UE detach event. In response, the NEF entity may create a context associated with the subscription (step 406 of FIG. 4A). The context may indicate the one or more subscribed events of the UE. The context may further include an identifier or address the AS, as well as an identifier of the UE (e.g. IMSI). The method of flowchart 400*a* of FIG. 4A ends; however, processes may continue as described in relation to FIG. 4B through a connector A.

Referring now to the flowchart 400*b* of FIG. 4B, the UE associated with the subscription is used in the mobile network. Beginning through connector A of FIG. 4B, the NEF entity may receive an indication of an occurrence of an event associated with the UE (step 408 of FIG. 4B). The event may be, for example, a UE attach event or a UE detach event. The indication may be received from a policy and charging function (PCF) entity in the mobile network.

The NEF entity may identify whether the event corresponds to one of the one or more subscribed events (step 410 of FIG. 4B). Here, the NEF entity may identify or select the appropriate context and/or list of one or more subscribed events of the UE based on an identifier of the UE (e.g. an IMSI) included in the received indication. If it is identified that the event does not correspond to any one of the subscribed events ("No" branch in step 412 of FIG. 4B), then the method ends at a finish block 420 of FIG. 4B. On the other hand, if it is identified that the event corresponds to any one of the subscribed events of the UE (the "Yes" branch in step 412 of FIG. 4B), then the NEF entity may send, to the AS, an event notification indicating the occurrence of the event (step 414 of FIG. 4B). For proper notification, the NEF entity may obtain the identifier or address of the AS from the appropriately identified/selected context.

When there is no data pending at the AS for delivery to the UE ("No" branch at step 416 of FIG. 4B), then the flowchart ends at a finish block 422 of FIG. 4B. When there is data pending at the AS for delivery to the UE ("Yes" branch at step 416 of FIG. 4B), and the event is a UE attach, the NEF entity may receive, from the AS, a request for delivery of data to the UE (step 418 of FIG. 4B). The data may be immediately delivered to the now-attached UE. When there are data pending at the AS for delivery to the UE ("Yes" branch at step 416 of FIG. 4B), and the event is a UE detach, the data is held or buffered at the NEF entity (or e.g. the AS) (indication 420 of FIG. 4B); the AS may thereafter refrain (temporarily) from sending data to the mobile network for delivery to the UE. The flowchart ends at the finish block 422 of FIG. 4B.

In some implementations of FIGS. 4A-4B, the data delivery is for IP data where the NEF entity interacts with the PCF entity to receive event notifications as described; when data delivery is for non-IP data, however, the NEF entity interacts with the AMF entity to receive event notifications.

In some other implementations, a group identifier of a group of subscribers may be utilized in the methods of FIGS. 3A-3D and FIGS. 4A-4B. The group identifier of the group may be associated with a plurality of subscriber or UE identifiers (e.g. IMSIs). Here, the group identifier may be included in the event subscription request from the AS to the NEF entity, and also may be indicated in the context created at the NEF entity. In addition or alternatively, the plurality of subscriber or UE identifiers associated with the group identifier may be provisioned in the UDM and obtained from the UDM by a requesting entity (e.g. the NEF entity) as needed. In addition or alternatively, the group identifier may be provided in the indication of the occurrence of the event from the PCF to the NEF entity, and utilized for the checking of the indicated event against the subscribed events at the NEF entity.

Figure 5A:
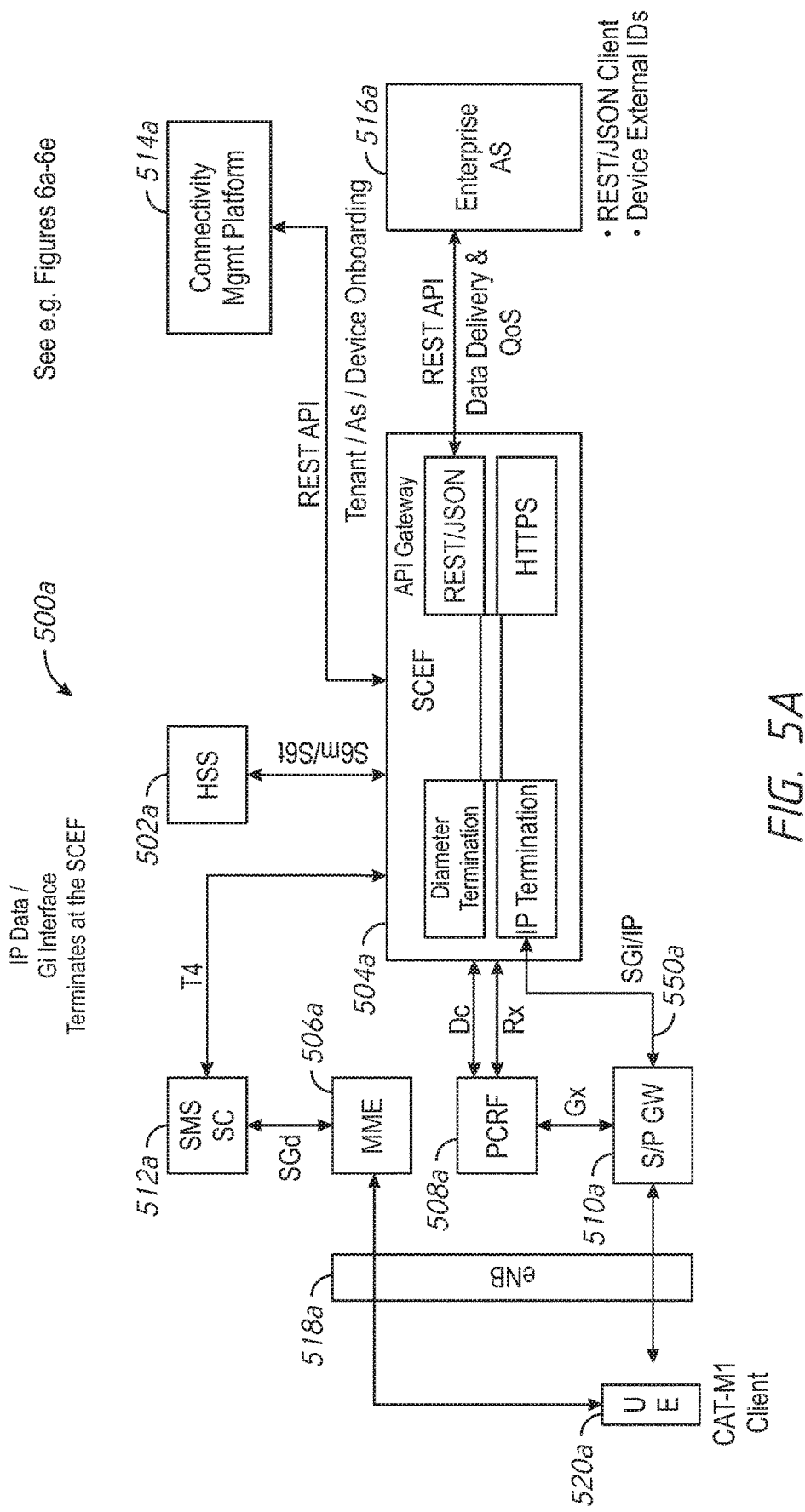
FIGS. 5A, 5B, and 5C are illustrations of variations of network architecture of a Fourth Generation (4G)/Long Term Evolution (LTE) mobile network, where a service capability exposure function (SCEF) entity may be utilized in the techniques, and where
Figure 5B:
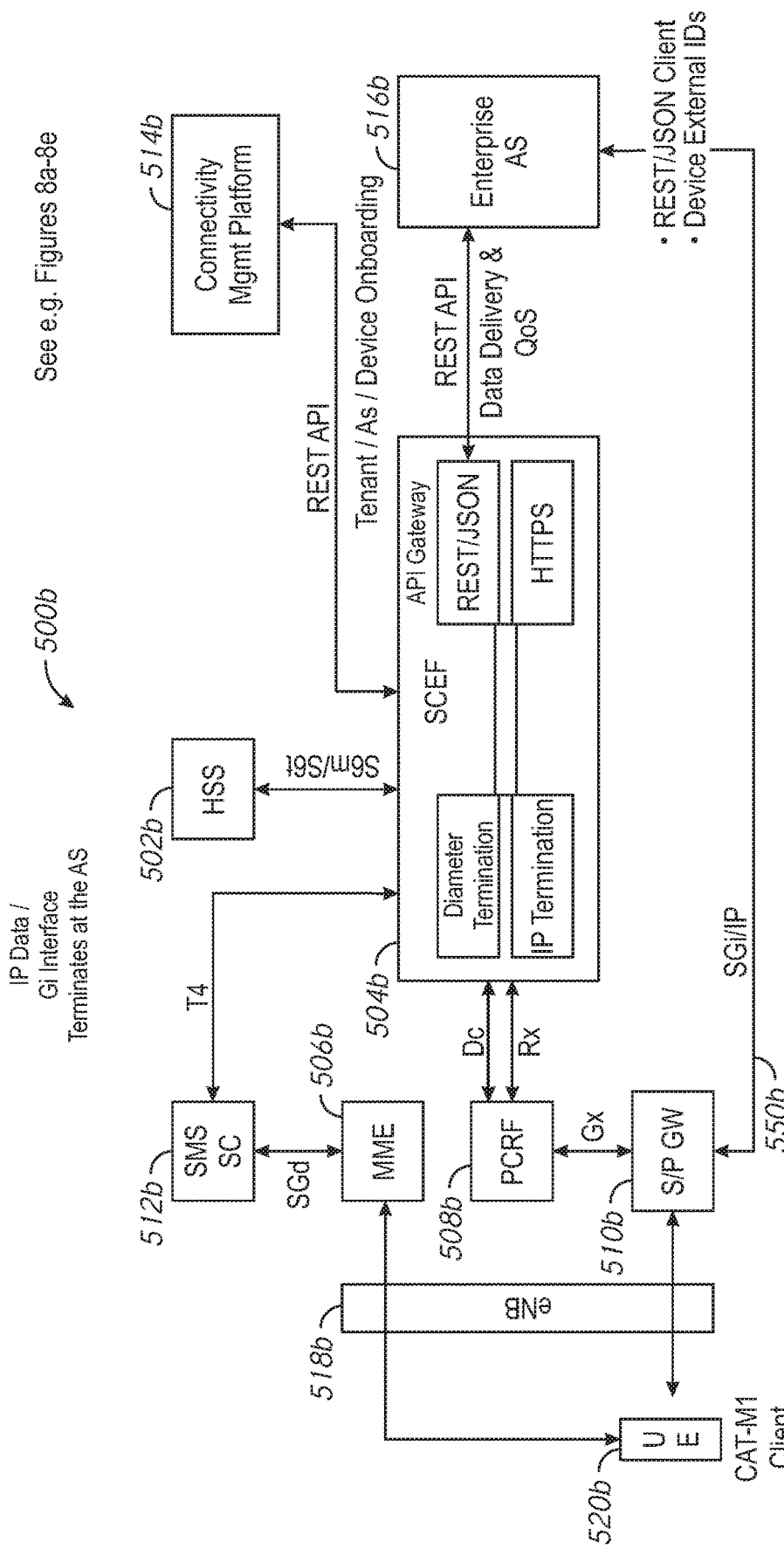
Figure 5C:
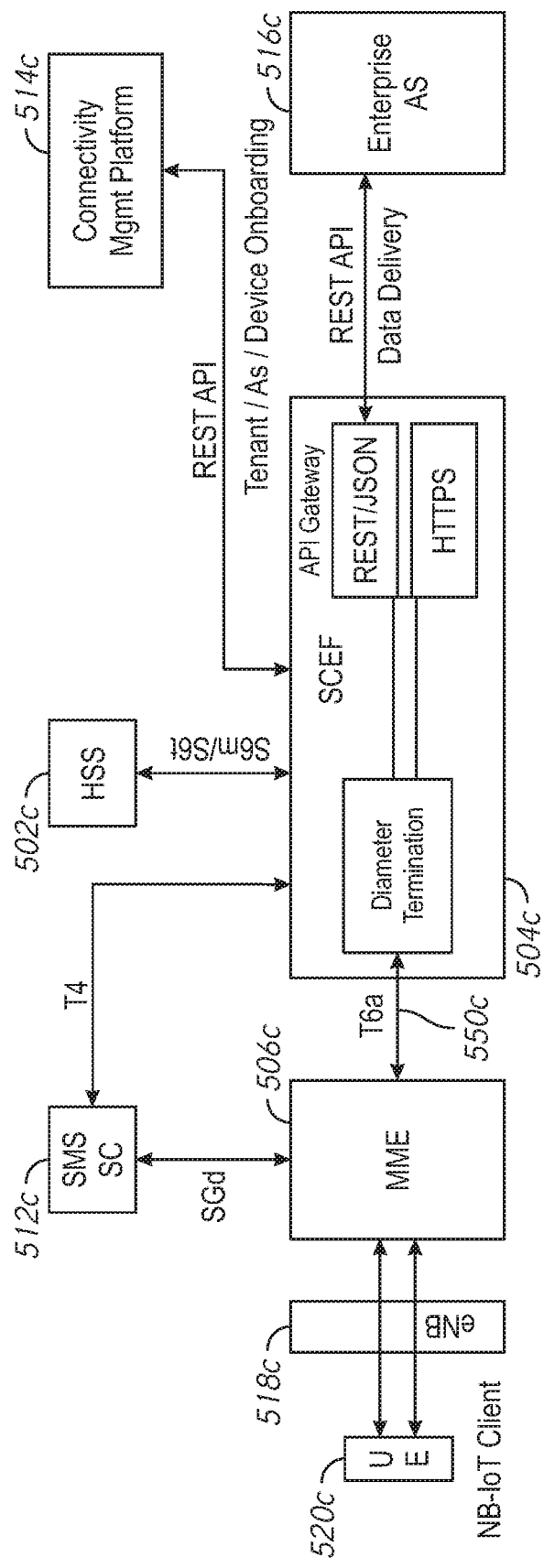

FIGS. 5A, 5B, and 5C are illustrations of variations of network architecture of a fourth generation (4G)/Long Term Evolution (LTE) mobile network which may incorporate methods and apparatus of the present disclosure, where FIG. 5A shows a Gi interface terminating at the SCEF for the delivery of IP data, FIG. 5B shows a Gi interface terminating at an application server (AS) for the delivery of IP data, and FIG. 5C shows a T6a interface utilized for non-IP data delivery (NIDD).

More particularly, FIG. 5A is an illustration of a network architecture 500a of a 4G/LTE-based mobile network which may incorporate methods and apparatus of the present disclosure. Network architecture 500a of FIG. 5A is shown to include a home subscriber server (HSS) 502a, a service capability exposure function (SCEF) 504a, a mobility management entity (MME) 506a, a policy and charging rules function (PCRF) 508a, and a serving/packet (S/P) gateway (GW) 510a. Also included in network architecture 500a is a short messaging service (SMS) service center (SC) (SMS-SC) 512a and a connectivity management platform 514a. UEs, such as a UE 520a, may connect to the mobile network for (e.g. radio) communications via one or more base stations or eNodeB (eNB) 518a. An application server (AS), such as an enterprise AS, may communicate data to an/or from UE 520a via the mobile network. The entities in network architecture 500a may be interfaced and connected as further indicated and illustrated in FIG. 5A.

In the network architecture 500a of FIG. 5A, a connection 550a for a Gi interface is shown to terminate at the SCEF 504a for the delivery of IP data. Related message flows for subscription-based event notification techniques for network architecture 500a of FIG. 5A are shown and described below in relation to FIGS. 6A, 6B, 6C, 6D, and 6E.

In FIG. 5B, network architecture 500b is substantially the same as network architecture 500a of FIG. 5A (where "b" suffixes replace the "a" suffixes of the reference numerals for the same/similar entities), except that a connection 550b for the S/B Gi interface is shown to terminate at the AS 516b for the delivery of IP data. Related message flows for subscription-based event notification techniques for network architecture 500b of FIG. 5B are shown and described below in relation to FIGS. 8A, 8B, 8C, 8D, and 8E.

In FIG. 5C, network architecture 500c is substantially similar to network architecture 500a of FIG. 5A (where "c" suffixes replace the "a" suffixes of the reference numerals for the same/similar entities, where PCRF 508a and GW 510a are excluded), except that a connection 550c for a T6 interface is used for the delivery of non-IP data (i.e. for non-IP data delivery or NIDD). Related message flows for subscription-based event notification techniques for this network architecture 500c of FIG. 5C are shown and described below in relation to FIGS. 9A, 9B, 9C, and 9D.

There is a need for techniques for reducing data buffering of data to be delivered to (e.g. unavailable) UEs in mobile networks, such as 4G/LTE-based mobile networks. There is an associated need for improving techniques related to the delivery of data to UEs in these contexts, especially for Internet of Things (IoT) devices having extended discontinuous reception (eDRX) cycles and Power Saving Modes (PSMs).

Figure 6A:
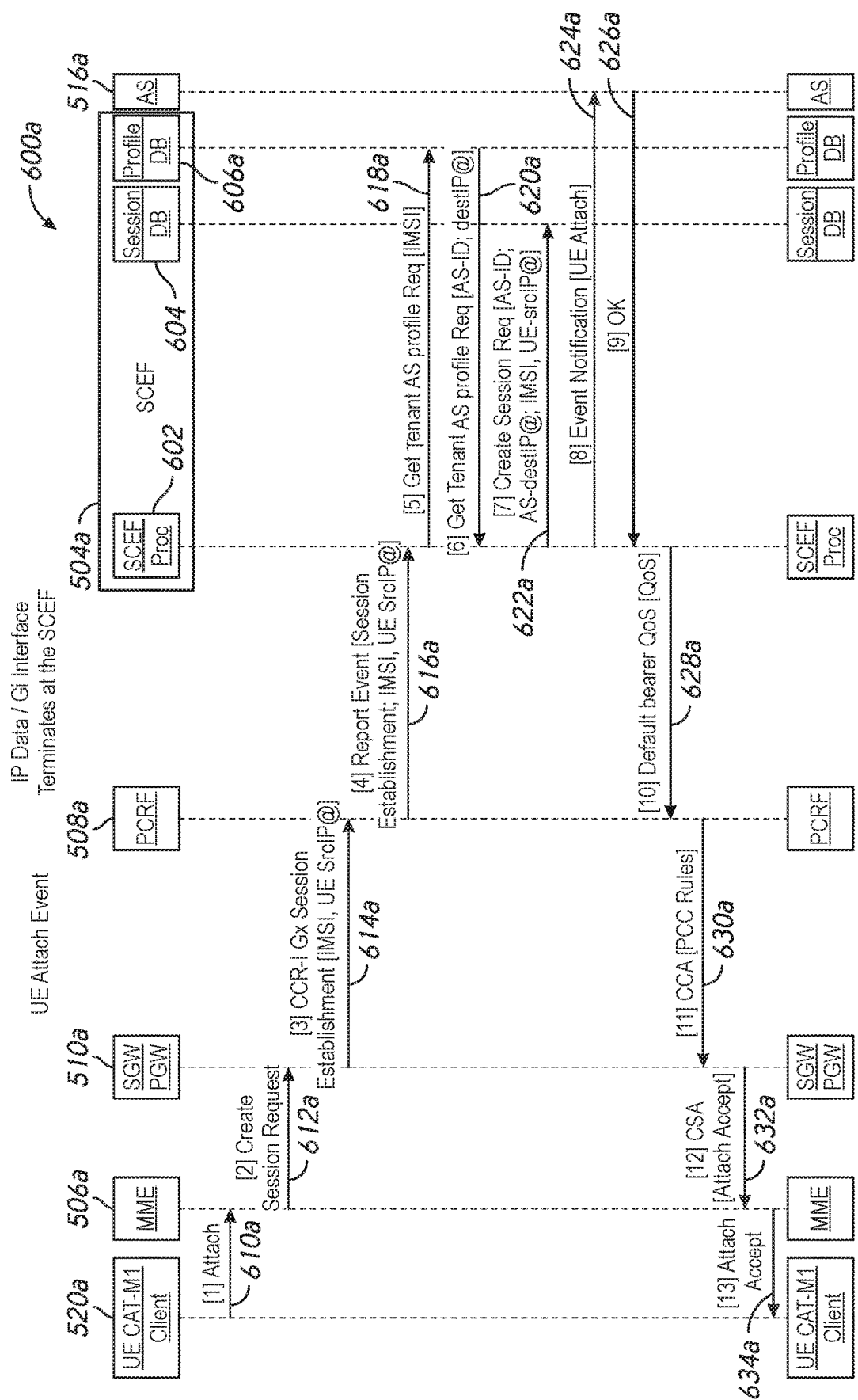
FIGS. 6A, 6B, 6C, 6D, and 6E (where FIG. 6C is comprised of FIGS. 6C-1 and 6C-2, and FIG. 6D is comprised of FIGS. 6D-1 and 6D-2) are related message flow diagrams for describing subscription-based event notification techniques for events associated with UEs in a 4G/LTE-based mobile network according to some implementations, which may employ the network architecture of FIG. 5A (i.e. for IP data where the Gi interface terminates at the SCEF), and may reduce data buffering requirements in the mobile network.
Figure 6B:
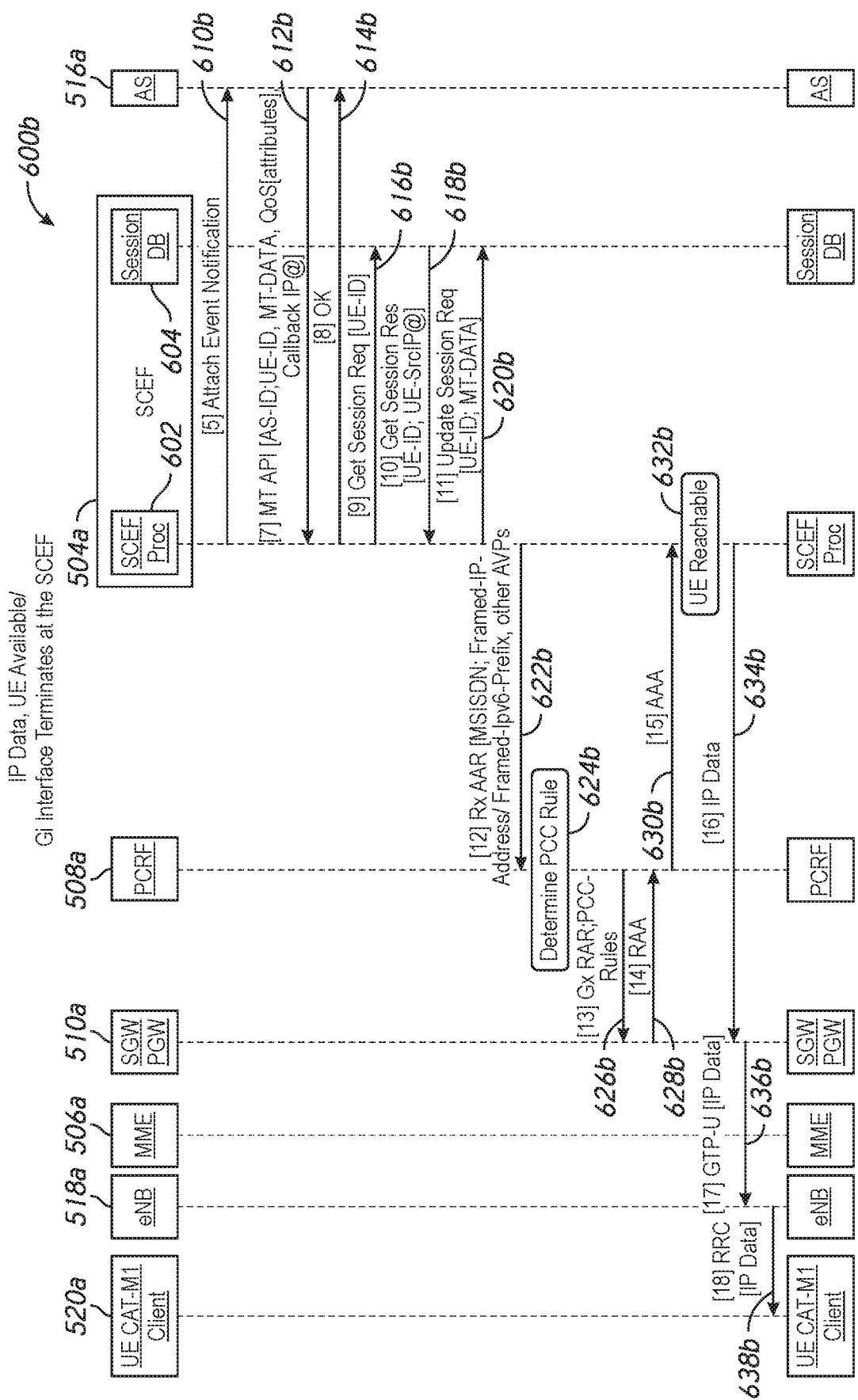
Figures 1, 6C:
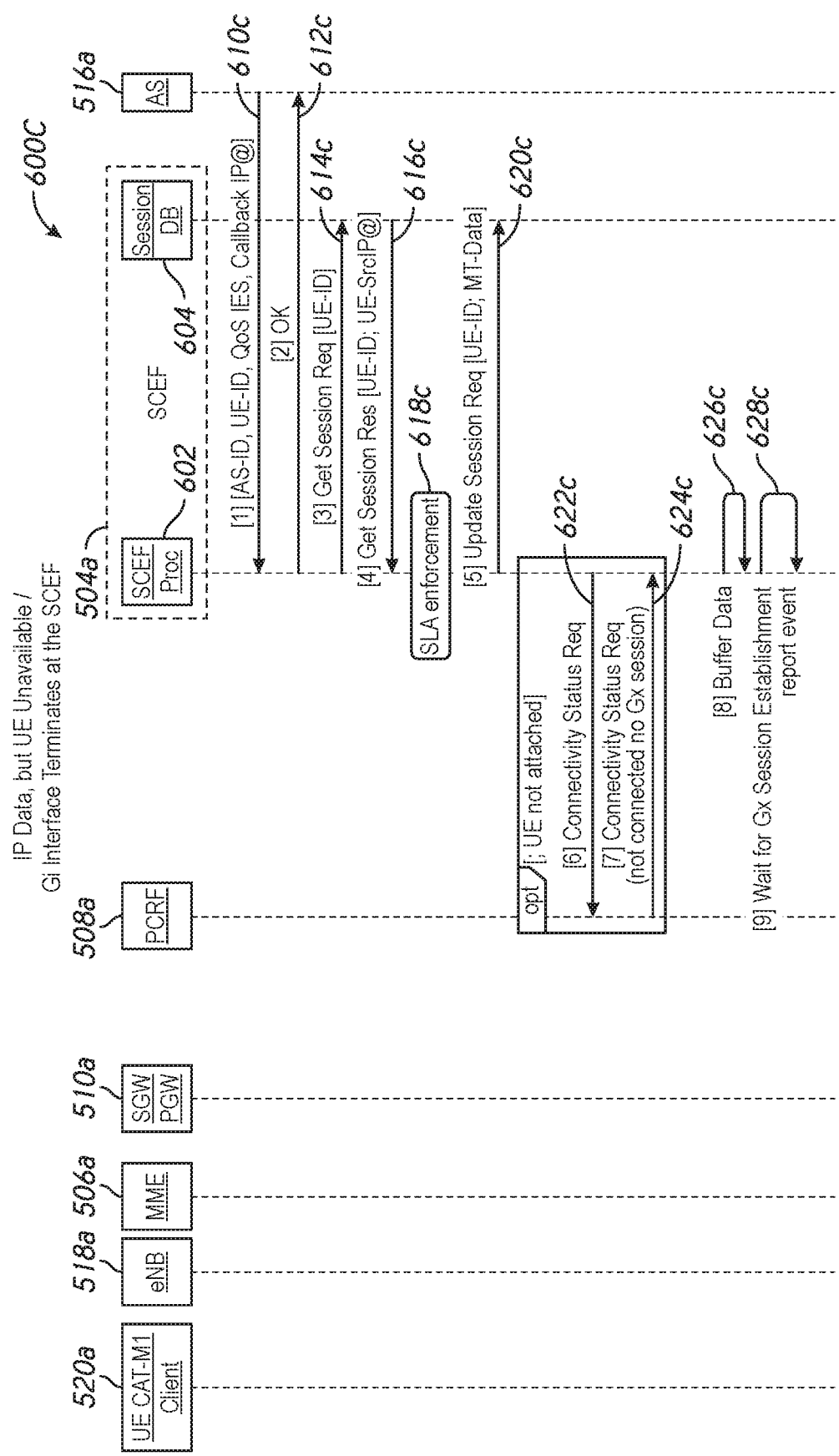
Figures 2, 6C:
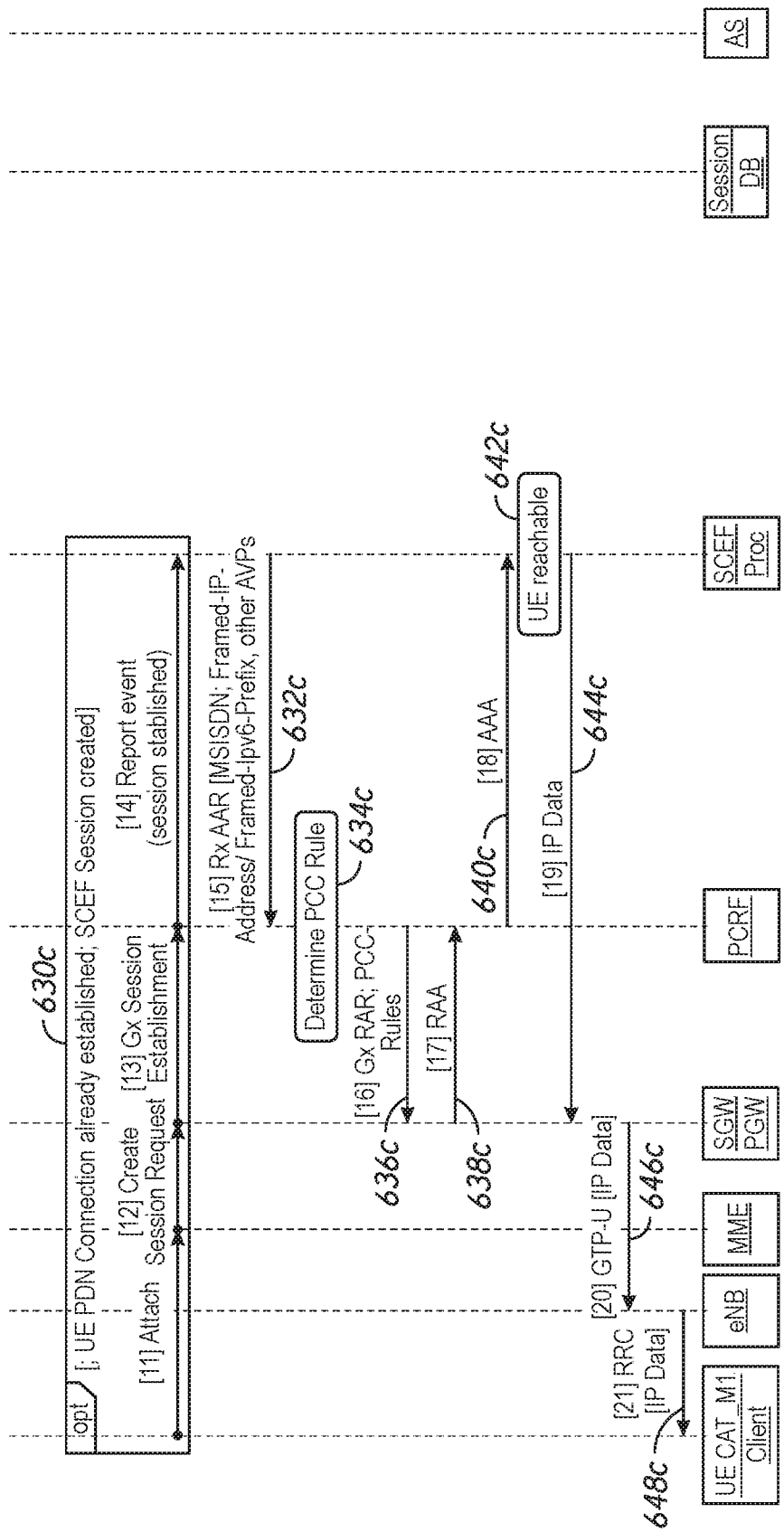

FIGS. 6A, 6B, 6C, 6D, and 6E (where FIG. 6C is comprised of FIGS. 6C-1 and 6C-2, and FIG. 6D is comprised of FIGS. 6D-1 and 6D-2) are related message flow diagrams for describing subscription-based event notification techniques for events associated with UEs in a 4G/LTE-based mobile network according to some implementations. The technique of FIGS. 6A, 6B, 6C, 6D, and 6E may employ the network architecture of FIG. 5A (i.e. for IP data where the Gi interface terminates at the SCEF). Such a technique may reduce data buffering requirements in the mobile network.

More particularly, FIG. 6A is a message flow diagram 600a for describing a subscription-based event notification technique for events associated with UEs in a 4G/LTE-based mobile network. In FIG. 6A, UE 520a is shown to be or include a CAT-M1 client or device. In addition, SCEF 504a is shown to include an SCEF processor 602, a session database (DB) 604, and a profile DB 606.

To begin in FIG. 6A, UE 520a associated with an event subscription is used in the mobile network. Having been previously detached from the network, UE 520a will (eventually) send an attach to network (step 610a of FIG. 6A). This UE attach may be received at MME 506a. In response, MME 506a may send a create session request to GW 510a (step 612a of FIG. 6A). GW 510a may receive this request and, in response, send a credit control request (CCR), Gx session establishment message to PCRF 508a (step 614a of FIG. 6A). This request may include an identifier of the UE 520a (e.g. an IMSI) and a source IP address of the UE 520a.

PCRF 508a may receive this message and, in response, send an event reporting message to SCEF 504a (step 616A of FIG. 6A). This message may indicate the UE event, and/or include the request or message from step 614a (i.e. the session establishment message). SCEF 504a (or more particularly, its SCEF processor 602) may receive this message and, in response, send to profile DB 606 a request to get a tenant AS profile (step 618a of FIG. 6A). This request may include the identifier of UE 520a (e.g. an IMSI).

Profile DB 606 may receive this request and, in response, send back to SCEF processor 602 a tenant AS profile of the AS associated with UE 520a (step 620a of FIG. 6A). The retrieved tenant AS profile may include an identifier of AS 516a (e.g. an AS-ID) and a destination IP address of AS 516a. SCEF 504a (or more particularly, its SCEP processor 602) may then send a create session request message to session DB 604 (step 622a of FIG. 6A). This request may include the identifier of AS 516a (i.e. the AS-ID), the destination IP address of AS 516a, the identifier of UE 520a (e.g. the IMSI), and the source IP address of UE 520a.

Using this information, SCEF 504a (or more particularly, its SCEP processor 602) may send an event notification to AS 516a (step 624a of FIG. 6A). The event notification may indicate the occurrence of the event associated with UE 520a (i.e. the UE attach). AS 516 may receive the event notification and, in response, send an OK or acknowledgment message to SCEF 504 (or more particularly, its SCEP processor 602) (step 626A of FIG. 6A).

SCEF 504 may then send to PCRF 508a a request for a (default) bearer (step 628a of FIG. 6A). The request may include QoS parameters associated with the bearer. PCRF 508a may receive this request and, in response, generate and send to GW 510a a credit control answer (CCA) which includes policy and charging control (PCC) rules (step 630a of FIG. 6A). GW 510a may receive this message and, in response, send to MME 506a a create session answer (CSA) which includes an attach accept (step 632a of FIG. 6A). MME 506a may receive the CSA and, in response, send the attach accept to UE 520a (step 634a of FIG. 6A). UE 520a may receive the attach accept.

FIG. 6B is a message flow diagram 600b for describing a subscription-based event notification technique for events associated with UEs in a 4G/LTE-based mobile network. The technique of FIG. 6B may be a continuation of the technique of FIG. 6A, where IP data is to be delivered to a UE that is available in the mobile network.

To begin in FIG. 6B, an event notification indicating a UE attach is sent from SCEF 504a to AS 516a (step 610b of FIG. 6B). AS 516a may receive the event notification and, in response, send a mobile terminated (MT) data API message to SCEF 504a (step 612b of FIG. 6B). The MT data API message may include a identifier of AS 516a (e.g. AS-ID), an identifier of UE 520a (e.g. IMSI), the MT data or an identifier thereof, and QoS attributes for the connection; the message may further include a callback IP address. SCEF 504a (or more particularly, SCEF processor 602) may receive the MT data API and, in response, send an OK or acknowledgement message to AS 516a (step 614b of FIG. 6B).

SCEF processor 602 of SCEF 504a may send to session DB 604 a get session request which may include an identifier of UE 520a (e.g. an IMSI) (step 616B of FIG. 6B). Session DB 604 may receive the request and, in response, send back to SCEF processor 602 a get session response (step 618b of FIG. 6B). This response may include the identifier of UE 520a (e.g. an IMSI) and a source IP address of UE 520a. SCEF processor 602 may further send to session DB 604 an update session request (step 620b of FIG. 6B). This request may include the identifier of UE 520a and the MT data and/or an identifier thereof.

SCEF 504a may then send to PCRF 508a an AA request (AAR) (step 622b of FIG. 6B). This request may include an MSIDN of UE 520a, a framed IP address/framed IPv6 prefix, and other attribute-value pairs (AVPs) as needed. PCRF 508a may then determine policy and charging control (PCC) rules for the session (step 624b of FIG. 6B). PCRF 508a may send to GW 510a a re-authorization request (RAR) (step 626b of FIG. 6B). This request may include the PCC rules determined in step 624b. GW 510a may receive this request and, in response, send to PCRF 508a a re-authorization answer (RAA) (step 628b of FIG. 6B). PCRF 508a may receive this message and, in response, send to SCEF 504a an AA answer (AAA) (step 630b of FIG. 6B).

UE 520a is reachable in the mobile network (indication 632b of FIG. 6B). When UE 520a is reachable, SCEF 504a may send the IP data to GW 510a for delivery to UE 520a (step 634b of FIG. 6B). GW 510a may send the IP data to eNB 518 via a tunnel using a GPRS tunneling protocol (GTP) (step 636b of FIG. 6B). The IP data may be sent to UE 520a via eNB 518a using a radio resource protocol (RRP) (step 638b of FIG. 6B).

FIG. 6C is a message flow diagram 600c for describing a subscription-based event notification technique for events associated with UEs in a 4G/LTE-based mobile network. FIG. 6C is comprised of FIGS. 6C-1 and 6C-2. The technique of FIG. 6C may be a continuation of the technique of FIG. 6A, where IP data is to be delivered to a UE that is unavailable.

To begin in FIG. 6C-1, an event notification indicating a UE attach is sent from SCEF 504a to AS 516a (see previous FIG. 6A). AS 516A may receive the event notification and, in response, send a mobile terminated (MT) data API message to SCEF 504a (step 610c of FIG. 6C-1). The MT data API message may include an identifier of AS 516A (e.g. AS-ID), an identifier of UE 520a (e.g. IMSI), the MT data and/or an identifier thereof, and QoS attributes for the connection; the message may further include a callback IP address. SCEF 504a (or more particularly, SCEF processor 602) may receive the MT data API and, in response, send an OK or acknowledgement message to AS 516A (step 612c of FIG. 6C-1).

SCEF processor 602 of SCEF 504a may send to session DB 604 a get session request which may include an identifier of UE 520a (e.g. an IMSI) (step 614c of FIG. 6C-1). Session DB 604 may receive the request and, in response, send back to SCEF processor 602 a get session response (step 616c of FIG. 6C-1). This response may include the identifier of UE 520a (e.g. an IMSI) and a source IP address of UE 520a. SCEF 504a may then perform processes for service level agreement (SLA) enforcement (step 618c of FIG. 6C-1). SCEF processor 602 may then send to session DB 604 an update session request (step 620c of FIG. 6C-1). This request may include the identifier of UE 520a and the MT data and/or an identifier thereof.

SCEF 504a may then send to PCRF 508a a connectivity status request for UE 520a (step 622c of FIG. 6C-1). PCRF 508a may receive this request and, in response, send to SCEF 504a a connectivity status response (step 624c of FIG. 6C-1). The connectivity status response may indicate that UE 520a is not connected, as there is no Gx session associated with UE 520a (i.e. the UE is unavailable). Here, SCEF 504a may receive and buffer the MT data (step 626C-1 of FIG. 6C-1). SCEF 504a may wait for an event reporting regarding an establishment of a Gx session associated with UE 520a (i.e. the UE becoming available) (step 628c of FIG. 6C-1).

Eventually, UE 520a will attach to the network and this event will be reported to SCEF 504a (steps 630c of FIG. 6C-2). In response, SCEF 504a may send to PCRF 508a an AA request (AAR) (step 632c of FIG. 6C-2). This request may include an MSIDN of UE 520a, a framed IP address/framed IPv6 prefix, and other attribute-value pairs (AVPs) as needed. PCRF 508a may determine policy and charging control (PCC) rules for the session (step 634c of FIG. 6C-2). PCRF 508a may then send to GW 510a a re-authorization request (RAR) (step 636c of FIG. 6C-2). This request may include the PCC rules determined in step 624b. GW 510a may receive this request and, in response, send to PCRF 508a a re-authorization answer (RAA) (step 638c of FIG. 6C-2). PCRF 508a may receive this message and, in response, send to SCEF 504a an AA answer (AAA) (step 640c of FIG. 6C-2).

UE 520a is reachable in the mobile network (indication 642c of FIG. 6C-2). When UE 520a is reachable, SCEF 504a may send the IP data to GW 510a for delivery to UE 520a (step 644c of FIG. 6C-2). GW 510a may send the IP data to eNB 518 via a tunnel using a GPRS tunneling protocol (GTP) (step 646C of FIG. 6C-2). The IP data may be sent to UE 520a via eNB 518a using a radio resource protocol (RRP) (step 648c of FIG. 6C-2).

Figures 1, 6D:
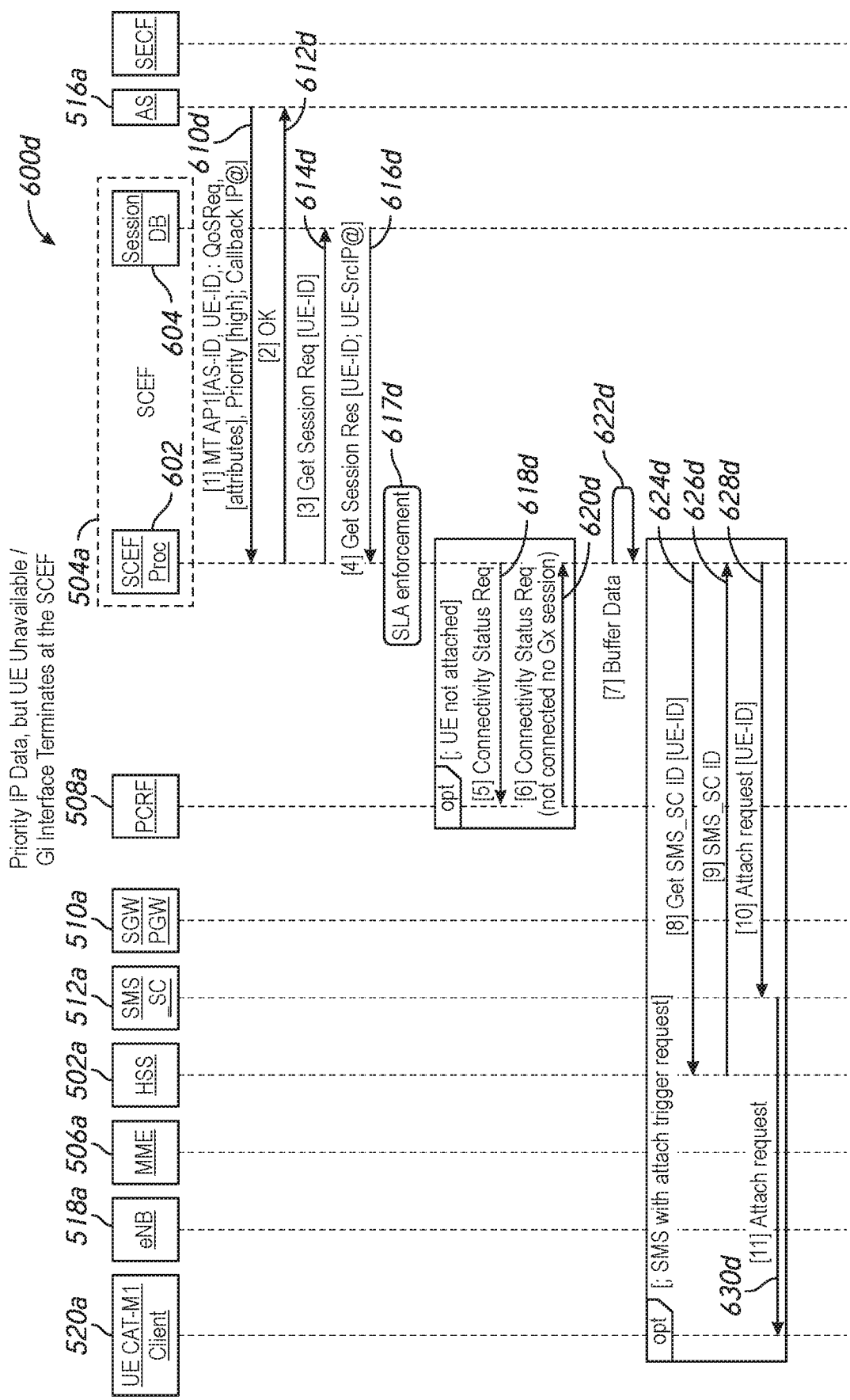
Figures 2, 6D:
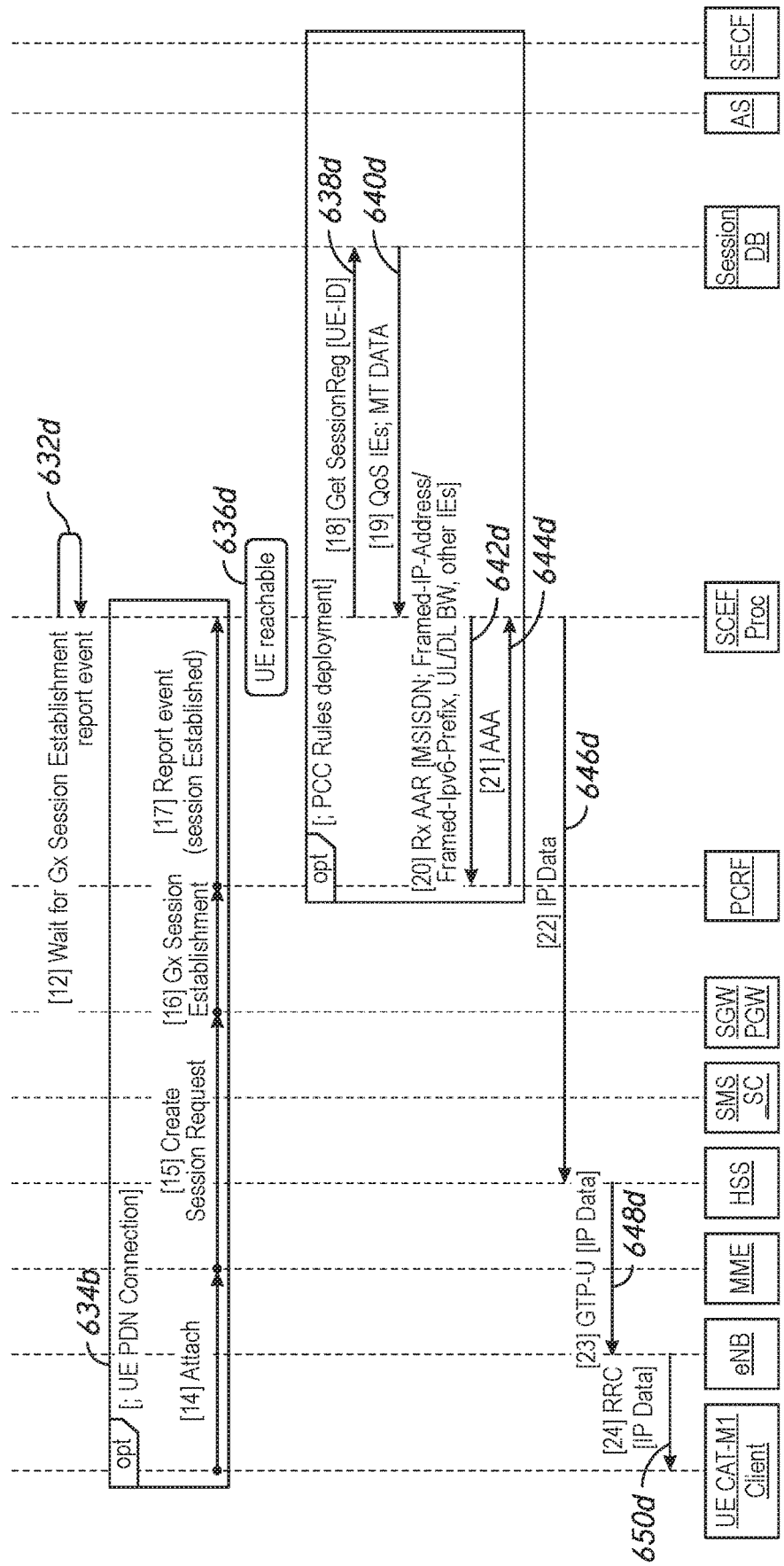

FIG. 6D is a message flow diagram 600d for describing a subscription-based event notification technique for events associated with UEs in a 4G/LTE-based mobile network. FIG. 6D is comprised of FIGS. 6D-1 and 6D-2. The technique of FIG. 6D may be a continuation of the technique of FIG. 6A, where high priority IP data is to be delivered to a UE that is unavailable.

To begin in FIG. 6D-1, an event notification indicating a UE attach is sent from SCEF 504a to AS 516a (see previous FIG. 6A). AS 516a may receive the event notification and, in response, send a mobile terminated (MT) data API message to SCEF 504a (step 610d of FIG. 6D-1). The MT data API message may include an identifier of AS 516a (e.g. AS-ID), an identifier of UE 520a, an indication of (high) priority (e.g. high priority data), and QoS attributes for the connection; the message may further include a callback IP address. SCEF 504a (or more particularly, SCEF processor 602) may receive the MT data API and, in response, send an OK or acknowledgement message to AS 516a (step 612d of FIG. 6D-1).

SCEF processor 602 of SCEF 504a may send to session DB 604 a get session request which may include an identifier of UE 520a (e.g. an IMSI) (step 614d of FIG. 6D-1). Session DB 604 may receive the request and, in response, send back to SCEF processor 602 a get session response (step 616D of FIG. 6D-1). This response may include the identifier of UE 520a (e.g. an IMSI) and a source IP address of UE 520a. SCEF 504a may then perform processes for service level agreement (SLA) enforcement (step 617c of FIG. 6D-1).

SCEF 504a may then send to PCRF 508a a connectivity status request for UE 520a (step 618d of FIG. 6D-1). PCRF 508a may receive this request and, in response, send to SCEF 504a a connectivity status response (step 620d of FIG. 6D-1). The connectivity status response may indicate that UE 520a is not connected, as there is no Gx session associated with UE 520a (i.e. the UE is unavailable). Here, SCEF 504a may receive and buffer the MT data (step 622d of FIG. 6D-1).

As the data to be delivered to UE 520a is high priority, but UE 520a is unavailable, an SMS message which includes an attach trigger request may be communicated to UE 520a. Here, SCEF 504a may send to HSS 502a a get SMS-SC identifier request to obtain an identifier of the serving SMS-SC 512a (step 624d of FIG. 6D-1). This request may include an identifier of UE 520a (e.g. the IMSI). In response, HSS 502a may return to SCEF 504a an identifier of the serving SMS-SC 512a (step 626D of FIG. 6D-1). SCEF 504a may then send to serving SMS-SC 512a an SMS message request for delivery to UE 520a, where the message includes an attach request (step 628d of FIG. 6D-1). The SMS message including the attach request is sent to UE 520a (step 630d of FIG. 6D-1).

SCEF 504a may wait for an event report indicating an establishment of a Gx session associated with UE 520a (i.e. the UE becoming available) (step 632d of FIG. 6D-2). Sometime, UE 520a may receive the attach request via SMS and, in response, attach to the network; this event will be reported to SCEF 504a (steps 634d of FIG. 6D-2). UE 520a is now reachable in the mobile network (indication 636d of FIG. 6D-2). PCC rules deployment may follow. SCEF processor 602 of SCEF 504a sends a get session request to session DB 604 (step 638d of FIG. 6D-2). The request may include an identifier of UE 520a (e.g. the IMSI). Session DB 604 may receive this request and, in response, send the high priority MT data to be delivered and QoS IEs for the connection (step 640d of FIG. 6D-2). In response, SCEF 504a may send to PCRF 508a an AA request (AAR) (step 642d of FIG. 6D-2). This request may include an MSIDN of UE 520a, a framed IP address/framed IPv6 prefix, and other attribute-value pairs (AVPs) as needed. PCRF 508a may receive this message and, in response, send to SCEF 504a an AA answer (AAA) (step 644d of FIG. 6D-2).

As UE 520a is reachable in the mobile network, SCEF 504a may send the high priority IP data to GW 510a for delivery to UE 520a (step 646d of FIG. 6D-2). GW 510a may send the IP data to eNB 518 via a tunnel using a GPRS tunneling protocol (GTP) (step 648d of FIG. 6D-2). The IP data may be sent to UE 520a via eNB 518a using a radio resource protocol (RRP) (step 650d of FIG. 6D-2).

Figure 6E:
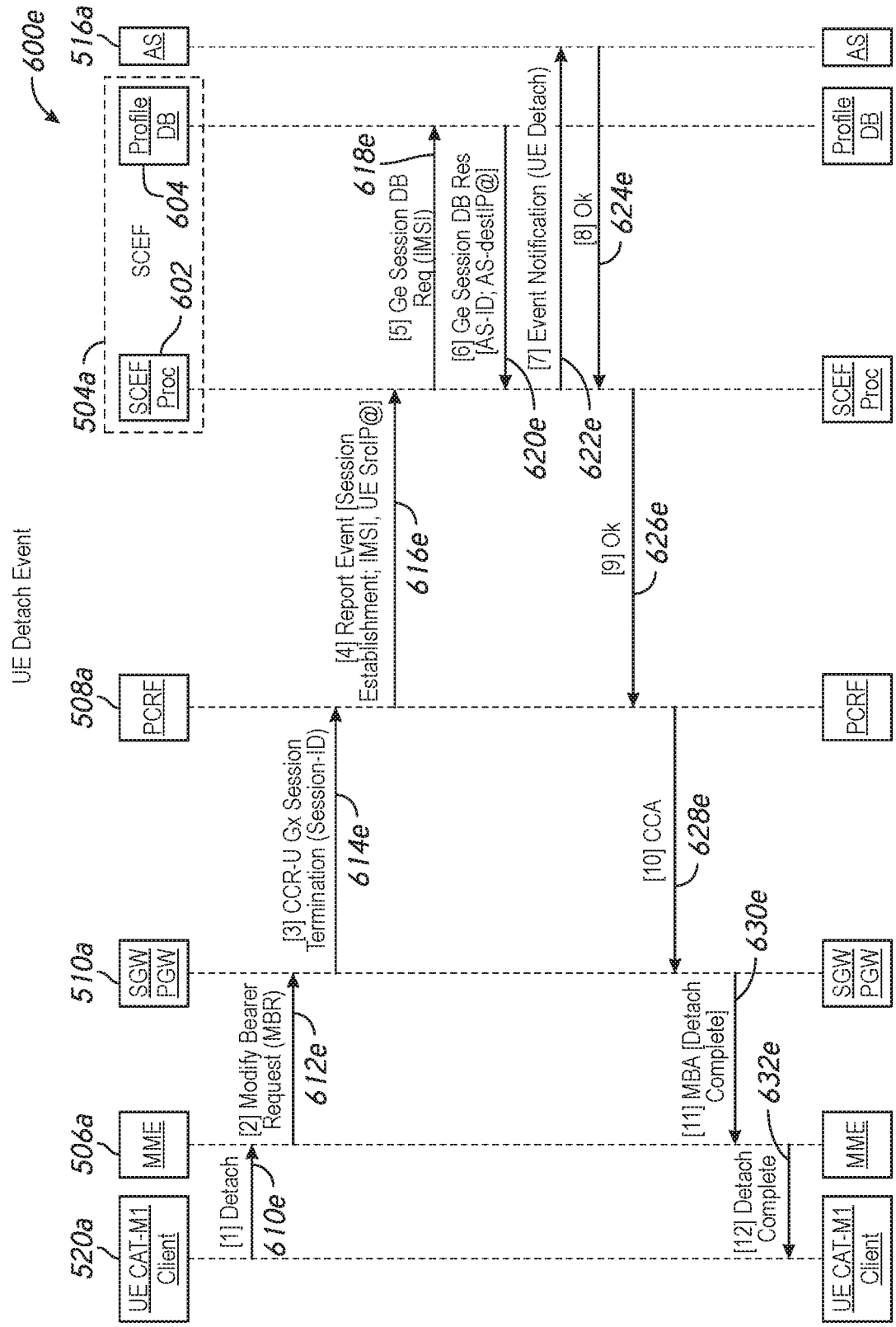

FIG. 6E is a message flow diagram 600e for describing a subscription-based event notification technique for events associated with UEs in a 4G/LTE-based mobile network. The technique of FIG. 6E relates to a UE detachment from the network.

To begin in FIG. 6E, UE 520a is associated with an event subscription in the mobile network. Having been previously attached to the network, UE 520a sends a detach to network (step 610e of FIG. 6E). This UE detach may be received by MME 506a. In response, MME 506a may send a modify bearer request to GW 510a (step 612e of FIG. 6E). GW 510a may receive this request and, in response, send a credit control request (CCR), Gx session termination message to PCRF 508a (step 614e of FIG. 6E). This request may include a session identifier (ID) associated with the session to be terminated.

PCRF 508a may receive this message and, in response, send an event reporting message to SCEF 504a (step 616E of FIG. 6E). This message may indicate the UE event (i.e. the UE detach), and/or include the request or message from step 614e (i.e. the session termination message) or alternatively the request or message from step 614a of FIG. 6A (i.e. the previous session establishment message). The message may include an identifier of UE 520a (e.g. the IMSI) and the source IP address associated with UE 520a. SCEF 504a (or more particularly, its SCEF processor 602) may receive this message and, in response, send to profile DB 606 a request to get a session profile (step 618e of FIG. 6E). This request may include the identifier of UE 520a (e.g. an IMSI).

Profile DB 606 may receive this request and, in response, send back to SCEF 504a a session profile associated with UE 520a (step 620e of FIG. 6E). The retrieved session profile may include an identifier of AS 516a (e.g. an AS-ID) and a destination IP address of AS 516a. Using this information, SCEF 504a may send an event notification to AS 516a (step 622e of FIG. 6E). The event notification may indicate the occurrence of the event associated with UE 520a (i.e. the UE detach). AS 516a may receive the event notification and, in response, send an OK or acknowledgment message to SCEF 504a (step 624e of FIG. 6E).

SCEF 504a may then send to PCRF 508a an OK or acknowledgement message (step 626e of FIG. 6E), as an acknowledgement of the previously sent event notification. SCEF 504a may receive this message and, in response, send to GW 510a a credit control answer (CCA) (step 628e of FIG. 6E). GW 510a may receive this message and, in response, send to MME 506a a modify bearer answer (MBA) (step 630e of FIG. 6E). MME 506a may receive this message and, in response, send to UE 520a a detach complete message (step 632e of FIG. 6E). UE 520a may receive the detach complete message from MME 506a.

Figure 7A:
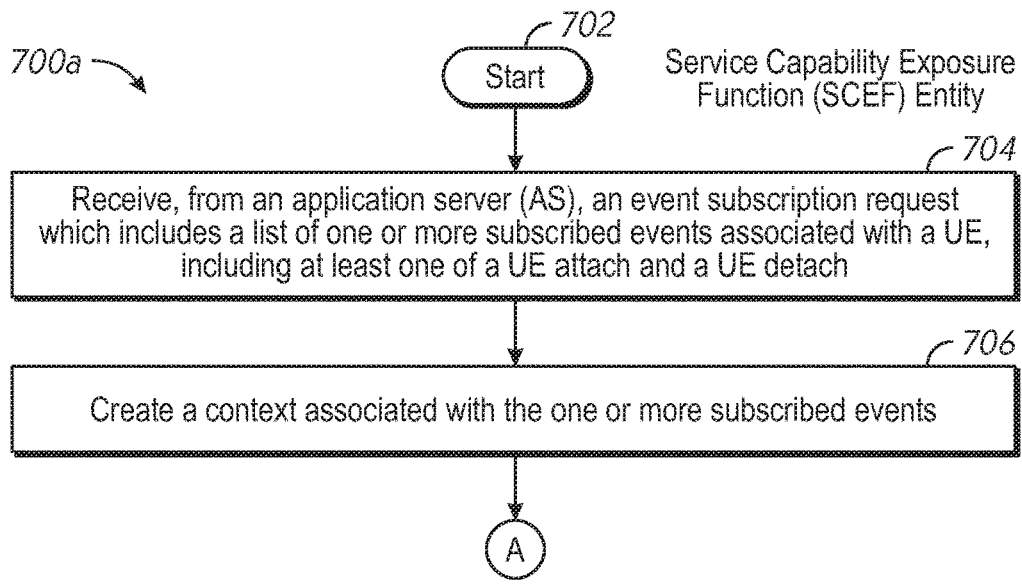
FIGS. 7A and 7B are related flowcharts for describing a subscription-based event notification technique for events associated with a UE in the 4G/LTE-based mobile network, which may be embodied in an SCEF entity, and may reduce data buffering requirements in the mobile network.
Figure 7B:
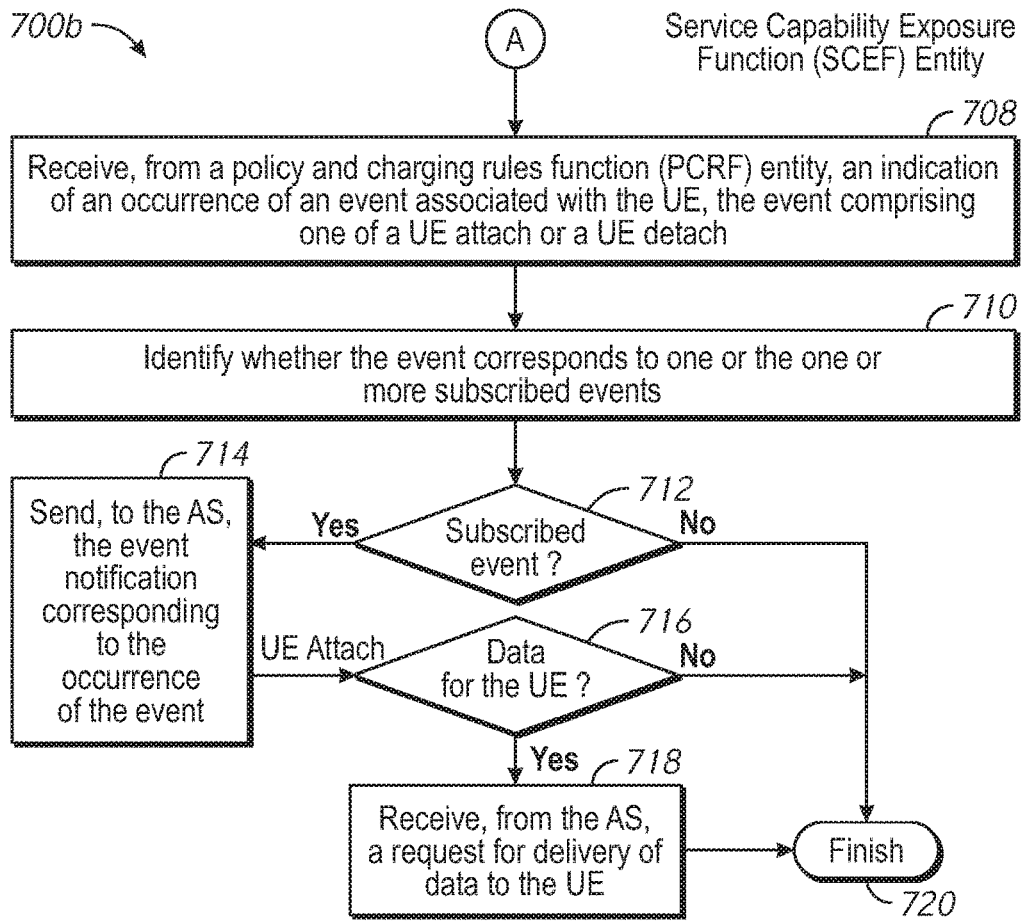

FIGS. 7A and 7B are related flowcharts 700a and 700b for describing a subscription-based event notification technique for events associated with a UE in a 4G/LTE-based mobile network. The techniques may be employed by and/or embodied in an SCEF entity. The techniques of FIGS. 7A and 7B may reduce data buffering requirements in the mobile network.

Beginning at a start block 702 of the flowchart 700a of FIG. 7A, the SCEF entity may receive, from an application server (AS), an event subscription request (step 704 of FIG. 7A). The event subscription request may include a list of one or more subscribed events associated with a UE. The one or more subscribed events may include a UE attach event and/or a UE detach event. In response, the SCEF entity may create a context associated with the subscription (step 706 of FIG. 7A). The context may indicate the one or more subscribed events of the UE. The context may further include an application server identifier (ID) or address, as well as an identifier of the UE (e.g. IMSI). The method of flowchart 700*a* of FIG. 7B ends; however processes may continue as described in relation to FIG. 7B through a connector A.

Referring now to the flowchart 700*b* of FIG. 7B, the UE associated with the subscription is used in the mobile network. Beginning through connector A of FIG. 7B, the SCEF entity may receive an indication of an occurrence of an event associated with the UE (step 708 of FIG. 7B). The event may be, for example, a UE attach event or a UE detach event. The indication may be received from a policy and charging rules function (PCRF) entity in the mobile network.

The SCEF entity may identify whether the event corresponds to one of the one or more subscribed events (step 710 of FIG. 7B). Here, the SCEF entity may identify or select the appropriate context and/or list of one or more subscribed events of the UE based on an identifier of the UE (e.g. an IMSI) included in the received indication. If the event fails to correspond to any one of the subscribed events ("No" branch in step 712 of FIG. 7B), then the method ends at a finish block 720 of FIG. 7B. On the other hand, if the event corresponds to one of the subscribed events of the UE (the "Yes" branch in step 714 of FIG. 7B), then the SCEF entity may send, to the AS, an event notification indicating the occurrence of the event (step 714 of FIG. 7B). For proper notification, the SCEF entity may obtain the identifier or address of the AS from the appropriately identified/selected context.

When the event notification corresponds to the occurrence of a UE detach, the AS may thereafter refrain (temporarily) from sending data to the mobile network for delivery to the UE. On the other hand, when the event notification corresponds to the occurrence of a UE attach, and data for the UE is pending at the AS for delivery (as identified in step 716 of FIG. 7B), the SCEF may receive, from the AS, a request for delivery of data to the UE (step 718 of FIG. 7B). The data may be immediately delivered to the now-attached UE. The flowchart ends at the finish block 720 of FIG. 7B.

In some implementations of FIGS. 7A-7B, the data delivery is for IP data where the SCEF entity interacts with the PCRF entity to receive event notifications as described; when data delivery is for non-IP data, however, the SCEF entity interacts with the MME to receive event notifications.

In some other implementations, a group identifier of a group of subscribers may be utilized in the methods of FIGS. 6A-6E and FIGS. 7A-7B. The group identifier of the group may be associated with a plurality of subscriber or UE identifiers (e.g. IMSIs). Here, the group identifier may be included in the event subscription request from the AS to the SCEF entity, and may also be indicated in the context created at the SCEF entity. In addition or alternatively, the plurality of subscriber or UE identifiers associated with the group identifier may be provisioned in the HSS and obtained from the HSS by a requesting entity (e.g. the SCEF entity). In addition or alternatively, the group identifier may be provided in the indication of the occurrence of the event from the PCRF to the SCEF entity, and utilized for the checking of the indicated event against the subscribed events at the SCEF entity.

General handling and processing for IoT devices is briefly discussed. An IoT device may be one of two different types of IoT devices: (1) an NB-IoT device; or (2) an CAT-M1 device.

(1) NarrowBand IoT (NB-IoT) is a Low Power Wide Area Network (LPWAN) radio technology standard developed to enable a wide range of devices and services to be connected using cellular telecommunications bands. These are constrained devices that do not support IP. For this type of device, an AS may initiate a configuration procedure (e.g. see FIG. 9A described later below) that triggers an NIDD configuration procedure between the SCEF and the HSS. As a result of this procedure, the HSS record of the NB-IoT device indicates that the SCEF will handle the connection to the APN. This information is sent to the MME as part of the UE attach procedure. The MME initiates the T6a session establishment to the SCEF. Mobile-originated (MO) data from the NB-IoT device may traverse the following path: UE→eNb→MME→SCEF→AS. On the other hand, mobile terminated (MT) data for the NB-IoT device may be sent over the T6a interface to the MME based on the UE context (and/or session record) which is created when the T6a session establishment is completed.

(2) CAT-M1 devices support IP and thus are handled/processed herein as normal or standard UEs. The SCEF becomes aware when a CAT-M1 devices connects to the network via the PCRF-SCEF interface (e.g. see FIG. 9A described later below). The SCEF creates a context for the CAT-M1 device that includes its IP address as an identity. MO data from a CAT-M1 device may traverse the following path: UE→eNB→S-/P-GW→SCEF→AS. For MT data to the CAT-M1 device, given the creation of the UE context, the SCEF sends the MT data from the AS to the device over the Gi interface (via the P-GW). Based on the above, can is not aware how the MT data is delivered (whether over T6a/NIDD or over Gi/IP data).

Figure 8A:
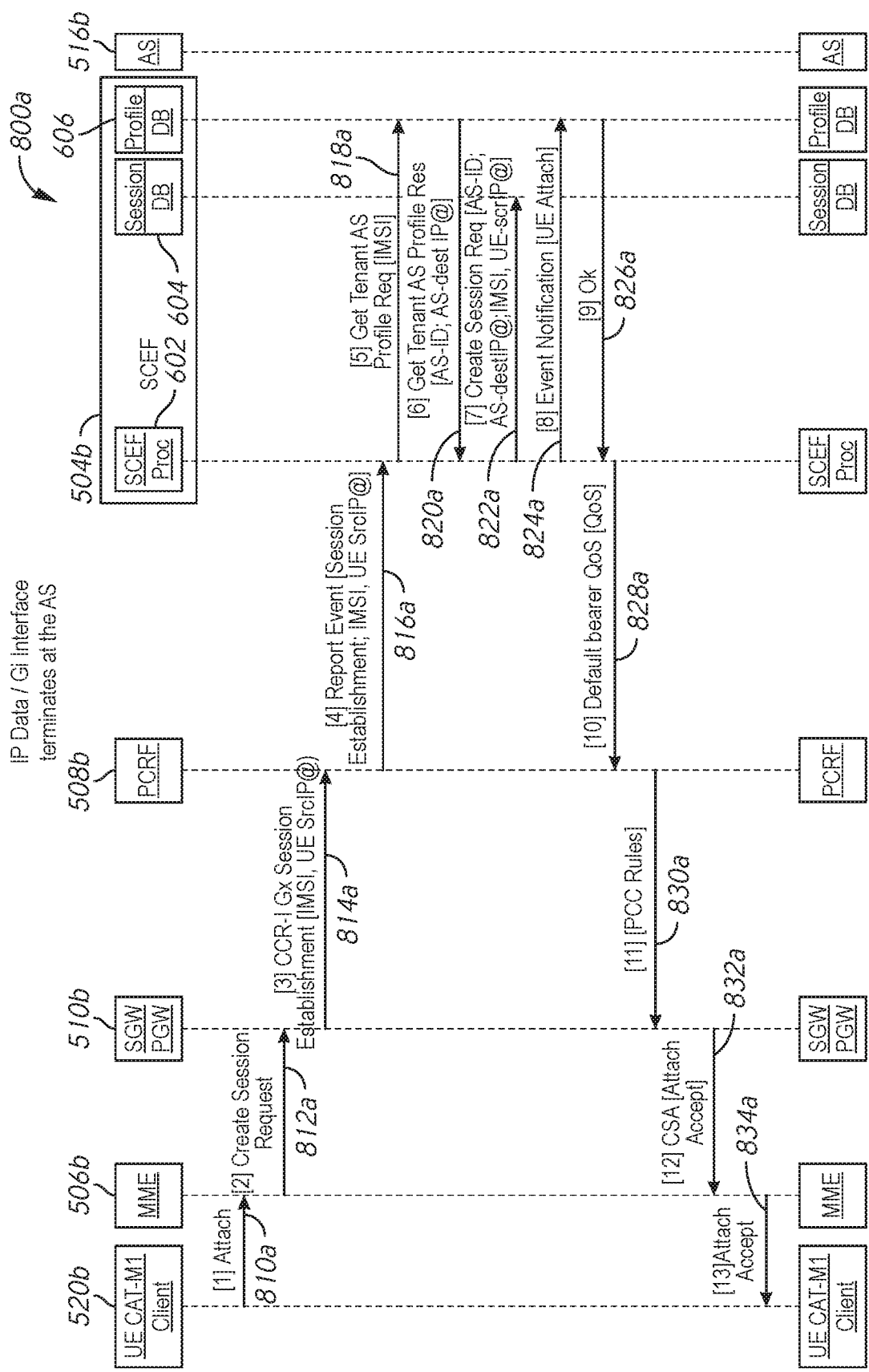
FIGS. 8A, 8B, 8C, 8D and 8E (where FIG. 8B is comprised of FIGS. 8B-1 and 8B-2, FIG. 8C is comprised of FIGS. 8C-1 and 8C-2, and FIG. 8D is comprised of FIGS. 8D-1 and 8D-2) are related message flow diagrams for describing subscription-based event notification techniques for events associated with UEs in the 4G/LTE-based mobile network according to some implementations, which may employ the variation of the network architecture of FIG. 5B (i.e. for IP data where the Gi interface terminates at the AS), and may reduce data buffering requirements in the mobile network.
Figures 1, 8B:
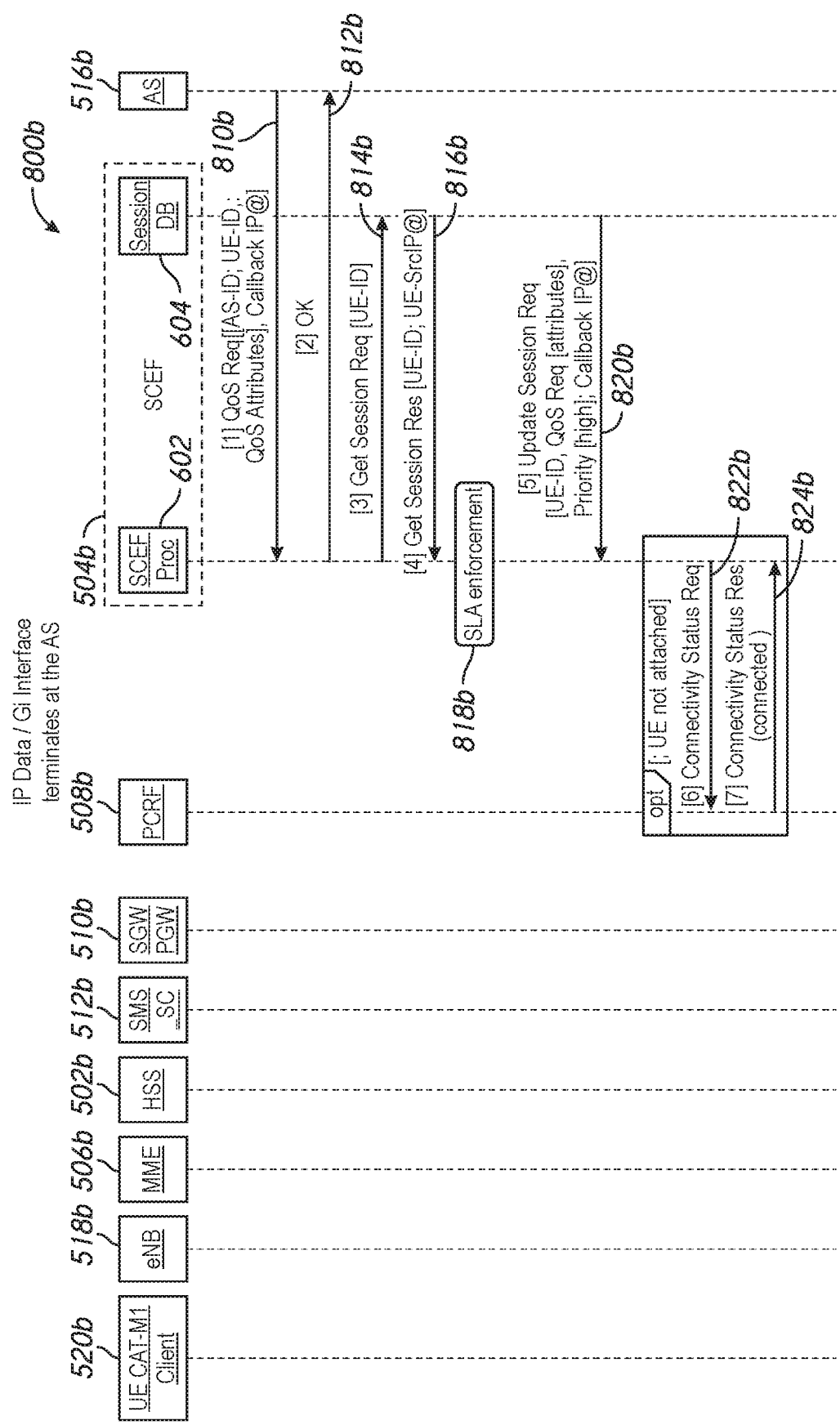
Figures 2, 8B:
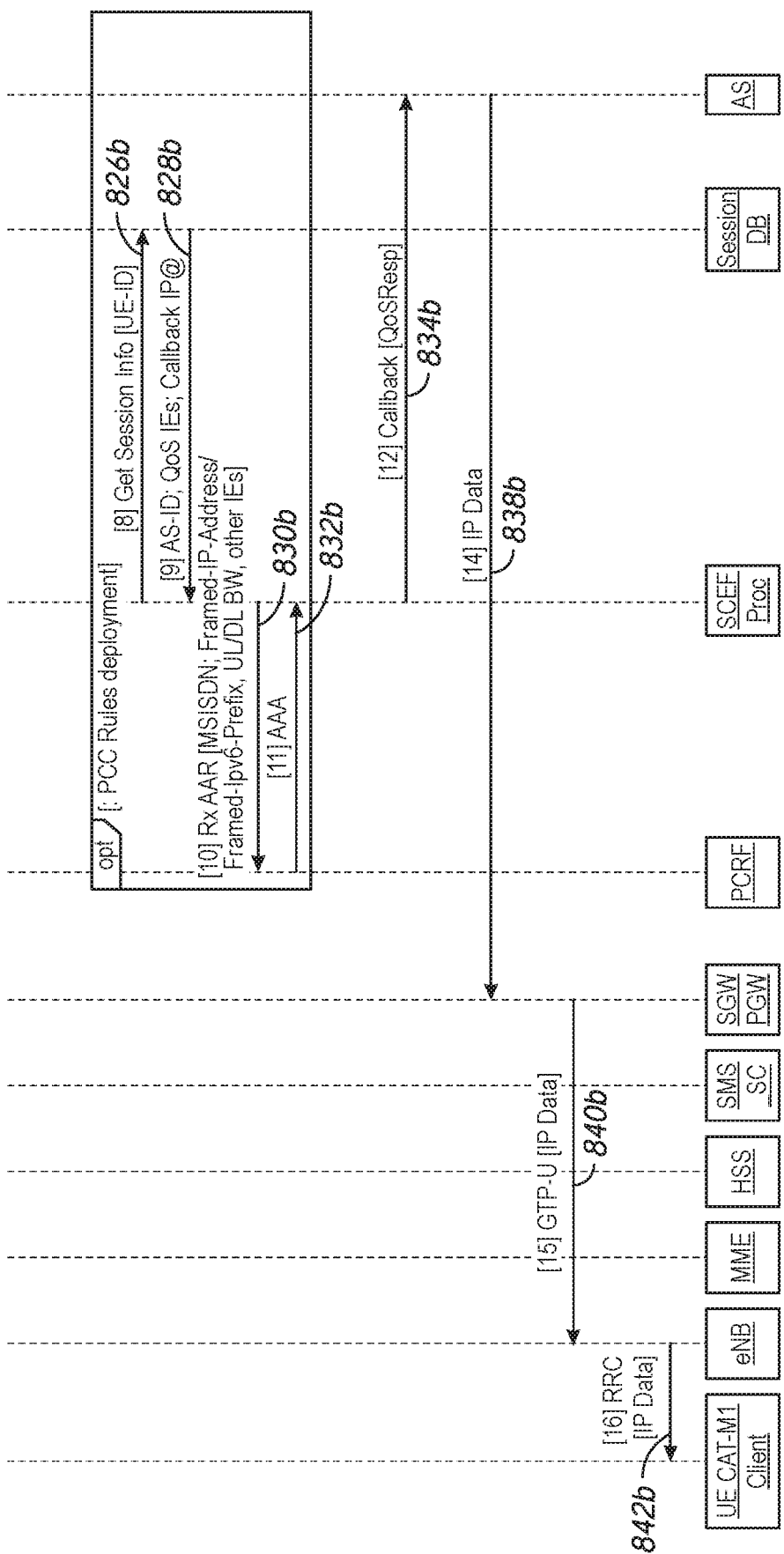

FIGS. 8A, 8B, 8C, 8D, and 8E (where FIG. 8B is comprised of FIGS. 8B-1 and 8B-2, FIG. 8C is comprised of FIGS. 8C-1 and 8C-2, and FIG. 8D is comprised of FIGS. 8D-1 and 8D-2) are related message flow diagrams for describing subscription-based event notification techniques for events associated with UEs in the 4G/LTE-based mobile network according to some implementations. The techniques may employ the variation of the network architecture of FIG. 5B (i.e. for IP data where the Gi interface terminates at the AS). The techniques of FIGS. 8A, 8B, 8C, 8D, and 8E may reduce data buffering requirements in the mobile network.

FIG. 8A is a message flow diagram 800*a* for describing a subscription-based event notification technique for events associated with UEs in the 4G/LTE-based mobile network, for IP data where the Gi interface terminates at the AS.

To begin in FIG. 8A, UE 520*b* sends an attach to the mobile network (step 810*a* of FIG. 8A). The attach message is received by MME 506*b*. In response, MME 506*b* sends a create session request to GW 510*b* (step 812*a* of FIG. 8A). GW 501*b* receives the request and, in response, sends a session establishment message to PCRF 508*b* (step 814*a* of FIG. 8A). The session establishment message may be a CCR Gx session establishment message which may include an identifier of UE 520*b* (e.g. IMSI) as well as a source IP address of UE 520*b*. PCRF 508*b* receives this message and, in response, sends a reporting event message to SCEF 504*b* (step 816*a* of FIG. 8A). The message may include the identifier and the source IP address of UE 520*b*.

SCEF 504*b* (or more particularly, its SCEF processor 602) may receive this message and, in response, send to profile DB 606 a request to get a tenant AS profile (step 818*a* of FIG. 8A). This request may include the identifier of UE 520*b* (e.g. an IMSI). Profile DB 606 may receive this request and, in response, send back to SCEF processor 602 a tenant AS profile of the AS associated with UE 520*b* (step 820*a* of FIG. 8A). The retrieved tenant AS profile may include an identifier of AS 516*b* (e.g. an AS-ID) and a destination IP address of AS 516*b*. SCEF 504*b* (or more particularly, its SCEP processor 602) may then send a create session request message to session DB 604 (step 822*a* of FIG. 8A). This request may include the identifier of AS 516*b* (i.e. the AS-ID), the destination IP address of AS 516*b*, the identifier of UE 520*b* (e.g. the IMSI), and the source IP address of UE 520*b*.

Using this information, SCEF 504*b* (or more particularly, its SCEP processor 602) may send an event notification to AS 516*b* (step 824*a* of FIG. 8A). The event notification may indicate the occurrence of the event associated with UE 520*b* (i.e. the UE attach). AS 516*b* may receive the event notification and, in response, send an OK or acknowledgment message to SCEF 602 (or more particularly, its SCEP processor 602) (step 826*a* of FIG. 8A).

SCEF 504*b* may then send to PCRF 508*b* a request for a (default) bearer (step 828*a* of FIG. 8A). The request may include QoS parameters associated with the bearer. PCRF 508*b* may receive this request and, in response, generate and send to GW 510*b* a credit control answer (CCA) which includes PCC rules (step 830*a* of FIG. 8A). GW 510*b* may receive this message and, in response, send to MME 506*b* a CSA which includes an attach accept (step 832*a* of FIG. 8A). MME 506*b* may receive the CSA and, in response, send the attach accept to UE 520*b* (step 834*a* of FIG. 8A). UE 520*b* may receive the attach accept.

FIG. 8B is a message flow diagram 800*b* for describing a subscription-based event notification technique for events associated with UEs in a 4G/LTE-based mobile network, where the Gi interface terminates at AS 516*b*. FIG. 8B is comprised of FIGS. 8B-1 and 8B-2. The technique of FIG. 8B may be a continuation of the technique of FIG. 8A, where IP data is to be delivered to a UE that is available in the mobile network.

To begin in FIG. 8B-1, an event notification indicating a UE attach is sent from SCEF 504*b* to AS 516*b* (see previous FIG. 8A). AS 516*b* may receive the event notification and, in response, send a message to SCEF 504*b* (step 810*b* of FIG. 8B-1). The message may include an identifier of AS 516*b* (e.g. AS-ID), an identifier of UE 520*b*, and QoS attributes for the connection; the message may further include a callback IP address. SCEF 504*b* (or more particularly, SCEF processor 602) may receive the message and, in response, send an OK or acknowledgement message to AS 812*b* (step 812*b* of FIG. 8B-1).

SCEF processor 602 of SCEF 504*b* may send to session DB 604 a get session request which may include an identifier of UE 520*b* (e.g. an IMSI) (step 814*b* of FIG. 8B-1). Session DB 604 may receive the request and, in response, send back to SCEF processor 602 a get session response (step 816 of FIG. 8B-1). This response may include the identifier of UE 520*b* (e.g. an IMSI) and a source IP address of UE 520*b*. SCEF 504*b* may then perform processes for service level agreement (SLA) enforcement (step 818*b* of FIG. 8B-1). Then, SCEF processor 602 sends to session DB 604 an update session request message which may include an identifier of UE 520*b* (e.g. an IMSI) and a source IP address of UE 520*b* (step 820*b* of FIG. 8B-1). SCEF 504*b* may then send to PCRF 508*b* a connectivity status request for UE 520*b* (step 822*b* of FIG. 8B-1). PCRF 508*b* may receive this request and, in response, send to SCEF 504*b* a connectivity status response (step 824*b* of FIG. 8B-1). The connectivity status response may indicate that UE 520*b* is connected, as there is a current Gx session with UE 520*b* (i.e. the UE is available).

PCC rules deployment may follow. SCEF processor 602 sends to session DB 604 a get session information message which includes an identifier of UE 520*b* (step 826*b* of FIG. 8B-2). In response, session DB 604 returns an identifier of AS 516*b* (i.e. the AS-ID), the callback IP address, and QoS IEs for the connection (step 828*b* of FIG. 8B-2). In response, SCEF 504*b* may send to PCRF 508*b* an AA request (AAR) (step 830*b* of FIG. 8B-2). This request may include an MSIDN of UE 520*b*, a framed IP address/framed IPv6 prefix, an uplink/downlink bandwidth, and perhaps other IEs if needed. PCRF 508*b* may receive this message and, in response, sends to SCEF 504*b* an AA answer (AAA) (step 832*b* of FIG. 8B-2).

As UE 520*b* is reachable in the mobile network, SCEF processor 604 of SCEF 504*b* performs a callback to AS 516*b* using the previously-obtained information (step 834*b* of FIG. 8B-2). AS 516*b* sends the IP data to GW 510*b* for delivery to UE 520*b* (step 838*b* of FIG. 8B-2). GW 510*b* sends the IP data to eNB 518*b* via a tunnel using GTP (step 840*b* of FIG. 8B-2), and from eNB 518*b* using RRC protocol (step 842*b* of FIG. 8B-2).

Figures 1, 8C:
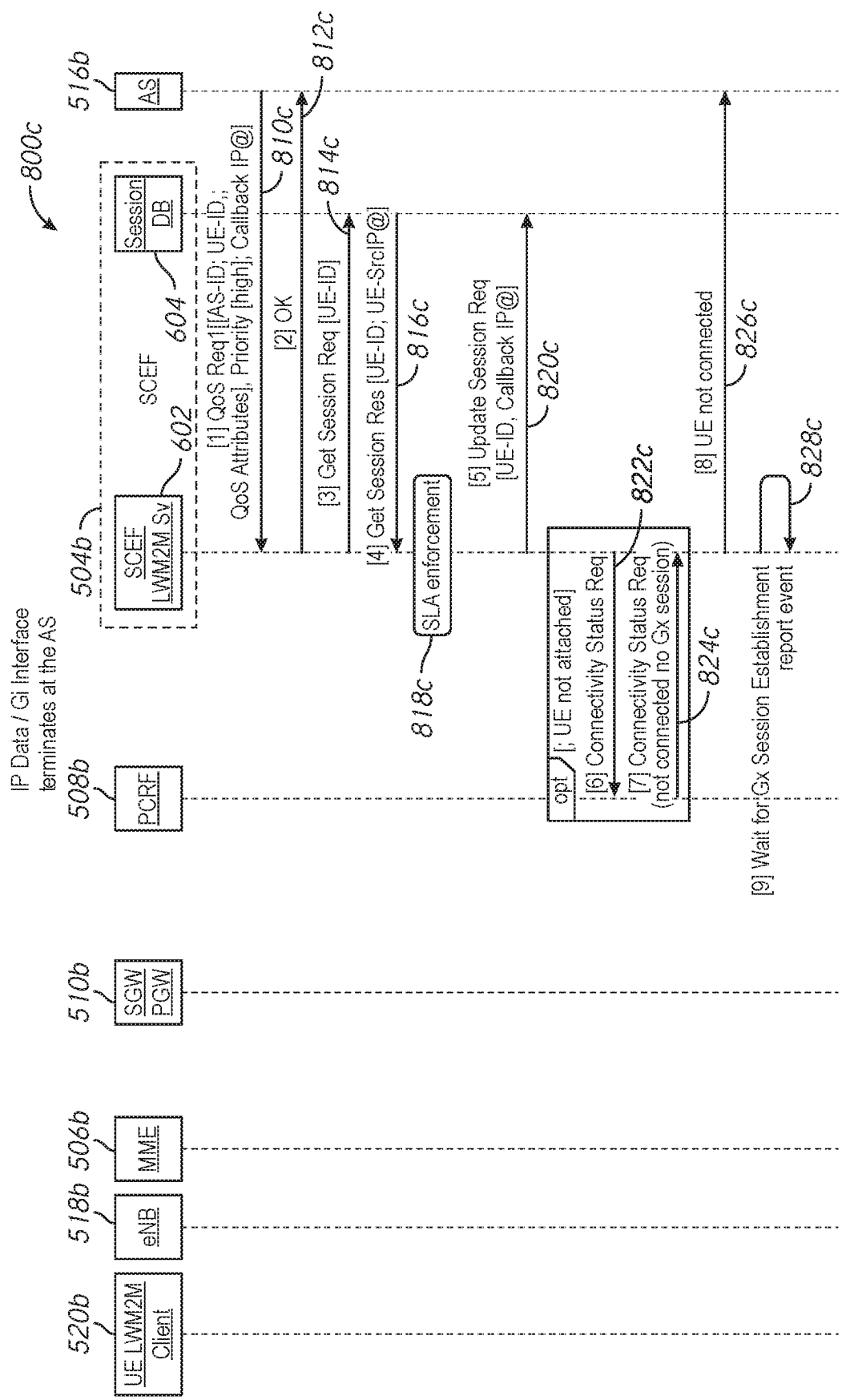
Figures 2, 8C:
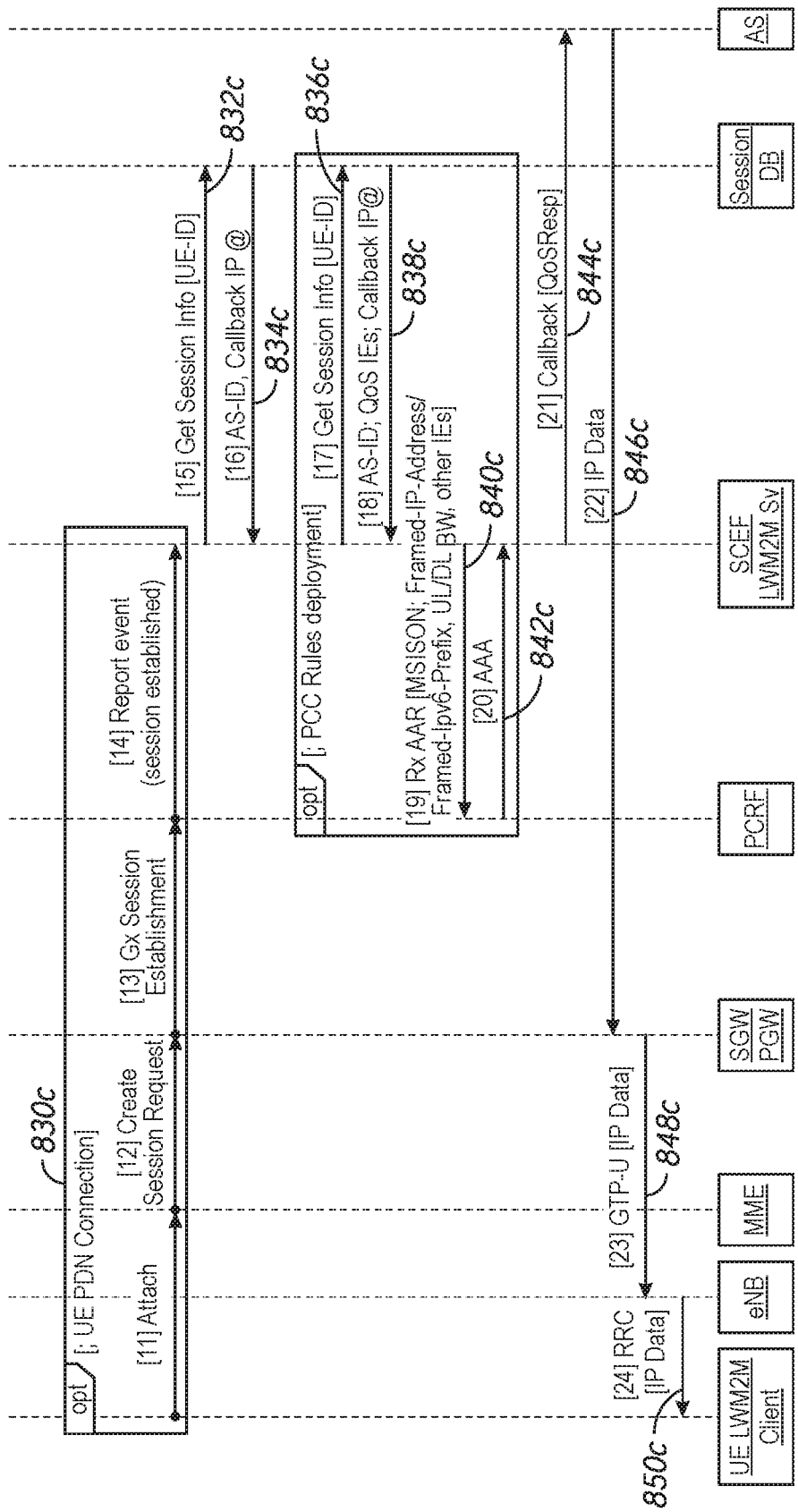

FIG. 8C is a message flow diagram 800*c* for describing a subscription-based event notification technique for events associated with UEs in a 4G/LTE-based mobile network, where the Gi interface terminates at AS 516*b*. FIG. 8C is comprised of FIGS. 8C-1 and 8C-2. This technique may be suitable for use with Lightweight Machine to Machine (LWM2M) devices). The technique of FIG. 8C may be a continuation of the technique of FIG. 8A where IP data is to be delivered to a UE that is unavailable.

To begin in FIG. 8C-1, an event notification indicating a UE attach is sent from SCEF 504*b* to AS 516*b* (see previous FIG. 8A). AS 516*b* may receive the event notification and, in response, send a message to SCEF 504*b* (step 810*c* of FIG. 8C-1). The message may include an identifier of AS 516*b* (e.g. AS-ID), an identifier of UE 520*b*, an indication of (high) priority (e.g. high priority data), and QoS attributes for the connection; the message may further include a callback IP address. SCEF 504*b* (or more particularly, SCEF processor 602) may receive the message and, in response, send an OK or acknowledgement message to AS 812*b* (step 812*c* of FIG. 8C-1).

SCEF processor 602 of SCEF 504*b* may send to session DB 604 a get session request which may include an identifier of UE 520*b* (e.g. an IMSI) (step 814*c* of FIG. 8C-1). Session DB 604 may receive the request and, in response, send back to SCEF processor 602 a get session response (step 814*c* of FIG. 8C-1). This response may include the identifier of UE 520*b* (e.g. an IMSI) and a source IP address of UE 520*b*. SCEF 504*b* may then perform processes for service level agreement (SLA) enforcement (step 818*c* of FIG. 8C-1). Then, SCEF processor 602 sends to session DB 604 an update session request message which may include an identifier of UE 520*b* (e.g. an IMSI) and a source IP address of UE 520*b* (step 820*c* of FIG. 8C-1).

SCEF 504*b* may then send to PCRF 508*b* a connectivity status request for UE 520*b* (step 822*c* of FIG. 8C-1). PCRF 508*b* may receive this request and, in response, send to SCEF 504*b* a connectivity status response (step 824*c* of FIG. 8C-1). The connectivity status response may indicate that UE 520*b* is not connected, as there is no Gx session associated with UE 520*b* (i.e. the UE is unavailable). Here, SCEF 504*b* may receive and buffer the MT data. SCEF 504*b* may send to AS 516*b* a message indicating an unavailable status (i.e. UE not connected) of UE 520*b* (step 826*c* of FIG. 8C-1). SCEF 504*b* may wait for an event reporting regarding an establishment of a Gx session associated with UE 520*b* (i.e. the UE becoming available) (step 828*c* of FIG. 8C-1).

Eventually, UE 520*b* will attach to the network and obtain a PDN connection, and this event (e.g. session configured for the UE) will be reported to SCEF 504*b* (steps 830*c* of FIG. 8C-2). In response, SCEF processor 602 sends to session DB 604 a get session information message which includes an identifier of UE 520*b* (step 832*c* of FIG. 8C-2). In response, session DB 604 returns an identifier of AS 516*b* (i.e. the AS-ID) and a callback IP address (step 834*c* of FIG. 8C-2). PCC rules deployment may follow. SCEF processor 602 sends to session DB 604 a get session information message which includes an identifier of UE 520*b* for additional information (step 836*c* of FIG. 8C-2). In response, session DB 604 returns an identifier of AS 516*b* (i.e. the AS-ID), the callback IP address, and QoS IEs for the connection (step 838*c* of FIG. 8C-2). In response, SCEF 504*b* may send to PCRF 508*b* an AA request (AAR) (step 840*c* of FIG. 8C-2). This request may include an MSIDN of UE 520*b*, a framed IP address/framed IPv6 prefix, an uplink/downlink bandwidth, and perhaps other IEs. PCRF 508*b* may receive this message and, in response, sends to SCEF 504*b* an AA answer (AAA) (step 842*c* of FIG. 8C-2). UE 520*b* is reachable in the mobile network, and SCEF 504*b* sends the IP data to GW 510*b* for delivery to UE 520*b* (step 846*c* of FIG. 8C-2). GW 510*b* sends the IP data to eNB 518*h* via a tunnel using a GPRS tunneling protocol (GTP) (step 848*c* of FIG. 8C-2), and from eNB 518*b* using a radio resource control (RRC) protocol (step 850*c* of FIG. 8C-2).

Figures 1, 8D:
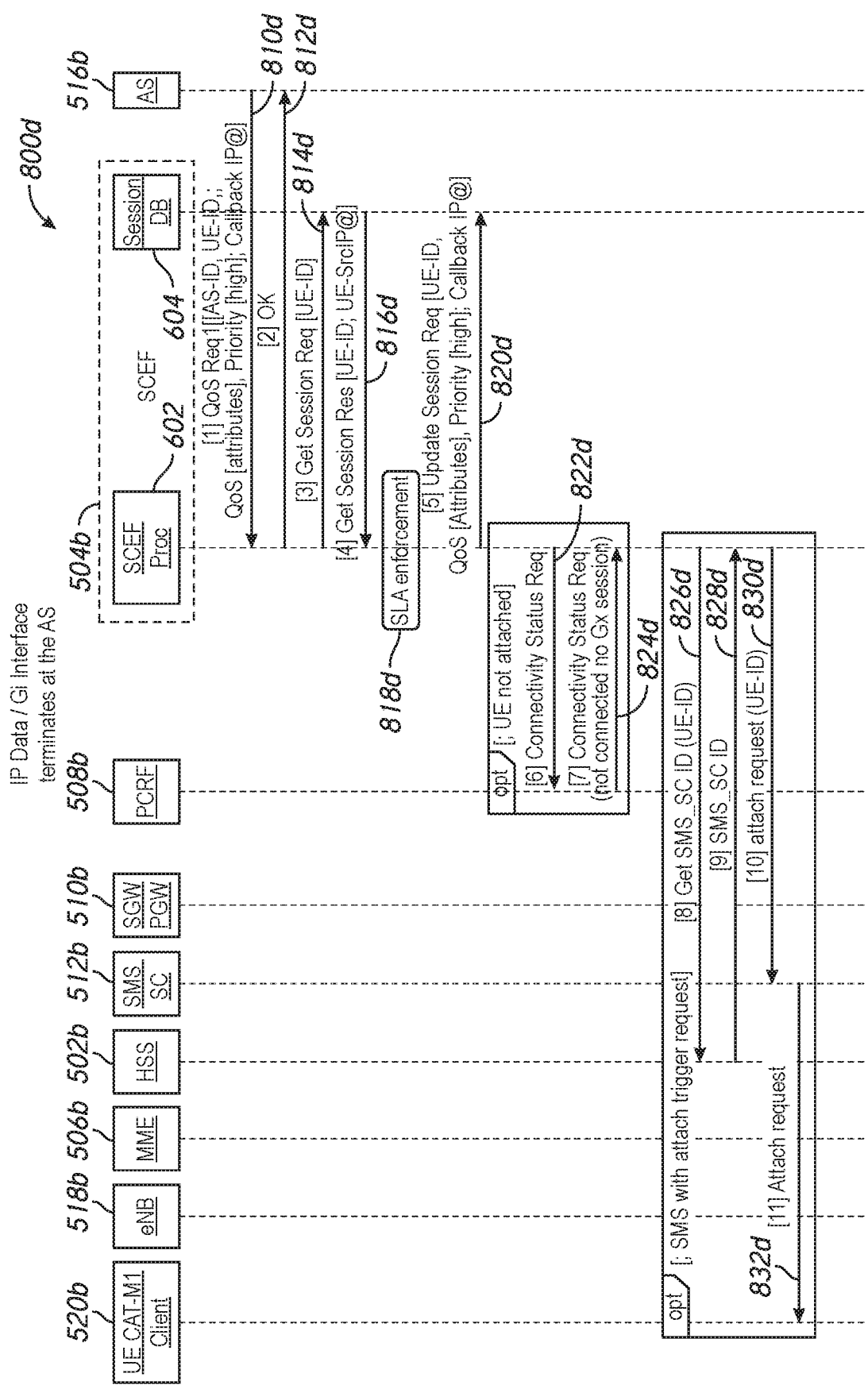
Figures 2, 8D:
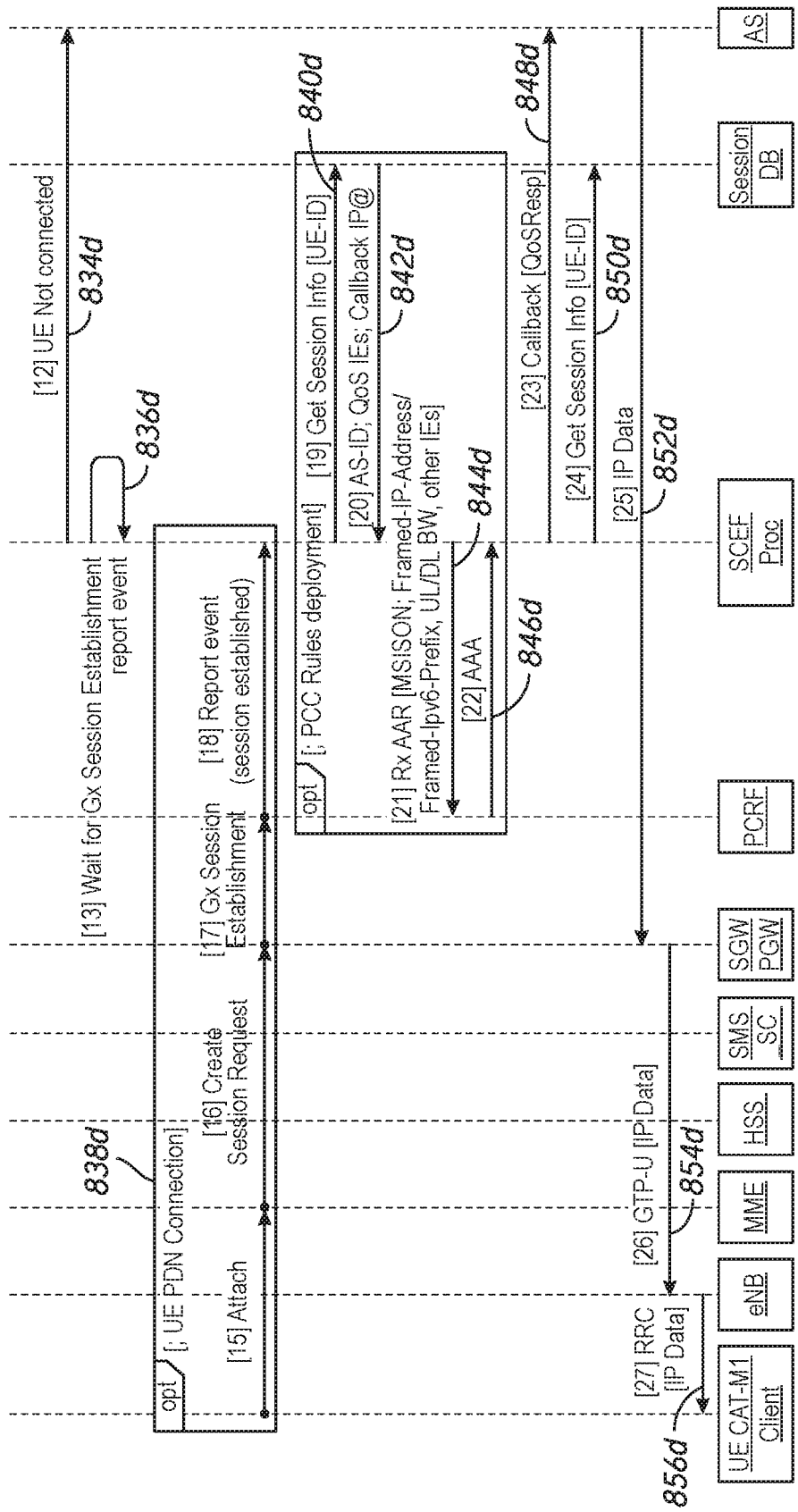

FIG. 8D is a message flow diagram 800*d* for describing a subscription-based event notification technique for events associated with UEs in a 4G/LTE-based mobile network, where the Gi interface terminates at AS 516*b*. FIG. 8D is comprised of FIGS. 8D-1 and 8D-2. The technique of FIG. 8D may be a continuation of the technique of FIG. 8A, where high priority IP data is to be delivered to a UE that is unavailable.

To begin in FIG. 8D-1, an event notification indicating a UE attach is sent from SCEF 504*b* to AS 516*b* (see previous FIG. 8A). AS 516*b* may receive the event notification and, in response, send a message to SCEF 504*b* (step 810*d* of FIG. 8D-1). The message may include an identifier of AS 516*b* (e.g. AS-ID), an identifier of UE 520*b*, an indication of (high) priority (e.g. high priority data), and QoS attributes for the connection; the message may further include a callback IP address. SCEF 504*b* (or more particularly, SCEF processor 602) may receive the message and, in response, send an OK or acknowledgement message to AS 812*c* (step 812*d* of FIG. 8D-1).

SCEF processor 602 of SCEF 504*b* may send to session DB 604 a get session request which may include an identifier of UE 520*b* (e.g. an IMSI) (step 814*d* of FIG. 8D-1. Session DB 604 may receive the request and, in response, send back to SCEF processor 602 a get session response (step 816*d* of FIG. 8D-1). This response may include the identifier of UE 520*b* (e.g. an IMSI) and a source IP address of UE 520*b*. SCEF 504*b* may then perform processes for service level agreement (SLA) enforcement (step 818*d* of FIG. 8D-1). Then, SCEF processor 602 sends to session DB 604 an update session request message which may include an identifier of UE 520*b* (e.g. an IMSI) and a source IP address of UE 520*b* (step 820*d* of FIG. 8D-1).

SCEF 504*b* may then send to PCRF 508*b* a connectivity status request for UE 822*c* (step 822*d* of FIG. 8D-1). PCRF 508*b* may receive this request and, in response, send to SCEF 504*b* a connectivity status response (step 824*d* of FIG. 8D-1). The connectivity status response may indicate that UE 520*b* is not connected, as there is no Gx session associated with UE 520*b* (i.e. the UE is unavailable). Here, SCEF 504*b* may receive and buffer the MT data.

As the data to be delivered to UE 520*b* is high priority, but UE 520*b* is unavailable, an SMS message which includes an attach trigger request may be communicated to UE 520*b*. Here, SCEF 504*b* may send to HSS 502*b* a get SMS-SC identifier request to obtain an identifier of the serving SMS-SC 512*b* (step 826*d* of FIG. 8D-1). This request may include an identifier of UE 520*b* (e.g. the IMSI). In response, HSS 502*b* may return to SCEF 504*b* an identifier of the serving SMS-SC 512*b* (step 828*d* of FIG. 8D-1). SCEF 504*b* may then send to serving SMS-SC 512*b* an SMS message request for delivery to UE 520*b*, where the message includes an attach request (step 830*d* of FIG. 8D-1). The SMS message including the attach request is transmitted to UE 520*b* (step 832*d* of FIG. 8D-1).

SCEF processor 602 may send a message indicating that the UE 520*b* is not attached or unavailable (step 834*d* of FIG. 8D-2). SCEF 504*b* may wait for an event report indicating an establishment of a Gx session associated with UE 520*b* (i.e. the UE becoming available) (step 836*d* of FIG. 8D-2). UE 520*b* may receive the attach request via SMS and, in response, attach to the network; this event will be reported to SCEF 504*b* (steps 838*d* of FIG. 8D-2). UE 520*b* is then reachable in the mobile network. PCC rules deployment may follow. SCEF processor 602 sends to session DB 604 a get session information message which includes an identifier of UE 520*b* (step 840*d* of FIG. 8D-2). In response, session DB 604 returns an identifier of AS 516*b* (i.e. the AS-ID), the callback IP address, and QoS IEs for the connection (step 842*d* of FIG. 8D-2). In response, SCEF 504*b* may send to PCRF 508*b* an AA request (AAR) (step 844*d* of FIG. 8D-2). This request may include an MSIDN of UE 520*b*, a framed IP address/framed IPv6 prefix, an uplink/downlink bandwidth, and perhaps other IEs. PCRF 508*b* may receive this message and, in response, send to SCEF 504*b* an AA answer (AAA) (step 846*d* of FIG. 8D-2).

As UE 520*b* is reachable in the mobile network, SCEF processor 604 of SCEF 504*b* performs a callback to AS 516*b* using the previously-obtained information (step 848*d* of FIG. 8D-2). SCEF processor 602 sends to session DB 604 a get session information message which includes an identifier of UE 520*b* (step 850*d* of FIG. 8D-2). AS 516*b* sends the IP data to GW 510*b* for delivery to UE 520*b* (step 852*d* of FIG. 8D-2). GW 510*b* sends the IP data to eNB 518 via a tunnel using GTP (step 854*d* of FIG. 8D-2), and from eNB 518*b* using RRC protocol (step 856*d* of FIG. 8D-2).

Figure 8E:
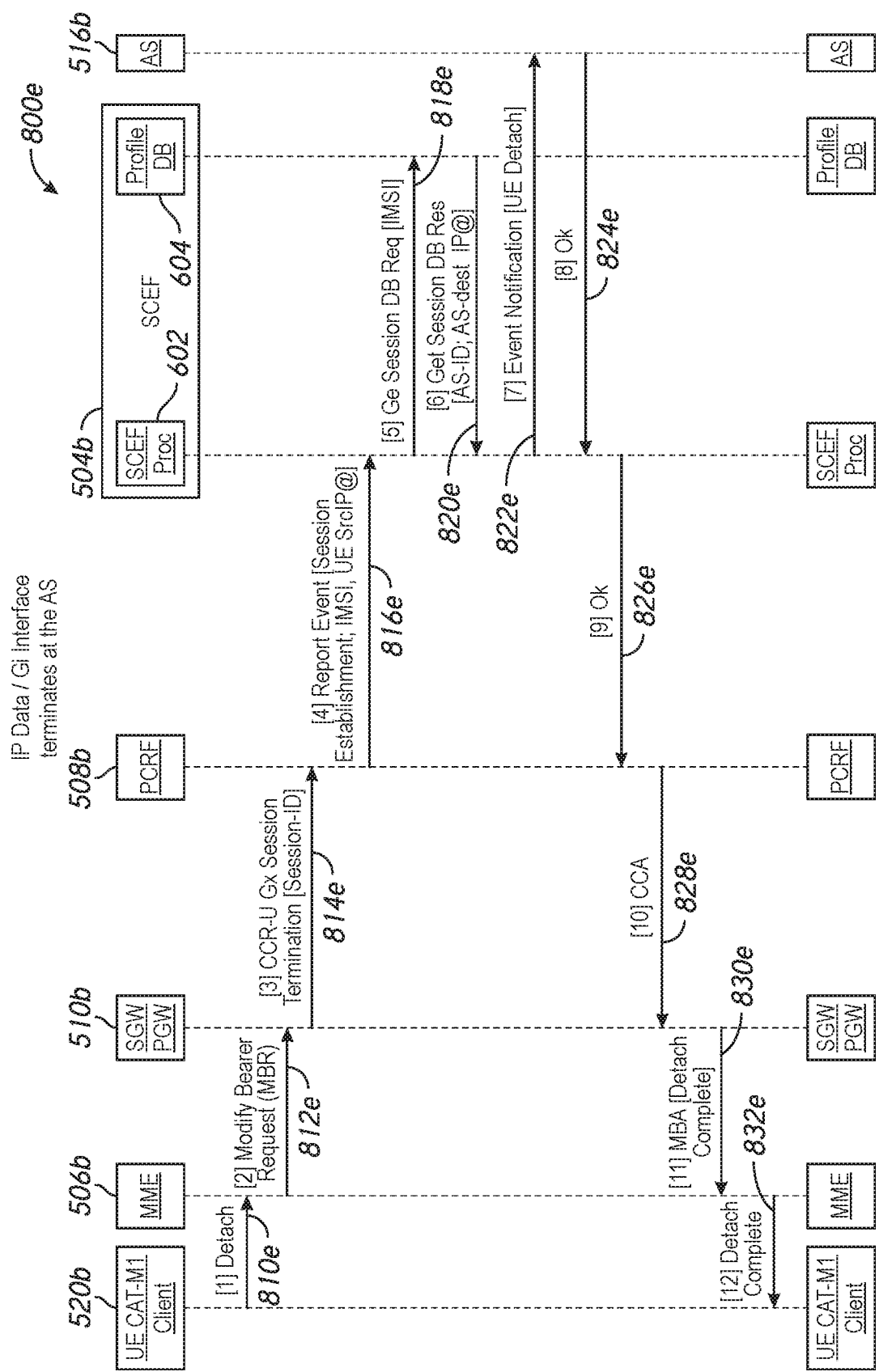

FIG. 8E is a message flow diagram 800*e* for describing a subscription-based event notification technique for events associated with UEs in a 4G/LTE-based mobile network, where the Gi interface terminates at AS 516*b*. The technique of FIG. 8E relates to a UE detachment from the network.

To begin in FIG. 8E, UE 520*b* is associated with an event subscription in the mobile network. Having been previously attached to the network, UE 520*b* sends a detach to network (step 810*e* of FIG. 8E). This UE detach may be received by MME 506*b*. In response, MME 506*b* may send a modify bearer request to GW 510*b* (step 812*e* of FIG. 8E). GW 510*b* may receive this request and, in response, send a credit control request (CCR), Gx session termination message to PCRF 508*b* (step 814*e* of FIG. 8E). This request may include a session identifier (ID) associated with the session to be terminated.

PCRF 508*b* may receive this message and, in response, send an event reporting message to SCEF 504*b* (step 816*e* of FIG. 6E). This message may indicate the UE event (i.e. the UE detach), and/or include the request or message from step 814*e* (i.e. the session termination message) or even alternatively the request or message from step 814*a* of FIG. 8A (i.e. the previous session establishment message). The message may include an identifier of UE 520*b* (e.g. the IMSI) and the source IP address associated with UE 520*b*. SCEF 504*b* (or more particularly, its SCEF processor 602) may receive this message and, in response, send to profile DB 606 a request to get a session profile (step 818*e* of FIG. 8E). This request may include the identifier of UE 520*b* (e.g. an IMSI).

Profile DB 606 may receive this request and, in response, send back to SCEF 504*b* a session profile associated with UE 520*b* (step 820*e* of FIG. 8E). The retrieved session profile may include an identifier of AS 516*b* (e.g. an AS-ID) and a destination IP address of AS 516*b*. Using this information, SCEF 504*b* may send an event notification to AS 516*b* (step 822*e* of FIG. 8E). The event notification may indicate the occurrence of the event associated with UE 520*b* (i.e. the UE detach). AS 516*b* may receive the event notification and, in response, send an OK or acknowledgment message to SCEF 504*b* (step 824*e* of FIG. 8E).

SCEF 504*b* may then send to PCRF 508*b* an OK or acknowledgement message (step 826*e* of FIG. 8E), as an acknowledgement of the previously sent event notification. PCRF 508*b* may receive this message and, in response, send to GW 510*b* a credit control answer (CCA) (step 828*e* of FIG. 8E). GW 510*b* may receive this message and, in response, send to MME 506*b* a modify bearer answer (MBA) (step 830*e* of FIG. 8E). MME 506*b* may receive this message and, in response, send to UE 520*b* a detach complete message (step 832*e* of FIG. 8E). UE 520*b* may receive the detach complete message from MME 506*b*.

Figure 9A:
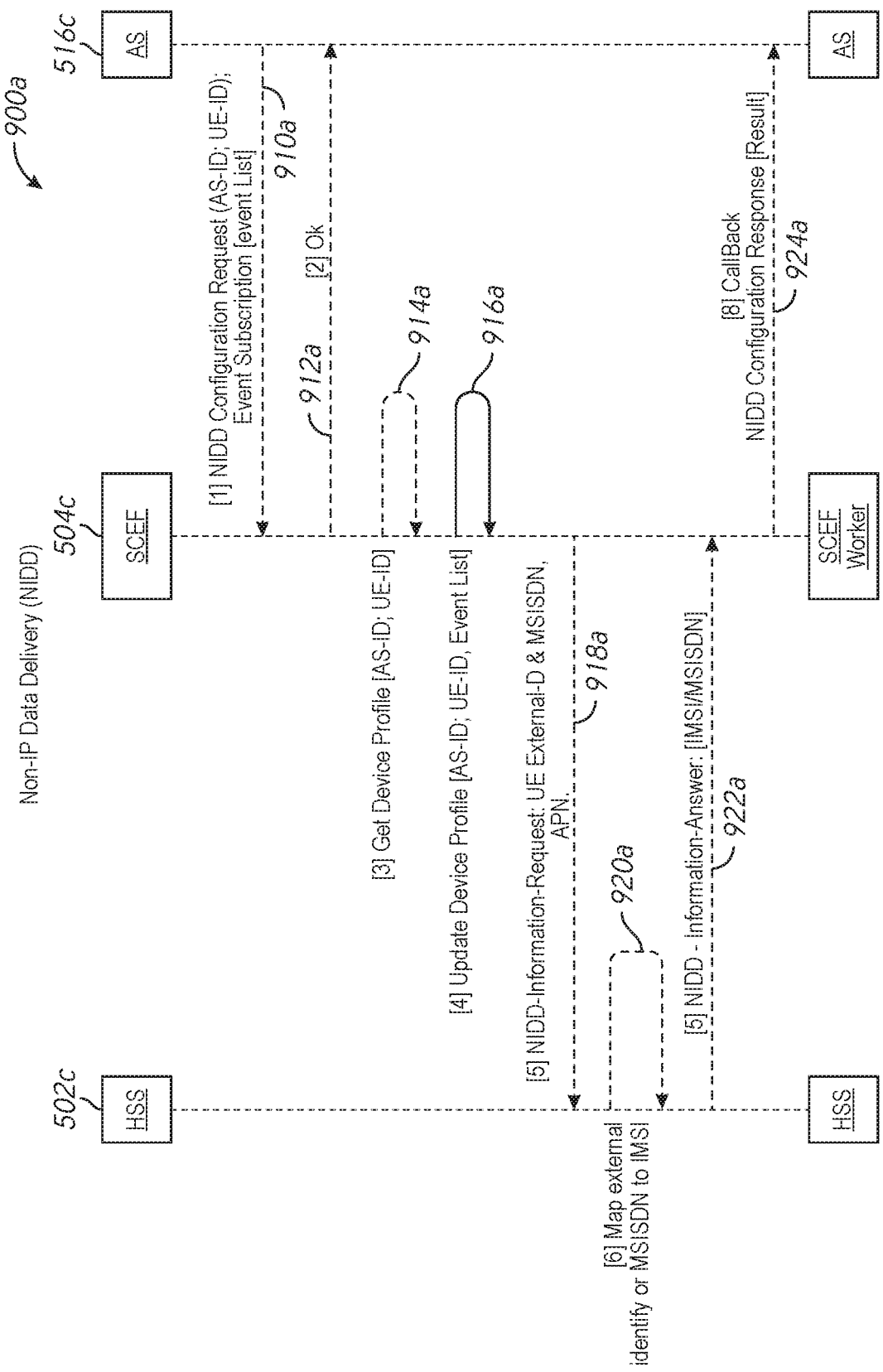
FIGS. 9A, 9B, 9C, and 9D (where FIG. 9C is comprised of FIGS. 9C-1 and 9C-2) are related message flow diagrams for describing subscription-based event notification techniques for events associated with UEs in the 4G/LTE-based mobile network according to some implementations, which may employ the variation of the network architecture of FIG. 5C (i.e. for non-IP data delivery or NIDD), and may reduce data buffering requirements in the mobile network.
Figure 9B:
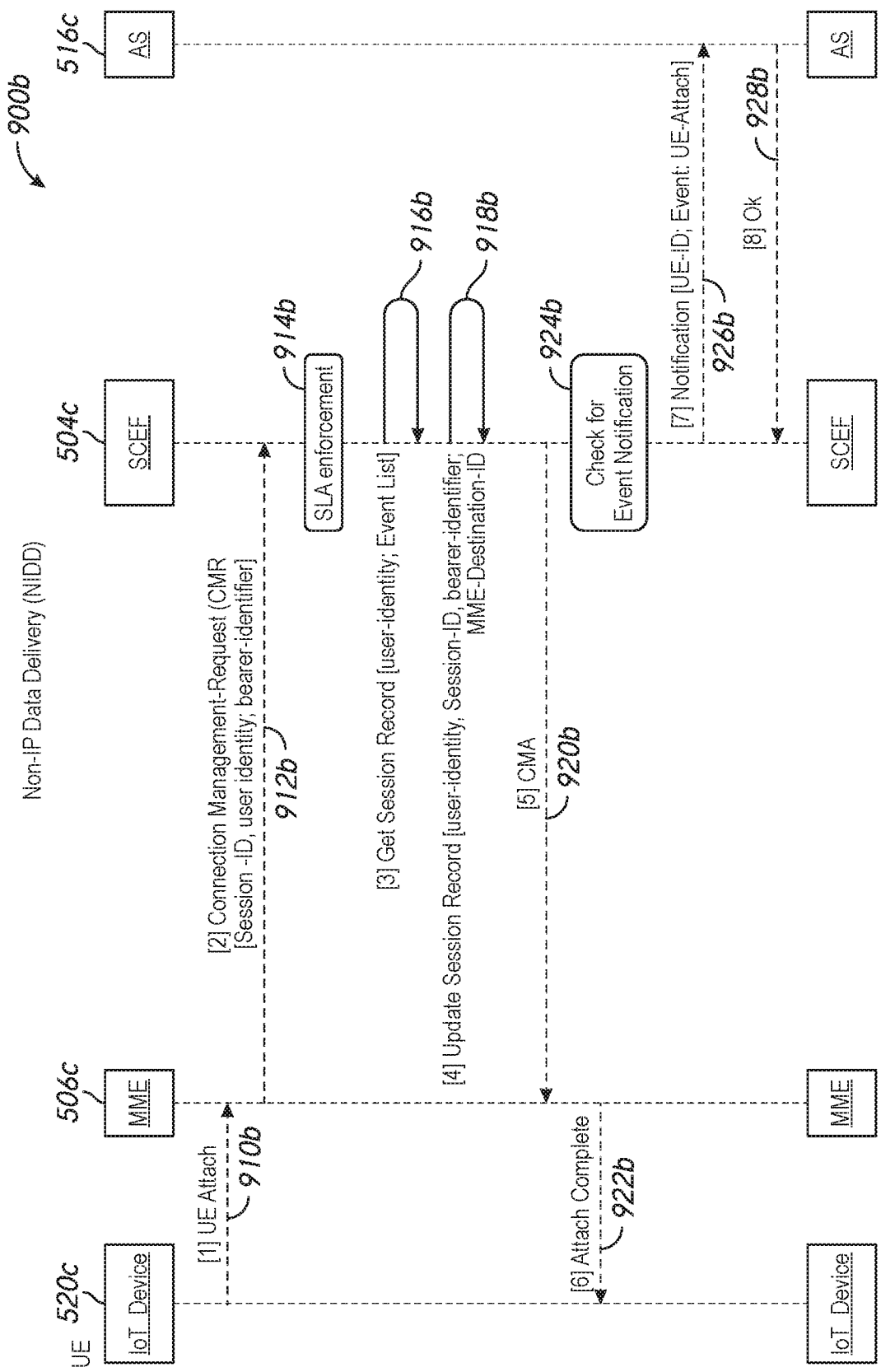
Figures 1, 9C:
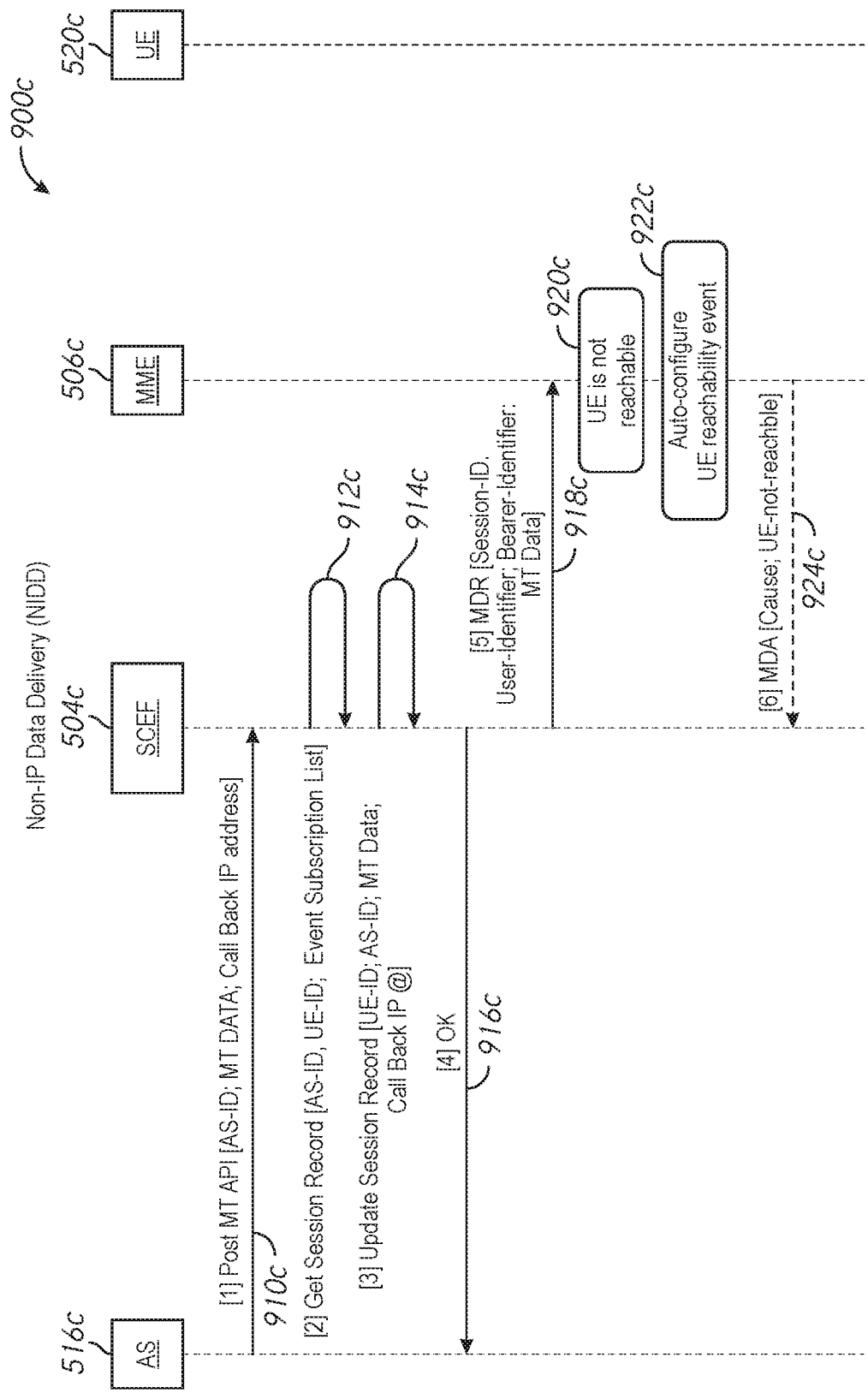
Figures 2, 9C:
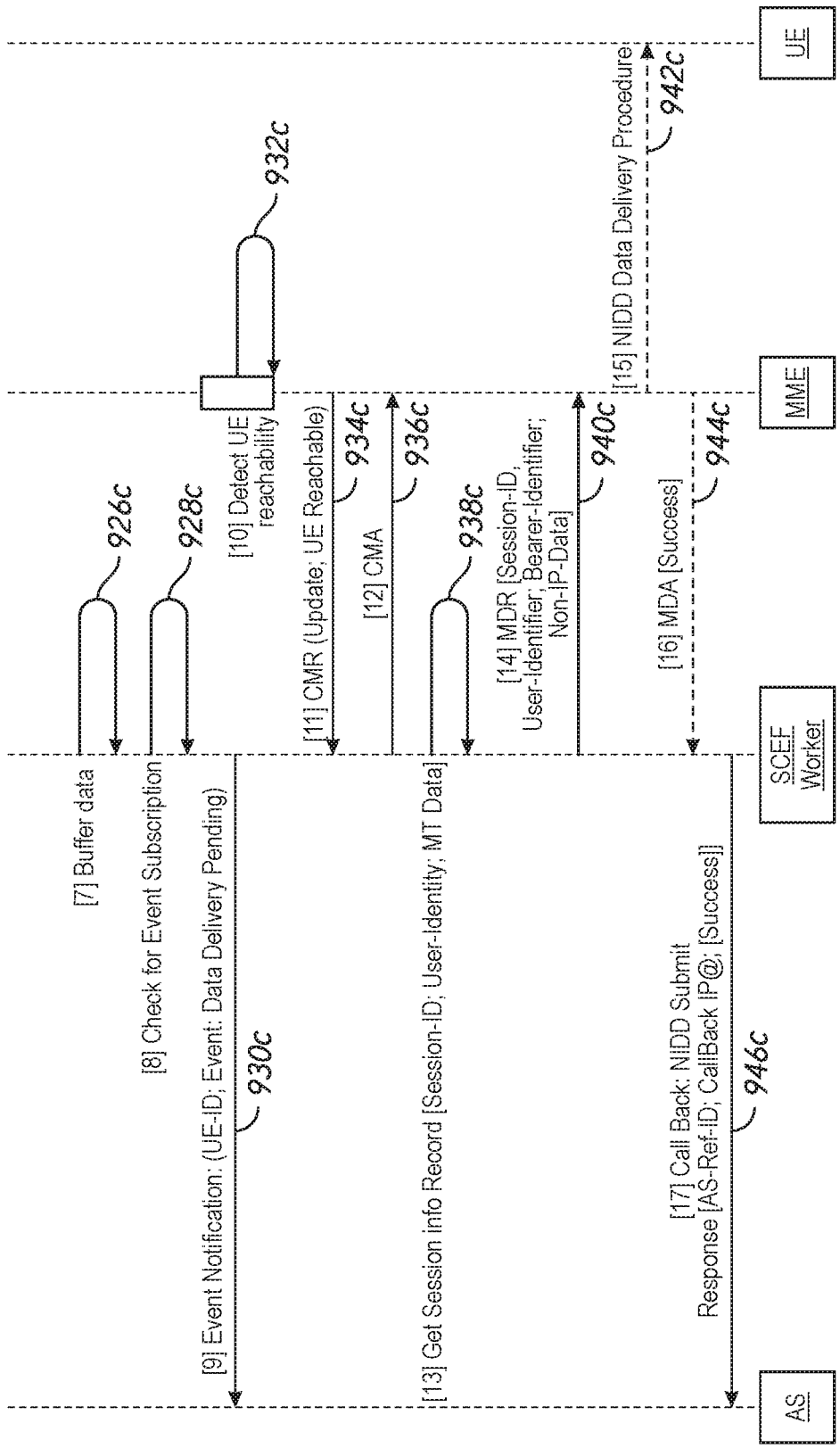

FIGS. 9A, 9B, 9C, and 9D (where FIG. 9C is comprised of FIGS. 9C-1 and 9C-2) are related message flow diagrams for describing subscription-based event notification techniques for events associated with UEs in the 4G/LTE-based mobile network and, in particular, the configuration of the network architecture of FIG. 5C for non-IP data delivery (NIDD). The techniques of FIGS. 9A, 9B, 9C, and 9D may reduce data buffering requirements in the mobile network.

FIG. 9A is a message flow diagram 900*a* for describing a subscription-based event notification technique for events associated with UEs in a 4G/LTE-based mobile network (e.g. the configuration shown in FIG. 5C), for NIDD where the Gi interface terminates at AS 516*c*. The method of FIG. 9A relates to the initial NIDD configuration and event subscription for AS 516*c* to receive notifications for a given UE.

To begin in FIG. 9A, AS 516*c* sends to SCEF 504*c* a message which includes a (NIDD) configuration request (step 910*a* of FIG. 9A). The request may include an identifier of AS 516*c* (i.e. the AS-ID) and an identifier of the UE, as well as an event notification request including an event subscription list. The list may include one or more subscribed events associated with a UE. The one or more subscribed events may include a UE attach event and/or a UE detach event. SCEF 504*c* responds to AS 516*c* with an acknowledgment or OK message (step 912*a* of FIG. 9A).

In response, SCEF 504*c* obtains a device profile of the UE based on an identifier of AS 516*c* and an identifier of the UE (step 914*a* of FIG. 9A). SCEF 504*c* updates the device profile of the UE with the event subscription list (step 916*a* of FIG. 9A). SCEF 504*c* then sends to HSS 502*c* an (NIDD) information request for mapping an external identity or MSISN to IMSI (step 918*a* of FIG. 9A). In response, HSS 502*c* maps the external identity or MSISDN to the IMSI of the UE (step 920*a* of FIG. 9A). HSS 502*c* responds to SCEF 504*c* with an answer which includes the mapping of identity (e.g. MSISDN) to the IMSI (step 922*a* of FIG. 9A). In response, SCEF 504*c* performs a callback to AS 516*c* to provide the result to AS 516*c* (step 924*a* of FIG. 9A).

FIG. 9B is a message flow diagram 900*b* for describing a subscription-based event notification technique for events associated with UEs in a 4G/LTE-based mobile network (e.g. the configuration shown in FIG. 5C), for NIDD where the Gi interface terminates at AS 516*c*. The method of FIG. 9B relates to an event notification based on a UE attach to the network/UE session establishment. As indicated in FIG. 9B, UE 520*c* may be an IoT device or other device such as an LWM2M device.

Having been previously detached from the network, UE 520*c* will (eventually) send an attach to network (step 910*b* of FIG. 9B). This UE attach may be received at MME 506*c*. In response, MME 506*c* may send to SCEF 504*c* a message which includes a connection management request (step 912*b* of FIG. 9B). The message may include a session identifier, an identifier of UE 520*c*, and a bearer identifier. SCEF 504*c* may receive this request and, in response, perform service level agreement (SLA) enforcement (step 914*b* of FIG. 9B). SCEF 504*c* gets a session record associated with UE 520*c* (step 916*b* of FIG. 9B) and updates the session record with the identifier of UE 520*c*, the session identifier, and a destination identifier of MME 506*c* (step 918*b* of FIG. 9B). SCEF 504*c* responds to MME 506*c* with a connection management answer (CMA) (step 920*b* of FIG. 9B). In turn, MME 506*c* responds to UE 520*c* with an attach complete message (step 922*b* of FIG. 9B).

In previous step 916*b*, SCEF 504*c* may have obtained an event subscription list associated with UE 520*c*. SCEF 504*c* identifies whether the detected event corresponds to one of the subscribed events in the event subscription list (step 924*b* of FIG. 9B). If the detected event corresponds to one of the subscribed events in step 924*b*, SCEF 504*c* may send to AS 516*c* a message which includes an event notification indicating the occurrence of an event (e.g. a UE attach event notification) (step 926*b* of FIG. 9B). The message may include an identifier of UE 520*c* and the detected event (i.e. the UE attach event). AS 516*c* responds to SCEF 504*c* with an acknowledgement or OK message (step 928*b* of FIG. 9B). If there is data pending at the AS 516*c* or other entity for delivery to UE 520*c*, the data may now be immediately delivered to the now-attached UE.

FIG. 9C is a message flow diagram 900*c* for describing a subscription-based event notification technique for events associated with UEs in a 4G/LTE-based mobile network (e.g. the configuration shown in FIG. 5C), for NIDD where the Gi interface terminates at AS 516*c*. FIG. 9C is comprised of FIGS. 9C-1 and 9C-2. The method of FIG. 9C relates to NIDD when the UE is initially unavailable.

To begin in FIG. 9C-1, AS 516*c* may send a mobile terminated (MT) data API message to SCEF 504*c* (step 910*c* of FIG. 9C-1). The API message may include an identifier of AS 516*c* (e.g. AS-ID), the MT data and/or an identifier thereof, and a callback IP address. In response, SCEF 504*c* may get or obtain a session record based on an identifier of AS 516*c* and an identifier of UE 520*c* (step 912*c* of FIG. 9C-1). SCEF 504*c* may also obtain an event subscription list. SCEF 514*c* updates the session record with the MT data and/or identifier thereof and the callback IP addresses (step 914*c* of FIG. 9C-1). SCEF 504*c* sends an acknowledgement or an OK message to AS 516*c* (step 916*c* of FIG. 9C-1).

SCEF 504*c* sends to MME 506*c* a message which includes a message delivery request (MDR) (step 918*c* of FIG. 9C-1). The MDR may include a session identifier, an identifier of UE 520*c*, a bearer identifier, and the MT data and/or an identifier thereof. MME 506*c* then detects that UE 520*c* is not reachable or is currently unavailable (step 920*c* of FIG. 9C-1). In response, MME 506*c* automatically configures a UE reachability event (step 922*c* of FIG. 9C-1). MME 506*c* sends to SCEF 504*c* a message which includes a message delivery answer (MDA) (step 924*c* of FIG. 9C-1). The MDA includes a cause indicating that the UE is not reachable or available.

SCEF 504*c* receives the message which includes the MDA and, in response buffers the data for AS 516*c*/UE 520*c* (step 926*c* of FIG. 9C-2). SCEF 504*c* identifies whether the event (i.e. data delivery pending and/or UE unreachable) corresponds to one of the subscribed events in the event subscription list (step 928*c* of FIG. 9C-2). If the event corresponds to one of the subscribed events in step 928*c*, SCEF 504*c* may send to AS 516*c* a message which includes an event notification indicating AS 516*c* of the event (i.e. data delivery pending and/or UE unreachable) (step 930*c* of FIG. 9C-2).

Sometime during operation, UE 520*c* reattaches to the network and MME 506*c* detects this newly-identified UE reachability (step 932*c* of FIG. 9C-2). In response, MME 506*c* sends to SCE 504*c* a message which includes a connection management request (CMR) (step 934*c* of FIG. 9C-2). SCEF 504*c* responds to the CMR from MME 506*c* with a message which includes a connection management answer (CMA) (step 936*c* of FIG. 9C-2). SCEF 504*c* then gets or obtains a session information record based on the session identifier, the identifier of UE 520*c*, and the MT data and/or identifier thereof (step 938*c* of FIG. 9C-2). SCEF 504*c* sends to MME 506*c* a message which includes a message delivery request (MDR) (step 940*c* of FIG. 9C-2). The MDR may include a session identifier, an identifier of UE 520*c*, a bearer identifier, and the non-IP data and/or an identifier thereof. Then, MME 506*c* sends a message for a non-IP data delivery procedure to be performed with UE 520*c* (step 942*c* of FIG. 9C-2). MME 506*c* sends to SCEF 504*c* a message including a message delivery answer (MDA) which includes an indication of success (step 944*c* of FIG. 9C-2). SCEF 504*c* then sends AS 516*c* a message for callback which includes an NIDD submit response (step 946*c* of FIG. 9C-2). The message may include an AS reference ID, a callback IP address, and an indication of success.

Figure 9D:
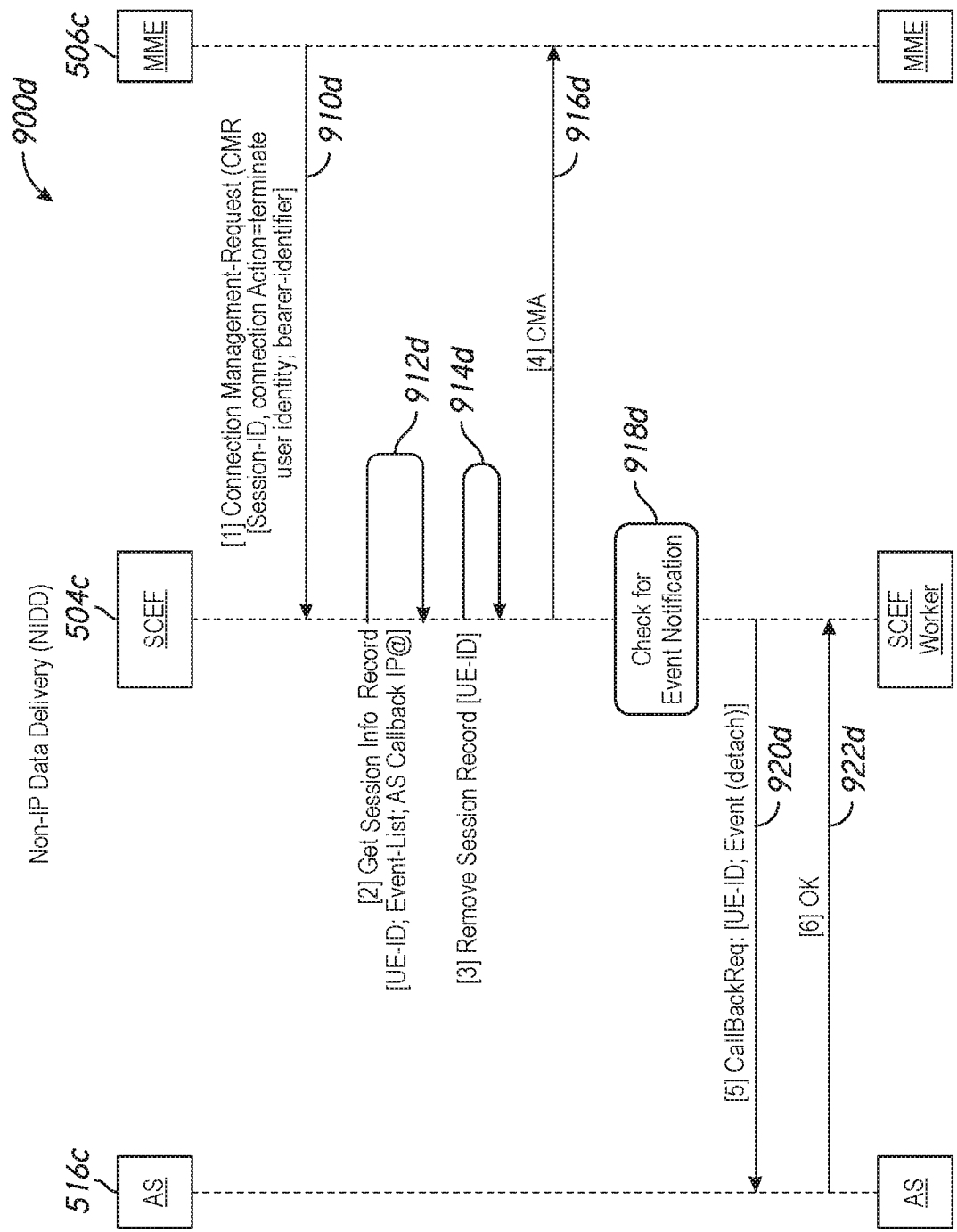

FIG. 9D is a message flow diagram 900*d* for describing a subscription-based event notification technique for events associated with UEs in a 4G/LTE-based mobile network (e.g. the configuration shown in FIG. 5C), for NIDD where the Gi interface terminates at AS 516*c*. The method of FIG. 9D relates to a session termination of the UE.

To begin in FIG. 9D, MME 506*c* sends to SCEF 504*c* a message which includes a connection management request (CMR) (step 910*d* of FIG. 9D). The request may include a session identifier, a bearer identifier, an identifier of the UE, and a connection action which may be or include an action for session termination. In response SCEF 504*c* requests or gets a session information record (step 912*d* of FIG. 9D). The request or get may include the identifier of the UE, the event subscription list, and the callback IP address. SCEF 504*c* removes the session record for the UE based on the identifier of the UE (step 914*d* of FIG. 9D). SCEF 504*c* sends a connection management answer (CMA) to MME 506*c* in response to the CMR of step 910*d* (step 916*d* of FIG. 9D).

SCEF 504*c* identifies whether the event corresponds to one of the subscribed events in the event subscription list (step 918*d* of FIG. 9D). If the event corresponds to one of the subscribed events in step 924*d*, SCEF 504*c* may send to AS 516*c* a message which includes a callback request having the identifier of the UE and the event (i.e. a UE detach event) (step 920*d* of FIG. 9D). AS 516*c* responds to SCEF 504*c* with an acknowledgement or OK message (step 922*d* of FIG. 9D).

Figure 10:
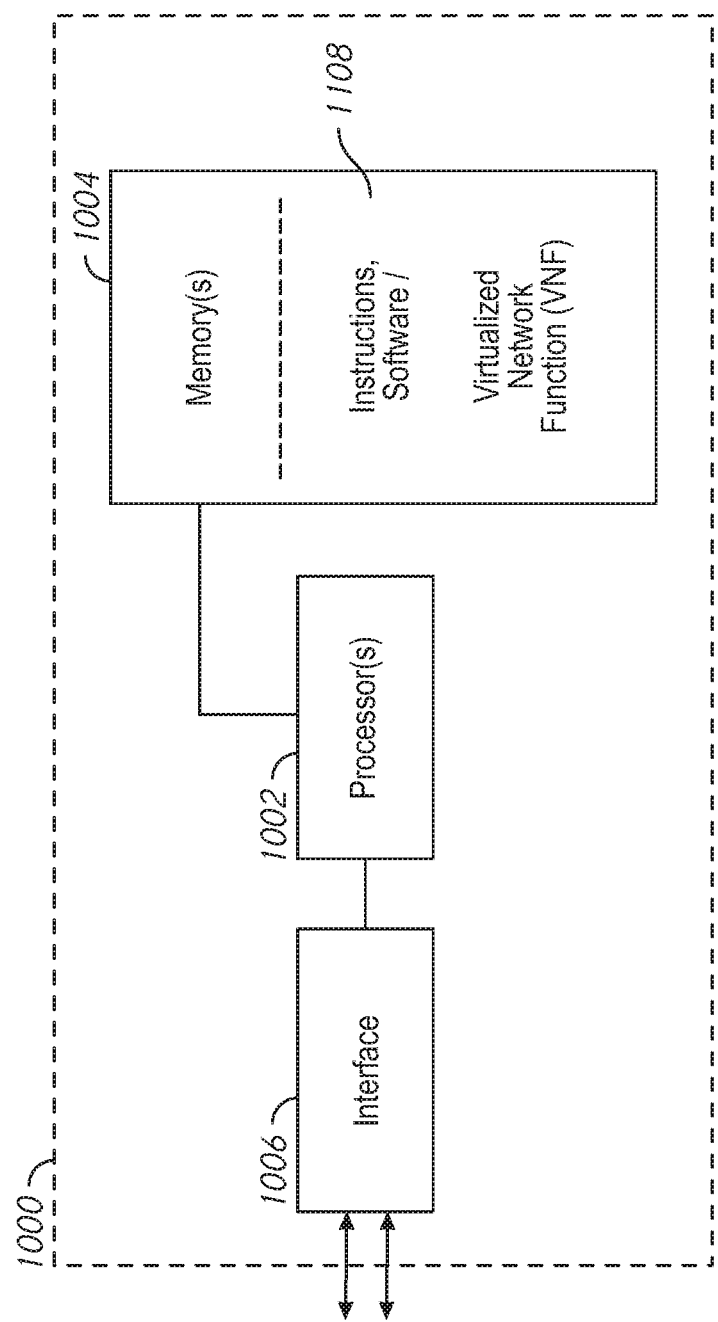
FIG. 10 is a block diagram of a server, network device or equipment which may be employed in some implementations.

FIG. 10 is a block diagram of a server, network device or equipment 1000 which may be used in some implementations of the present disclosure. Network equipment 1000 of FIG. 10 has components which may include one or more processors 1002 which are coupled to memory 1004 and to communication interface 1006. Interface 1006 is configured to connect to one or more networks for communications. The one or more processors 1002 of the network equipment are configured to operate according to instructions 1008 stored in memory 1004 (e.g. one or more virtualized network functions (VNFs) or network function virtualizations (NFVs), in order to perform techniques of the present disclosure as described above in relation to the Figures. Relatedly, the techniques of any given NF or entity may be embodied as a computer program product including a non-transitory computer readable medium and instructions (e.g. instructions provided in or as a VNF or NFV module) stored in the non-transitory computer readable medium, where the instructions are executable on one or more processors of the server or network equipment for performing the described logic.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first UE could be termed a second UE, and, similarly, a second UE could be termed a first UE, which changing the meaning of the description, so long as all occurrences of the "first UE" are renamed consistently and all occurrences of the second UE are renamed consistently. The first UE and the second UE are both UEs, but they are not the same UE.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a Network Exposure Function (NEF) of a mobile network,
      receiving, from an application server, an event subscription request for a subscription to event notifications, the event subscription request including a list of subscribed events associated with a user equipment (UE), the subscribed events including at least a UE attach event and a UE detach event;
      creating and storing, at the NEF, a context associated with the subscribed events of the subscription;
      based on receiving an indication of an occurrence of the UE detach event associated with the UE, sending, to the application server, an event notification indicating the occurrence of the UE detach event associated with the UE, for indicating to the application server to refrain from sending data to the mobile network for delivery to the UE;
      based on receiving an indication of an occurrence of the UE attach event associated with the UE, sending, to the application server, an event notification indicating the occurrence of the UE attach event associated with the UE, for indicating to the application server to send pending data for the UE to the mobile network for delivery to the UE;
      based on identifying that the pending data are to be delivered using Internet Protocol (IP) data delivery, wherein the indication of the occurrence of the UE attach event is received from a Policy and Control Function (PCF) responsive to a Packet Data Unit (PDU) CAN session establishment for the UE, sending, from the NEF via an N6 interface with a User Plane Function (UPF), the pending data for delivery to the UE; and
      based on identifying that the pending data are to be delivered using non-IP data delivery (NIDD), wherein the indication of the occurrence of the UE attach event is received from an Access Management Function (AMF) responsive to a session establishment for the UE, sending, from the NEF via an interface with the AMF, the pending data for delivery to the UE.

2. The method of claim 1, wherein storing the context associated with the subscribed events further includes storing, at the NEF, an identifier of the UE and an identifier of the application server, the method further comprising:
   at the NEF, based on receiving the indication of the occurrence of the UE attach event,
      identifying, from the context, whether the UE attach event corresponds to one of the subscribed events;
      sending, to the application server, the event notification indicating the occurrence of the UE attach event based on identifying that the UE attach event matches one of the subscribed events; and
      refraining from sending to the application server the event notification indicating the occurrence of the UE attach event based on identifying that the UE attach event fails to match one of the subscribed events.

3. The method of claim 1, further comprising:
   at the NEF,
      based on identifying that the pending data are to be delivered using the IP data delivery and the N6 interface terminates at the application server, allowing the application server to send the pending data to the UPF via the N6 interface for delivery of the pending data to the UE.

4. The method of claim 1, further comprising:
   at the NEF,
      based on identifying that the pending data are to be delivered using the NIDD, receiving, from the AMF, subscription data for the UE in the indication of the occurrence of the UE attach event in the session establishment.

5. The method of claim 1, further comprising:
   at the NEF,
      in response to sending, to the application server, the event notification indicating the occurrence of the UE attach event: receiving, from the application server, a request for delivery of data to the UE including the pending data to be delivered and indicating a plurality of Quality of Service (QoS) Information Elements (IEs) associated with a connection for data delivery.

6. The method of claim 5, further comprising:
   sending, from the NEF to a Policy and Control Function (PCF), a QoS request indicating the plurality of QoS IEs; and
   sending, from the NEF via an N6 interface to a user plane function (UPF), the pending data to be delivered.

7. The method of claim 1, wherein:
   when the UE is indicated to support the IP data delivery, the UE comprises a CAT-M1 device,
   when the UE is indicated to support the NIDD, the UE comprises a Narrowband (NB) Internet of Things (IoT) (NB-IoT) device.

8. The method of claim 1, wherein the mobile network comprises a 5G mobile network.

9. A network exposure function (NEF) configured to:
   receive, at the NEF from an application server, an event subscription request for a subscription to event notifications, the event subscription request including a list of subscribed events associated with a User Equipment (UE) operative in a mobile network, the subscribed events including at least a UE attach event and a UE detach event;
create and store, at the NEF, a context associated with the subscribed events of the subscription;
based on receiving an indication of an occurrence of the UE detach event associated with the UE, send, from the NEF to the application server, an event notification indicating the occurrence of the UE detach event associated with the UE, for indicating to the application server to refrain from sending data to the mobile network for delivery to the UE;
based on receiving an indication of an occurrence of the UE attach event associated with the UE, send, from the NEF to the application server, an event notification indicating the occurrence of the UE attach event associated with the UE, for indicating to the application server to send pending data for the UE to the mobile network for delivery to the UE;
based on identifying that the pending data are to be delivered using Internet Protocol (IP) data delivery, wherein the indication of the occurrence of the UE attach event is received from a Policy and Control Function (PCF) responsive to a Packet Data Unit (PDU) CAN session establishment for the UE, send, from the NEF via an N6 interface with a User Plane Function (UPF), the pending data for delivery to the UE; and
based on identifying that the pending data are to be delivered using non-IP data delivery (NIDD), wherein the indication of the occurrence of the UE attach event is received from an Access Management Function (AMF) responsive to a session establishment for the UE, send, from the NEF via an interface with the AMF, the pending data for delivery to the UE.

10. The NEF of claim 9, which is configured to store the context associated with the subscribed events by storing, at the NEF, an identifier of the UE and an identifier of the application server, the NEF being further configured to:
based on receiving the indication of the occurrence of the UE attach event,
identify, from the context, whether the UE attach event corresponds to one of the subscribed events;
send, to the application server, the event notification indicating the occurrence of the UE attach event based on identifying that the UE attach event matches one of the subscribed events; and
refrain from sending to the application server the event notification indicating the occurrence of the UE attach event based on identifying that the UE attach event fails to match one of the subscribed events.

11. The NEF of claim 9, which is further configured to:
based on identifying that the pending data are to be delivered using the IP data delivery and the N6 interface terminates at the application server, allow the application server to send the pending data to the UPF via the N6 interface for delivery of the pending data to the UE.

12. The NEF of claim 9, which is further configured to:
based on identifying that the pending data are to be delivered using the NIDD, receive, from the AMF, subscription data for the UE in the indication of the occurrence of the UE attach event in the session establishment.

13. The NEF of claim 9, wherein:
when the UE is indicated to support the IP data delivery, the UE comprises a CAT-M1 device, and
when the UE is indicated to support the NIDD, the UE comprises a Narrowband (NB) Internet of Things (IoT) (NB-IoT) device.

14. A method comprising:
at a Service Capability Exposure Function (SCEF) of a mobile network,
receiving, from an application server, an event subscription request for a subscription to event notifications, the event subscription request including a list of subscribed events associated with a user equipment (UE), the subscribed events including at least a UE attach event and a UE detach event;
creating and storing, at the SCEF, a context associated with the subscribed events of the subscription;
based on receiving an indication of an occurrence of the UE detach event associated with the UE, sending, to the application server, an event notification indicating the occurrence of the UE detach event associated with the UE;
based on receiving an indication of an occurrence of the UE attach event associated with the UE, sending, to the application server, an event notification indicating the occurrence of the UE attach event associated with the UE; and
based on identifying that pending data are to be delivered using Internet Protocol (IP) data delivery, wherein the indication of the occurrence of the UE attach event is received from a Policy and Charging Rules Function (PCRF) responsive to a Gx session establishment for the UE, sending, from the SCEF via an SGi interface with a Serving/Packet Gateway, the pending data for delivery to the UE based on receiving the indication of the occurrence of the UE attach event.

15. The method of claim 14, comprising:
further comprising:
at the SCEF,
based on identifying that the pending data are to be delivered using the IP data delivery and the SGi interface terminates at the application server, allowing the pending data to be delivered from the application server to the Serving/Packet Gateway via the SGi interface for delivery to the UE based on receiving the indication of the occurrence of the UE attach event.

16. The method of claim 14, further comprising:
at the SCEF,
based on identifying that the pending data are to be delivered using non-IP data delivery (NIDD), wherein the indication of the occurrence of the UE attach event is received from a Mobility Management Entity (MME) responsive to session establishment for the UE, sending, from the SCEF via a T6a interface with the MME, the pending data for delivery to the UE based on receiving the indication of the occurrence of the UE attach event.

17. The method of claim 14, further comprising:
at the SCEF,
receiving, from the application server, a request for delivery of data to the UE which includes the pending data to be delivered;
receiving a connectivity status indicating that the UE is not connected, and, in response:
buffering, at the SCEF, the pending data to be delivered to the UE;
waiting to receive an indication of session establishment for the UE; and sending the buffered pending data for delivery to the UE in response to receiving the indication of session establishment for the UE.

18. The method of claim 17, further comprising:
based on identifying that the pending data to be delivered is indicated as high priority data, send an attach request message to a short message service (SMS) service center (SC) for delivery of an SMS message with an attach trigger request to the UE; and
based on identifying that the pending data to be delivered is not indicated as high priority data, refraining from sending the attach request message to the SMS SC for delivery of the SMS message.

19. The method of claim 18, wherein the subscribed events of the subscription further include a delayed data delivery event, the method further comprising:
based on receiving the connectivity status indicating that the UE is not connected, sending, to the application server, an event notification indicating an occurrence of the delayed data delivery event.

20. The method of claim 16, wherein:
when the UE is indicated to support the IP data delivery, the UE comprises a CAT-M1 device, and
when the UE is indicated to support the NIDD, the UE comprises a Narrowband (NB) Internet of Things (IoT) (NB-IoT) device.

* * * * *